(12) United States Patent
Robinson et al.

(10) Patent No.: US 11,079,807 B1
(45) Date of Patent: Aug. 3, 2021

(54) FRICTION ROLLER HINGE FOR ELECTRONIC DEVICES AND METHOD FOR MAKING ROLLER AND SPACER ELEMENTS

(71) Applicant: Apple Inc., Cupertino, CA (US)

(72) Inventors: Kevin M. Robinson, Sunnyvale, CA (US); Houtan R. Farahani, San Ramon, CA (US); Ari P. Miller, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/053,693

(22) Filed: Aug. 2, 2018

Related U.S. Application Data

(60) Provisional application No. 62/541,073, filed on Aug. 3, 2017.

(51) Int. Cl.
| | |
|---|---|
| *G06F 1/16* | (2006.01) |
| *E05D 11/08* | (2006.01) |
| *E05D 7/00* | (2006.01) |
| *E05D 11/00* | (2006.01) |

(52) U.S. Cl.
CPC ............ *G06F 1/1681* (2013.01); *E05D 7/00* (2013.01); *E05D 11/0081* (2013.01); *E05D 11/082* (2013.01); *G06F 1/1616* (2013.01); *G06F 1/1637* (2013.01); *G06F 1/1679* (2013.01); *E05Y 2900/606* (2013.01)

(58) Field of Classification Search
CPC .... G06F 1/1681; G06F 1/1616; G06F 1/1637; G06F 1/1679; E05D 11/082; E05D 7/00; E05D 11/0081; E05Y 2900/606
See application file for complete search history.

(56) References Cited

U.S. PATENT DOCUMENTS

| | | | | |
|---|---|---|---|---|
| 936,379 A | * | 10/1909 | Stevens | F16M 11/40 248/160 |
| 1,916,896 A | * | 7/1933 | Sneed | B60T 11/046 74/502.3 |
| 2,680,358 A | * | 6/1954 | Zublin | F16L 11/18 464/19 |
| 3,096,962 A | * | 7/1963 | Meijs | B23Q 1/285 248/276.1 |

(Continued)

*Primary Examiner* — Adrian S Wilson
*Assistant Examiner* — Theron S Milliser
(74) *Attorney, Agent, or Firm* — Dickinson Wright RLLP

(57) ABSTRACT

A hinge assembly is disclosed. The hinge assembly may include roller elements and spacer elements positioned between adjacent roller elements. The hinge assembly couples with two housing parts, and allows movement of the housing parts with respect to one another. The roller elements synchronously rotate along surfaces of the spacer elements during rotation of one of the housing parts. Also, in order to maintain engagement between the roller elements and the spacer elements, a strap may extend through openings of the roller elements and the spacer elements. Further, the strap may provide the hinge assembly with a desired stiffness. For example, when the first housing part ceases rotational movement, the strap may cause the first housing part to maintain its position relative to the second housing part. Also, the hinge assembly may include a tensioning element coupled to the strap in order to provide tension to the strap.

21 Claims, 69 Drawing Sheets

(56) References Cited

U.S. PATENT DOCUMENTS

| | | | | |
|---|---|---|---|---|
| 3,168,274 A * | 2/1965 | Street | B23Q 1/285 | 248/176.3 |
| 3,584,822 A * | 6/1971 | Oram | F16M 11/40 | 248/160 |
| 3,858,578 A * | 1/1975 | Milo | A61B 17/02 | 600/229 |
| 4,739,801 A * | 4/1988 | Kimura | F16G 13/10 | 138/120 |
| 4,949,927 A * | 8/1990 | Madocks | F16M 11/40 | 248/160 |
| 5,007,487 A * | 4/1991 | Dahle | E21B 17/20 | 175/122 |
| 5,154,243 A * | 10/1992 | Dudman | E21B 7/067 | 175/61 |
| 5,348,259 A * | 9/1994 | Blanco | A61B 17/115 | 227/19 |
| 5,581,440 A * | 12/1996 | Toedter | G06F 1/1616 | 16/386 |
| 5,685,190 A * | 11/1997 | Yamamoto | B21D 9/03 | 72/466 |
| 6,223,393 B1 * | 5/2001 | Knopf | G06F 1/1618 | 16/366 |
| 6,250,175 B1 * | 6/2001 | Noetzold | F16C 1/20 | 74/502.3 |
| 6,481,683 B1 * | 11/2002 | Stewart | A47B 21/0314 | 108/50.01 |
| 6,502,496 B1 * | 1/2003 | Ravid | F41H 7/04 | 138/120 |
| 6,648,376 B2 * | 11/2003 | Christianson | E03C 1/06 | 138/120 |
| 7,136,280 B2 * | 11/2006 | Jobs | F16M 11/14 | 361/679.06 |
| 7,142,415 B2 * | 11/2006 | Hillman | F16M 11/10 | 361/679.06 |
| 7,145,768 B2 * | 12/2006 | Hillman | F16M 11/10 | 361/679.06 |
| 7,218,510 B2 * | 5/2007 | Hillman | F16M 11/10 | 248/160 |
| 7,634,874 B2 * | 12/2009 | Lucas | E04H 4/082 | 52/108 |
| 8,768,509 B2 * | 7/2014 | Unsworth | B25J 9/06 | 700/245 |
| 9,164,547 B1 * | 10/2015 | Kwon | G06F 1/1656 | |
| 9,337,434 B2 * | 5/2016 | Lindblad | H01L 51/52 | |
| 9,506,279 B2 * | 11/2016 | Kauhaniemi | G06F 1/1652 | |
| 9,581,190 B2 * | 2/2017 | Richman | F16B 2/02 | |
| 9,606,583 B2 * | 3/2017 | Ahn | G06F 1/1641 | |
| 9,786,207 B2 * | 10/2017 | Kim | G09F 9/301 | |
| 9,891,672 B2 * | 2/2018 | Hampton | G06F 1/1681 | |
| 10,120,421 B1 * | 11/2018 | Hong | G06F 1/1681 | |
| 10,244,641 B2 * | 3/2019 | Seo | G06F 1/1641 | |
| 10,364,598 B2 | 7/2019 | Tazbaz | | |
| 2004/0090552 A1 | 5/2004 | Watanabe et al. | | |
| 2004/0257755 A1 * | 12/2004 | Hillman | F16M 11/10 | 361/679.06 |
| 2007/0117600 A1 * | 5/2007 | Robertson, Jr. | H04M 1/0216 | 455/575.3 |
| 2009/0000062 A1 | 1/2009 | Yamanami | | |
| 2010/0228295 A1 * | 9/2010 | Whitefield | E21B 17/017 | 606/278 |
| 2011/0227822 A1 * | 9/2011 | Shai | G06F 1/1615 | 345/156 |
| 2012/0307423 A1 * | 12/2012 | Bohn | G06F 1/1641 | 361/679.01 |
| 2013/0286553 A1 * | 10/2013 | Vanska | G06F 1/1615 | 361/679.01 |
| 2014/0126133 A1 * | 5/2014 | Griffin | G06F 1/1616 | 361/679.27 |
| 2014/0196254 A1 * | 7/2014 | Song | E05D 3/14 | 16/302 |
| 2015/0176317 A1 * | 6/2015 | Lee | E05D 3/06 | 16/251 |
| 2015/0277506 A1 * | 10/2015 | Cheah | G06F 1/1681 | 361/679.27 |
| 2016/0090763 A1 | 3/2016 | Hsu et al. | | |
| 2016/0123054 A1 | 5/2016 | Senatori | | |
| 2016/0132075 A1 * | 5/2016 | Tazbaz | G06F 1/1681 | 361/679.27 |
| 2016/0132076 A1 * | 5/2016 | Bitz | G06F 1/1681 | 361/679.27 |
| 2016/0147267 A1 * | 5/2016 | Campbell | G06F 1/1681 | 361/679.27 |
| 2016/0215541 A1 * | 7/2016 | Tazbaz | E05D 3/14 | |
| 2016/0378145 A1 | 12/2016 | Sung et al. | | |
| 2017/0090523 A1 * | 3/2017 | Tazbaz | G06F 1/1681 | |

* cited by examiner

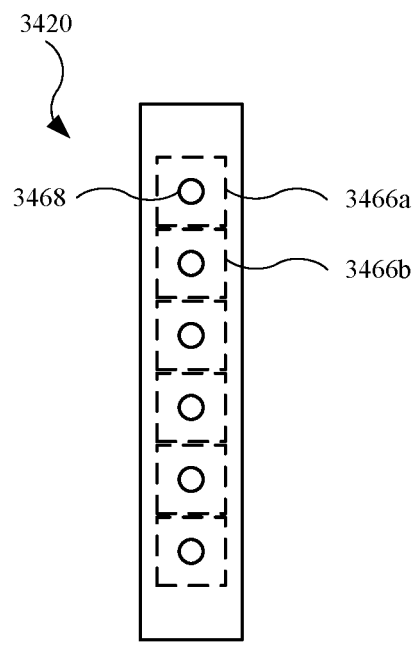
FIG. 66
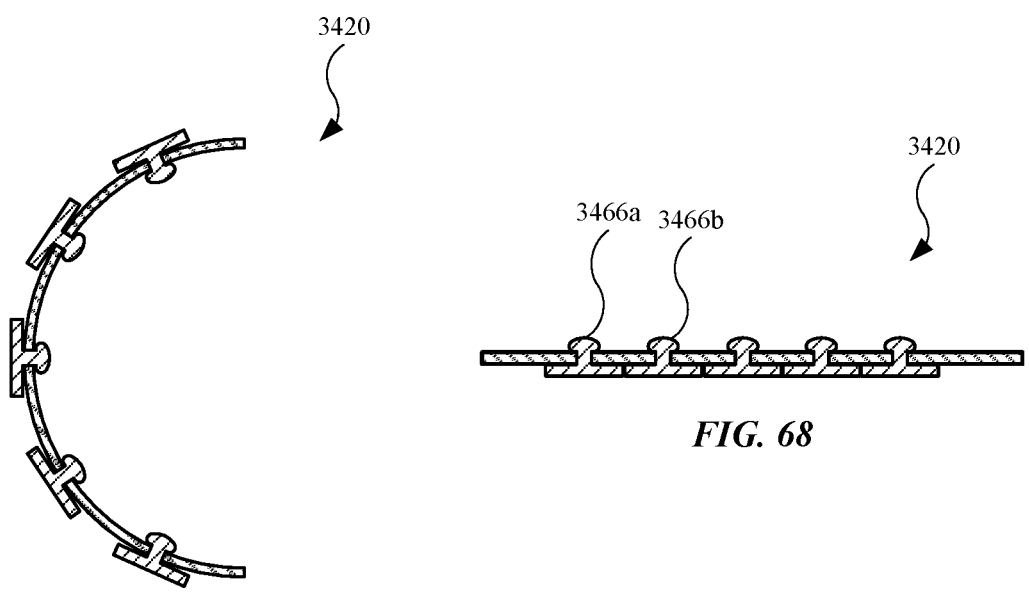
FIG. 67
FIG. 68

FRICTION ROLLER HINGE FOR ELECTRONIC DEVICES AND METHOD FOR MAKING ROLLER AND SPACER ELEMENTS

CROSS-REFERENCE TO RELATED APPLICATION(S)

The present application claims the benefit of U.S. Provisional Application No. 62/541,073, entitled "FRICTION ROLLER HINGE FOR ELECTRONIC DEVICES," filed Aug. 3, 2017, the content of which is incorporated herein by reference in its entirety for all purposes.

FIELD

The following description relates to hinges and hinge assemblies. In particular, the following description relates to hinge assemblies having multiple parts frictional engaged with one another.

BACKGROUND

Electronic devices, including portable electronic devices, may include two housing parts that are coupled together by a hinge. The hinge allows the housing parts to rotate with respect to each other, thereby allowing the electronic device to open so that a user can interact with the electronic device, or to close and provide a compact system.

However, traditional hinges have several drawbacks. For example, some hinges include a torsion bar designed to twist when the electronic device is opened. Over time, the torsion bar can wear down due to stress from several cycles of opening and closing the electronic device. Also, the hinge may be substantially positioned in one or both of the housing parts. As a result, the space provided by the housing part(s) is limited due to space occupied by the hinge. This can lead to fewer or less powerful operational components installed in the electronic device.

SUMMARY

In one aspect, a laptop computing device is described. The laptop computing device may include a display housing that carries a display. The laptop computing device may further include a base portion that carries an input mechanism that controls the display. The laptop computing device may further include a hinge assembly coupled to the display housing and the base portion. The hinge assembly may allow a closed position defined by the display housing being positioned over the base portion. The hinge assembly may include a first roller element. The hinge assembly may further include a second roller element. The hinge assembly may further include a spacer element positioned between the first roller element and the second roller element. The hinge assembly may further include a strap coupled to the display housing and the base portion and extending through the first roller element, the second roller element, and the spacer element. The strap may provide a stiffness such that a transition from the open position to the closed position causes synchronous motion of the first roller element, the second roller element, and the spacer element.

In another aspect, a system is described. The system may include a first housing part. The system may further include a second housing part. The system may further include a hinge assembly that rotatably couples the first housing part with the second housing part. The hinge assembly may include a first roller element. The hinge assembly may further include a second roller element. The hinge assembly may further include a spacer element positioned between, and providing a frictional engagement with, the first roller element and the second roller element. In some embodiments, rotational movement of the first housing part with respect to the second housing part causes a synchronous movement of the first roller element, the second roller element, and the spacer element.

In another aspect, a system is described. The system may include a first housing part having a first end and a second end opposite the first end. The system may further include a second housing part rotatably coupled to the first housing part by a hinge assembly. The hinge assembly may include a first roller element. The hinge assembly may further include a second roller element. The hinge assembly may further include a spacer element frictionally engaged with the first roller element and the second roller element. In some embodiments, the first roller element, the second roller element, and the spacer element include a dimension that extends from the first end to the second end.

In another aspect, a portable computing device is described. The portable computing device may include a hinge assembly connected to a base portion and a display housing. The hinge assembly may allow movement of the display housing relative to the base portion to define an open position and a closed position different from the open position. The hinge assembly may include a first roller element that includes a first cavity. The hinge assembly may further include a second roller element that includes a second cavity. The hinge assembly may further include a spacer element that engages the first roller element and the second roller element. The spacer element may include a first protrusion positioned in the first cavity and a second protrusion positioned in the second cavity. Also, in some instances, an engagement of the first protrusion and the second protrusion within the first cavity and the second cavity, respectively, limits the movement of the display housing with respect to the base portion to define the open position and the closed position.

In another aspect, a portable computing device is described. The portable computing device may include a hinge assembly connected to a base portion and a display housing. The hinge assembly may allow movement of the display housing relative to the base portion to define an open position and a closed position different from the open position. The hinge assembly may include a first roller element that includes a first through hole having a first convex surface. The hinge assembly may further include a second roller element that includes a second through hole having a second convex surface. The hinge assembly may further include a spacer element that includes a third through hole. The spacer element may engage the first roller element and the second roller element. The hinge assembly may further include a strap coupled to the base portion and the display housing. The strap may pass through the first through hole, the second through hole, and the third through hole. In some instances, in the closed position, the strap engages the first convex surface and the second convex surface.

In another aspect, a method for assembling a hinge assembly of a portable computing device is described. The portable computing device may include a base portion and a display housing. The method may include providing a roller element that defines a cylindrical body. The roller element may include a through hole having a convex surface. Also, the roller element may further include a cavity.

The method may further include providing a spacer element that includes a second through hole. The spacer element may include a protrusion. The method may further include positioning the protrusion in the cavity. The method may further include extending a strap through the through hole and the second through hole. In some instances, an engagement of protrusion and the roller element within the cavity limits rotational movement of the display housing with respect to the base portion. Also, in some instances, the strap engages the convex surface when the display housing is positioned over the base portion.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which:

FIG. 66 illustrates a plan view of an alternate embodiment of a strap that includes several blocks, in accordance with some described embodiments;

FIG. 67 illustrates a cross sectional view of the strap shown in FIG. 66, showing the strap in a bent configuration;

FIG. 68 illustrates a cross sectional view of the strap shown in FIG. 66, showing the strap in a flat configuration;

Figure 1:
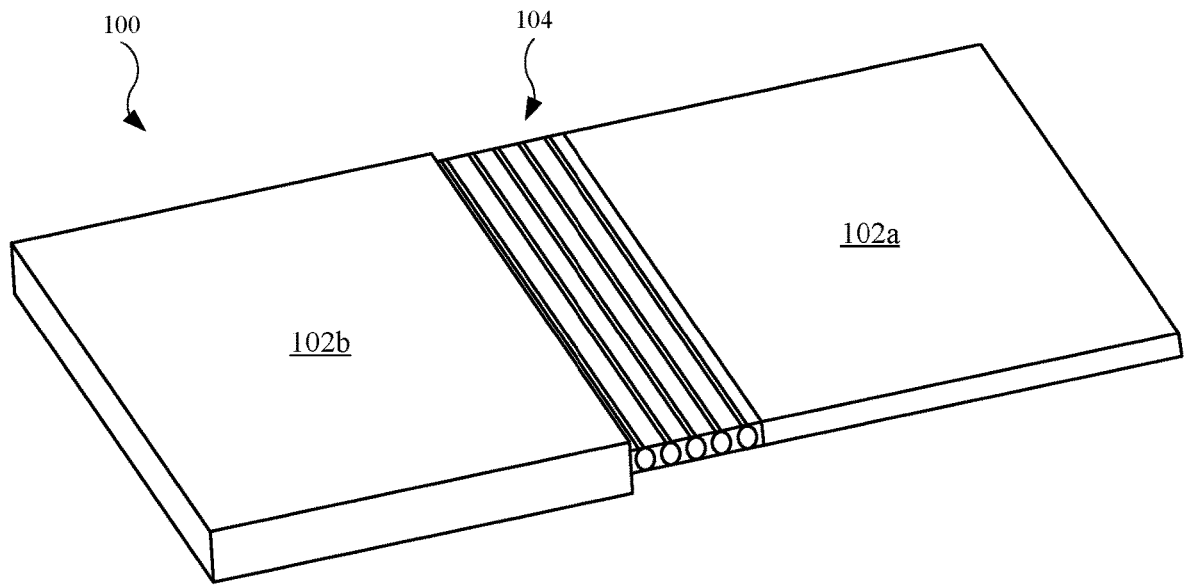
FIG. 1 illustrates an isometric view of an embodiment of a system having a first housing part and a second housing part coupled to a hinge assembly, in accordance with some described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to hinge assemblies designed to couple together one or more parts of a system. A system described herein may include electronic devices (such as laptop computing devices and desktop computing devices) or accessory devices (such as folios and covers). The hinge assembly may include multiple roller elements having a generally cylindrical shape. The hinge assembly may further include multiple spacer elements, with a spacer element positioned between adjacent roller elements. During movement of one part relative to another part, the roller elements rotate or roll along a surface of the spacer elements. Further, in addition to the rotation of the roller elements, the roller elements and the spacer elements can act in concert and provide synchronized movement. In other words, when one of the parts is moved, the roller elements and the spacer elements move together at the same time, while the roller elements rotate along surfaces of the spacer elements.

A hinge assembly that uses a combination of roller elements and spacer elements offers several advantages over traditional hinge assemblies. For example, traditional hinge assemblies that use a torsion bar impart rotational stresses on the torsion bar, as one end of the torsional bar rotates with respect to another end of the torsion bar (causing a twisting of the torsion bar). However, hinge assemblies described herein allow the entire cylindrical body of the roller elements to rotate along the spacer elements without twisting. As a result, rotational stresses are not imparted on the roller elements. Moreover, the rotational movement of the roller elements is inversely proportional to the number of roller element. In this regard, a hinge assembly with a relatively high number of roller elements includes a relatively small amount of rotational movement per roller elements. As a result, less movement of the roller elements may lead to less wear on the roller elements and/or the spacer elements over time.

Contrary to traditional hinge assemblies in which a substantially majority of the structural elements is stored in one (or both) of the parts, the hinge assemblies described herein are positioned substantially outside, or external to, the parts. For example, both the roller elements and the spacer elements are externally positioned with respect to the parts. In this regard, additional internal volume or space within the parts is available for other components.

In order to maintain engagement between the roller elements and the spacer elements, the hinge assembly may include a strap (or straps) passing through each of the roller elements and the spacer elements. The strap may influence the frictional engagement between roller elements and the spacer elements. The frictional force, $F_f$, between a roller element engaged with a spacer element can be derived by:

$$F_f = \mu N$$

where $\mu$ is the coefficient of friction of the surface of the roller element and the surface of the spacer element, and N is the normal or perpendicular force that pushes the elements together. The normal force, N, may be a function of the weight of the roller element, when positioned over the spacer elements, as well the force the strap applies to maintain the engagement between the roller element and the spacer element. The frictional engagement can affect not only the ability for the roller elements to roll along the spacer elements, but also the ability of the hinge assembly to remain in a fixed position, and in turn, maintain the parts (coupled to the hinge assembly) in a fixed position. In this regard, the hinge assembly may include a tensioning element coupled to one end of the strap. The tensioning element may provide a pulling force on the strap, which in turn, influences the degree by which the roller elements engage the spacer elements. The tensioning element may include a constant tensioning element or an adjustable tensioning element, with the latter having the ability altered the normal force N desired.

Further, the strap may act as a stiffening element, or stiffener, for the hinge assembly, allowing the hinge assembly to maintain a fixed position of the parts of the system. For example, when one of the parts is moved relative to another part from one position to another position, the stiffness of the strap allows the hinge assembly to maintain the part in the other position. Further, when one part moves relative to the another part, the strap may be used to counterbalance, or offset, the force (provided by the weight) of the moved part, and the moved part can remain fixed position in a desired position after the part ceases movement.

In some instances, hinge assemblies described herein may include multiple straps. The multiple straps can be used to increase the overall stiffness of the hinge assembly. Alternatively, each strap may provide a specific function. For example, one strap may keep the roller elements in a desired frictional engagement, while another strap provides stiffness. Further, additional strap may include a flexible circuit designed to route electrical signals between operational components of the system. Accordingly, in some instances, one housing part connected to the hinge assembly may include a display assembly, while another housing part connected to the hinge assembly may include a processor circuit. The strap used as a flexible circuit may electrically connect to the display assembly to the processor circuit to place the display assembly and the processor circuit in electrical communication with each other.

These and other embodiments are discussed below with reference to FIGS. 1-106. However, those skilled in the art will readily appreciate that the detailed description given herein with respect to these Figures is for explanatory purposes only and should not be construed as limiting.

FIG. 1 illustrates an isometric view of an embodiment of a system 100 having a first housing part 102a and a second housing part 102b coupled to a hinge assembly 104, in accordance with some described embodiments. The hinge assembly 104 is designed to allow relative movement of the first housing part 102a with respect to the second housing part 102b, and vice versa. The hinge assembly 104 may include several roller elements (not labeled) along with several spacer elements (not labeled), with a spacer element positioned between adjacent roller elements. As shown, the system 100 is an open position, with the first housing part 102a rotated away from the second housing part 102b, but can transition to other positions. These features will be shown and described below.

Although not shown, in some embodiments, at least one of the first housing part 102a and the second housing part 102b carries a display assembly designed to present visual information in the form of text and images (video or still images). Further, although not shown, in some embodiments, at least one of the first housing part 102a and the second housing part 102b carries an input mechanism (or multiple input mechanisms) including keyboard assembly and a touch pad, each of which is capable of providing a command or input to a processor circuit (not shown) within at least one of the first housing part 102a and the second housing part 102b, with the input or command being used to control the display assembly. Also, the system 100 is designed such that the hinge assembly 104 lies outside, or at least substantially outside, the first housing part 102a and the second housing part 102b. In this manner, when the first housing part 102a and/or the second housing part 102b carry the above-referenced components, the first housing part 102a and the second housing part 102b can include additional space or internal volume that would otherwise be occupied by the hinge assembly 104.

Figure 2:
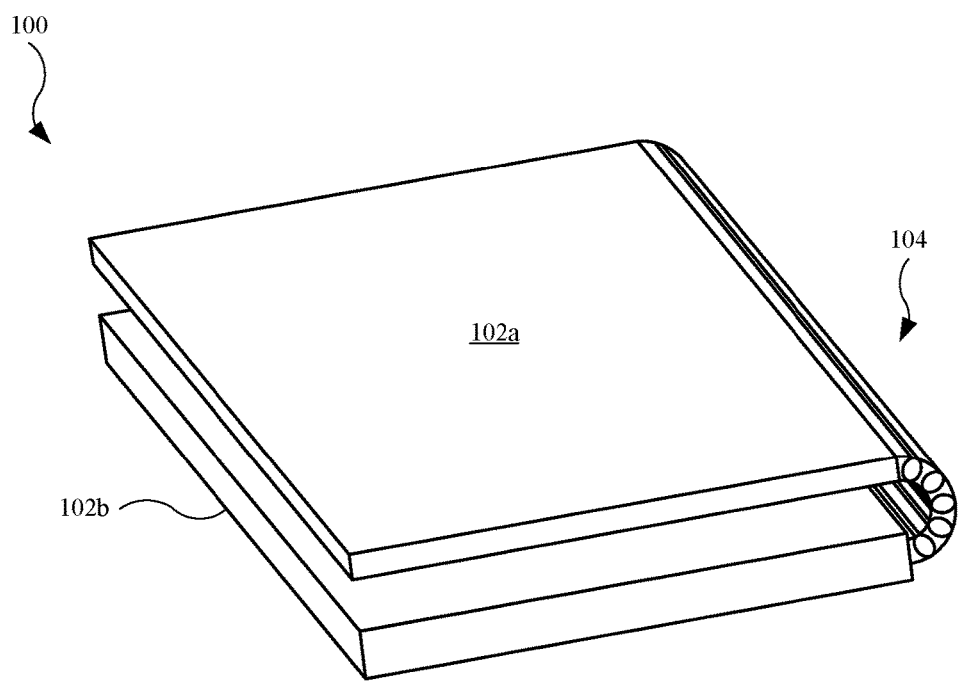
FIG. 2 illustrates an isometric view of the system shown in FIG. 1, with the system transitioned to a closed position.

FIG. 2 illustrates an isometric view of the system 100 shown in FIG. 1, with the system 100 transitioned to a closed position. The hinge assembly 104 allows the first housing part 102a to rotate or pivot over the second housing part 102b. As shown, in the closed position, the first housing part 102a covers, or at least substantially, covers the second housing part 102b. Referring again to FIG. 1, the "open position" may refer to the first housing part 102a being folded away from the second housing part 102b such that first housing part 102a is positioned 180 degrees, or at least approximately 180 degrees, away from the second housing part 102b. Also, phrases such as "partially open position" and "partially closed position" may be used throughout this detailed description to refer to a position or positions in which the first housing part 102a and the second housing part 102b are in a position (relative to each other) between the open position and the closed position. Accordingly, the hinge assembly 104 provides the system 100 with flexibility and allows for several different positions.

Figure 3:
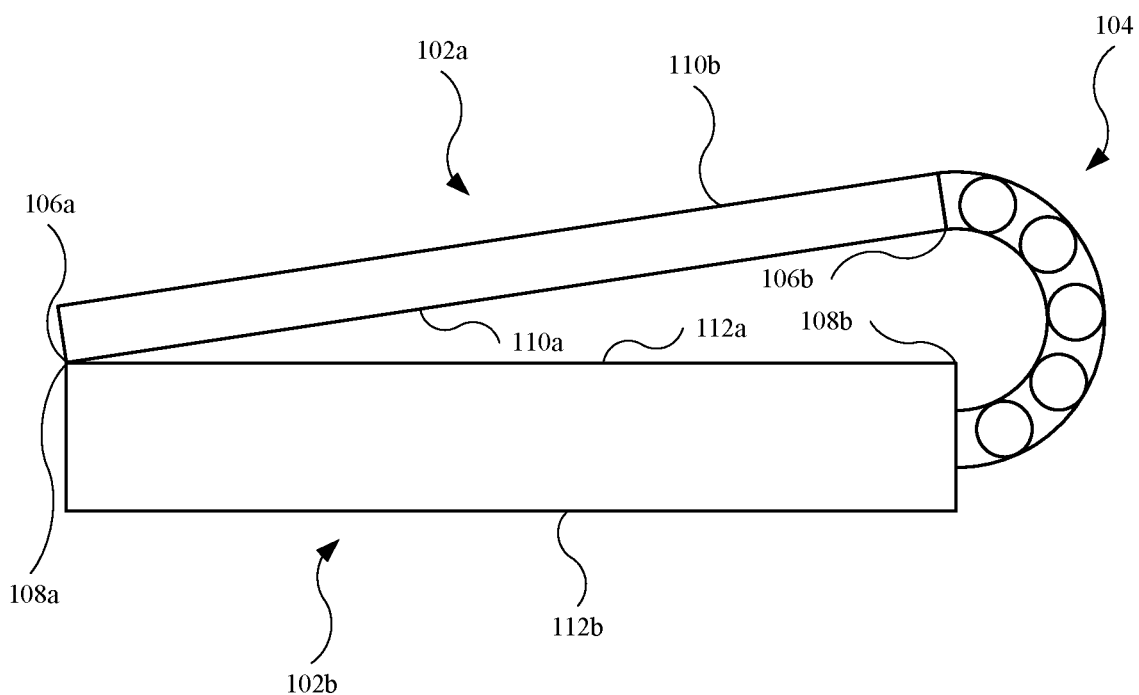
FIG. 3 illustrates a side view of the system shown in FIGS. 1 and 2, showing the first housing part in contact with the second housing part.

FIG. 3 illustrates a side view of the system 100 shown in FIGS. 1 and 2, showing the first housing part 102a in contact with the second housing part 102b. As shown, the hinge assembly 104 allows at least partial contact between the first housing part 102a and the second housing part 102b. For example, the hinge assembly 104 may allow movement of the first housing part 102a relative to the second housing part 102b such that a first edge 106a of the first housing part 102a can contact a first edge 108a of the second housing part 102b. Although not shown, the hinge assembly 104 may allow movement of the first housing part 102a relative to the second housing part 102b such that a second edge 106b of the first housing part 102a can contact a second edge 108b of the second housing part 102b, even without contact between the first edge 106a and the first edge 108a. Further, the hinge assembly 104 may allow movement of the first housing part 102a relative to the second housing part 102b such that a first surface 110a of the first housing part 102a can lie on or over a first surface 112a of the second housing part 102b. Further, the hinge assembly 104 may allow the first housing part 102a to rotate relative to the second housing part 102b such that a second surface 110b of the first housing part 102a can lie on or over a second surface 112b of the second housing part 102b.

Figure 4:
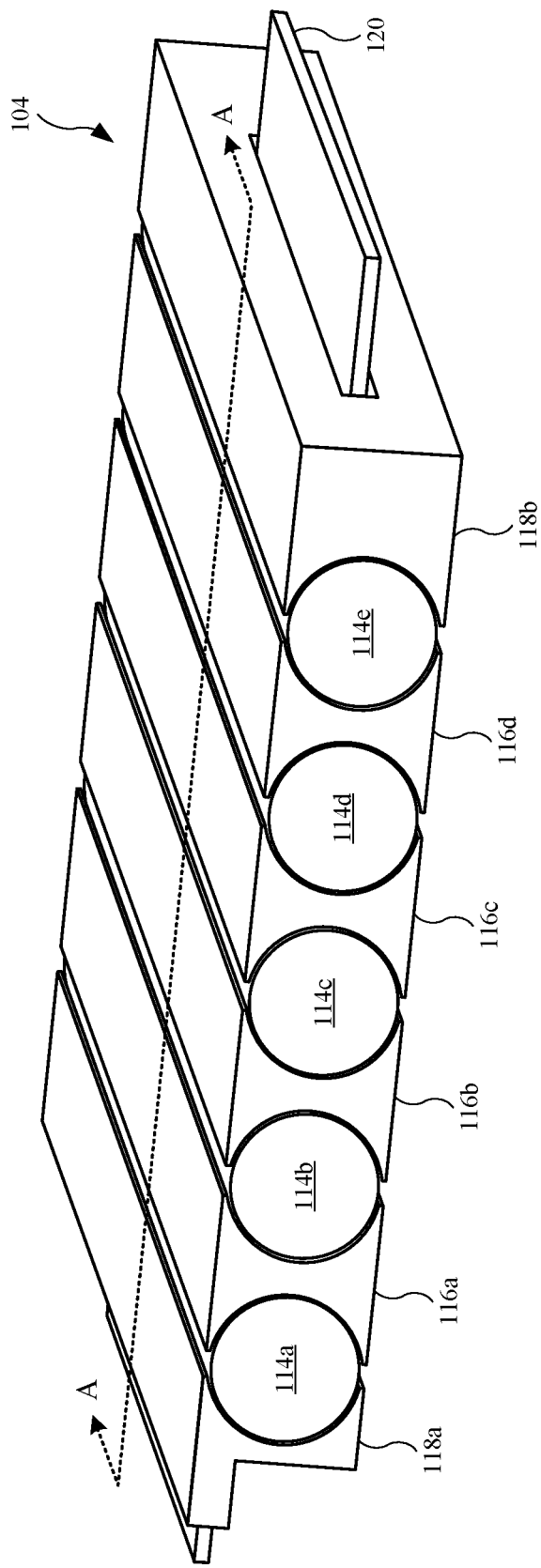
FIG. 4 illustrates an isometric view of the hinge assembly.

FIG. 4 illustrates an isometric view of the hinge assembly 104. The hinge assembly 104 may include several roller elements, such as a first roller element 114a, a second roller element 114b, a third roller element 114c, a fourth roller element 114d, and a fifth roller element 114e. The hinge assembly 104 may further include several spacer elements, such as a first spacer element 116a, a second spacer element 116b, a third spacer element 116c, and a fourth spacer element 116d. As shown, a spacer element can be positioned between adjacent roller elements. For example, the first spacer element 116a is positioned between the first roller element 114a and the second roller element 114b. Also, the first spacer element 116a includes a concave design to receive, or at least partially receive, the first roller element 114a and the second roller element 114b. The concave design of the first spacer element 116a further allows the first roller element 114a and the second roller element 114b to slide, or rotationally move, along the first spacer element 116a. While a discrete number of roller elements and spacer elements are shown, the number of roller elements and spacer elements may vary for the hinge assembly 104. Generally, for n roller elements in a hinge assembly 104, there will be n−1 spacer elements. However, in some instances, for n spacer elements in a hinge assembly 104, there will be n−1 roller elements.

The hinge assembly 104 may further include a first housing attachment 118a and a second housing attachment 118b designed to secure with the first housing part 102a and the second housing part 102b (shown in FIGS. 1 and 2), respectively. However, in some instances, the first housing part 102a includes a concave portion and the second housing part 102b includes a concave portion to receive the first roller element 114a and the fifth roller element 114e, respectively, and the first housing attachment 118a and the second housing attachment 118b are not required.

Also, the hinge assembly 104 may further include a strap 120 that passes or extends through the aforementioned roller elements, spacer elements, and housing attachment elements. The strap 120 is designed to maintain an engagement between the roller elements, the spacer elements, and the housing attachment elements. Further, in some instances, the strap 120 can maintain the hinge assembly 104, and in turn the system 100 (shown in FIGS. 1 and 2), in a desired position or configuration. In this regard, the strap 120 may provide the hinge assembly 104 with stiffness such that when, for example, a force is provided to the first housing part 102a (shown in FIGS. 1 and 2) that moves or rotates the first housing part 102a relative to the second housing part 102b (shown in FIGS. 1 and 2), the first housing part 102a maintains its position when the force to the first housing part 102a is no longer provided. Accordingly, the strap 120 may be referred to as a stiffening element. Also, the stiffness of the strap 120 (as well as the additional stiffness provided by any additional straps, when applicable) may provide the hinge assembly 104 with synchronous motion. This will be shown and discussed below.

The strap 120 may include a material (or materials) such as a metal (including steel), glass fiber, and/or carbon fiber. Also, the material and the thickness of the strap 120 are selected to allow the hinge assembly 104 to include a desired bend radius as well as a desired stiffness. The thickness of the strap 120 may be proportional to the stiffness, and inversely proportional to the bend radius. Accordingly, the thickness should be selected to achieve desired properties of the hinge assembly 104. One end of the strap 120 may be positioned within the first housing part 102a (shown in FIGS. 1 and 2), while the other (opposite) end may be positioned within the second housing part 102b (shown in FIGS. 1 and 2), with fasteners (as a non-limiting example) used to secure each end of the strap 120 with a respective housing part. Also, at least one end of the strap 120 may be secured to a tensioning element (not shown in FIG. 4) designed to provide a pulling force, and thereby providing tension, to the strap 120. This will be shown and described below.

Figure 5:
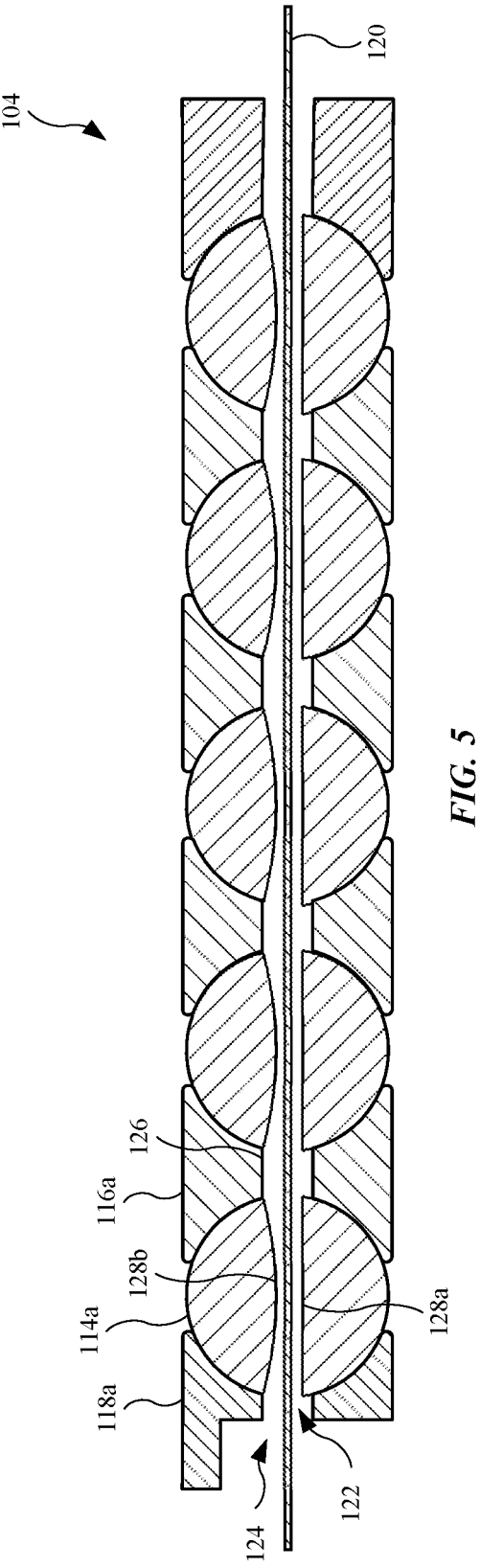
FIG. 5 illustrates a cross sectional view of the hinge assembly shown in FIG. 4, taken along line A-A, showing the strap extending through the roller elements and the spacer elements.

FIG. 5 illustrates a cross sectional view of the hinge assembly 104 shown in FIG. 4, taken along line A-A, showing the strap 120 extending through the roller elements and the spacer elements. As shown, each of the roller elements, the spacer elements, and the housing attachment elements includes an opening, or through hole, that is generally aligned with an adjacent and engaging element. This allows for the strap 120 to pass through the elements. For example, the first roller element 114a is adjacent to and engaged with the first spacer element 116a and the first housing attachment 118a. The first roller element 114a includes an opening 122 that is aligned, or at least partially aligned, with an opening 124 of the first housing attachment 118a and an opening 126 of the first spacer element 116a. As a result, the strap 120 can readily pass through these elements via their respective openings, as well as the remaining elements, which include openings with a similar relationship. Also, as shown in FIG. 5, the roller elements may include an asymmetric opening. For example, the opening 122 of the first roller element 114a includes a flat surface 128a and a convex surface 128b. In this regard, when the hinge assembly 104 transitions to a closed position (see FIG. 2), the strap 120 bends and rests along the convex surface 128b of the first roller element 114a. Accordingly, the convex surface 128b can further accommodate the strap 120 in certain positions. Although not shown, the spacer elements and the housing attachment elements may include an opening with a surface similar to that of the convex surface 128b of the first roller element 114a.

While the hinge assembly 104 shown in FIGS. 3-5 includes a single strap, the hinge assembly 104 may include multiple straps in addition to the strap 120. Further, each strap may include different materials, and accordingly, different functions. For example, when the hinge assembly 104 includes three straps, a first strap can be used to maintain an engagement between the roller elements, the spacer elements, and the housing attachment elements. A second strap can be used to provide stiffness to the hinge assembly 104 and maintain the hinge assembly 104 (and the system 100, in FIGS. 1 and 2) in a desired position. A third strap can be used as a flexible circuit that provides electrical communication between operational components in the first housing part 102a (shown in FIGS. 1 and 2), such as a display assembly and/or a processor circuit, and operational components in the second housing part 102b (shown in FIGS. 1 and 2), such as a keyboard assembly, a touch pad, and a display function bar. Alternatively, in some embodiments, the strap 120 defines a single strap in the hinge assembly 104 that provides all three functions. Accordingly, in some embodiments, the strap 120 maintains engagement between the various elements of the hinge assembly 104, provides a stiffening feature, and also provides an electrical communication pathway between operational components in the housing parts.

Figure 6:
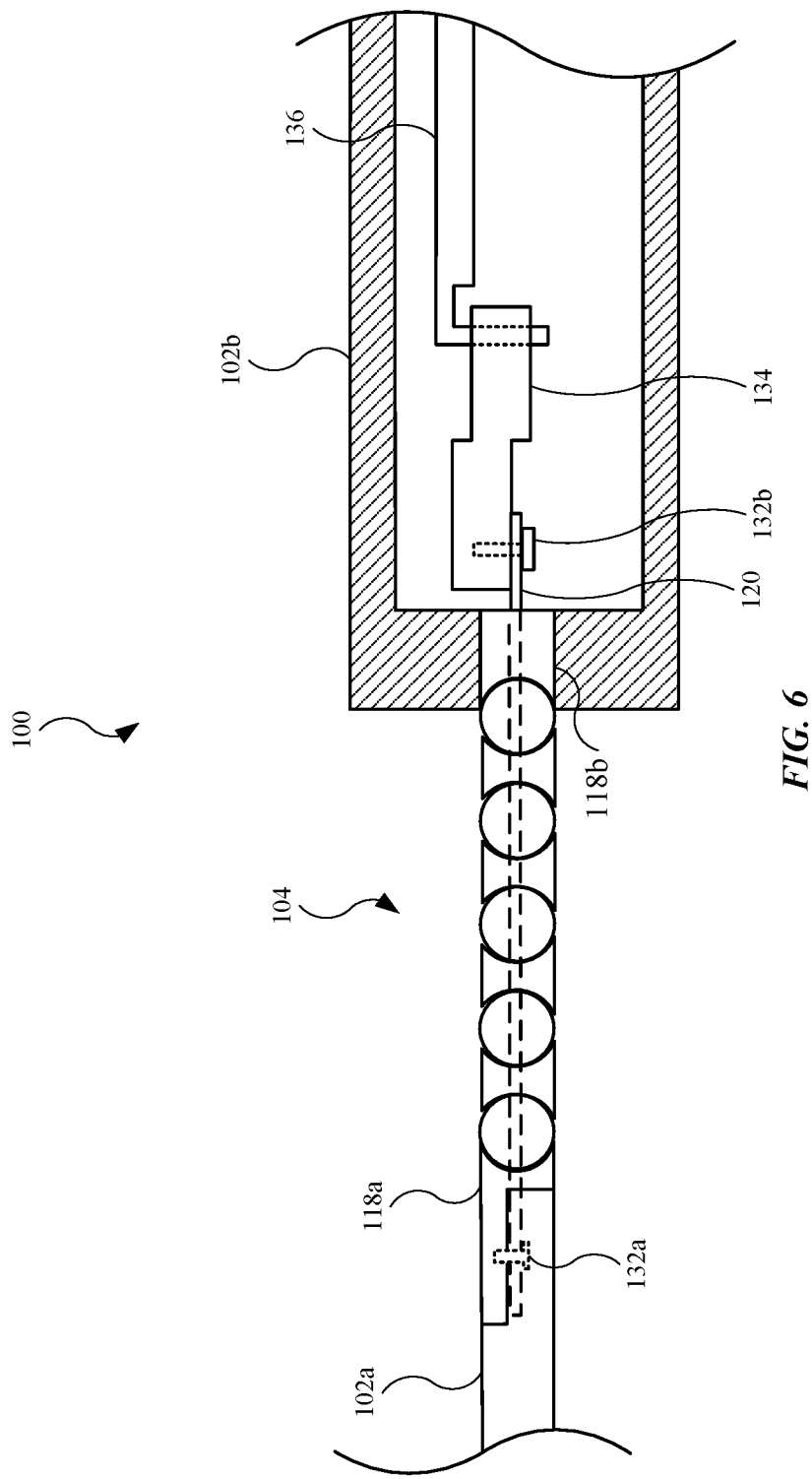
FIG. 6 illustrates a partial cross sectional view of the system in the open position, showing several additional structural features of the hinge assembly.

FIG. 6 illustrates a partial cross sectional view of the system 100 in the open position, showing several additional structural features of the hinge assembly 104. As shown, the first housing attachment 118a and the second housing attachment 118b are positioned in, and secured to, the first housing part 102a and the second housing part 102b, respectively. Also, one end of the strap 120 is positioned in the first housing part 102a while another opposing end of the strap 120 is positioned in the second housing part 102b. The system 100 may include a first fastener 132a that secures one end of the strap 120 to the first housing part 102a, and may further include a second fastener 132b that secures the other opposing end of the strap 120 to a strap retention element 134. The strap retention element 134 is coupled to a tensioning element 136. As a result, the strap 120 may receive a pulling force from the tensioning element 136.

The pulling force provided by the tensioning element 136 is designed to provide tension to the strap 120. In this regard, when an end of the strap 120 is anchored to the first housing part 102a (as shown in FIG. 6), the strap 120, when pulled by the tensioning element 136, can provide an increased normal/perpendicular force to the roller elements and the spacer elements. As a result, the force provided by the strap 120, by way of the tensioning element 136, can increase the frictional forces between the roller elements and the spacer elements. This may enhance the experience of moving the first housing part 102a relative to the second housing part 102b, or vice versa. This may further enhance the ability of the strap 120 to maintain the first housing part 102a in one or more fixed positions relative to the second housing part 102b. In the embodiment shown in FIG. 6, the tensioning element 136 is a spring that provides a constant tension to the strap 120. However, in some embodiments (shown later), a tensioning element can provide an adjustable tension or adjustable pulling force to a strap.

The stiffness of the strap 120 may assist in providing synchronous motion of the roller elements and the spacer elements. For example, while the system 100 transitions from the open position (shown FIG. 1) to the closed position (shown FIG. 2), or vice versa, the roller elements and the spacer elements move in unison (with each of the roller elements rotating relative to the spacer elements). In other words, while the system 100 transitions from the open position to the closed position, or vice versa, both the roller elements and the spacer elements can move at the same time (although the amount of movement of each element may vary), while following the changing curvature of the strap 120 from a generally straight configuration (in the open position) to a substantially curved configuration (in the closed position). In this regard, the stiffness of the strap 120 can influence the motion of the roller elements and the spacer elements, and material makeup of the strap 120 should be selected to provide a desired stiffness and a desired movement (such as a desired synchronous motion) of the roller elements and spacer elements. It should be noted that the coordinated movement of the roller elements and the spacer elements refers to two-dimensional movement, and accordingly, the roller elements may simultaneously roll and move in two-dimension. This will be shown and discussed below.

Figure 7:
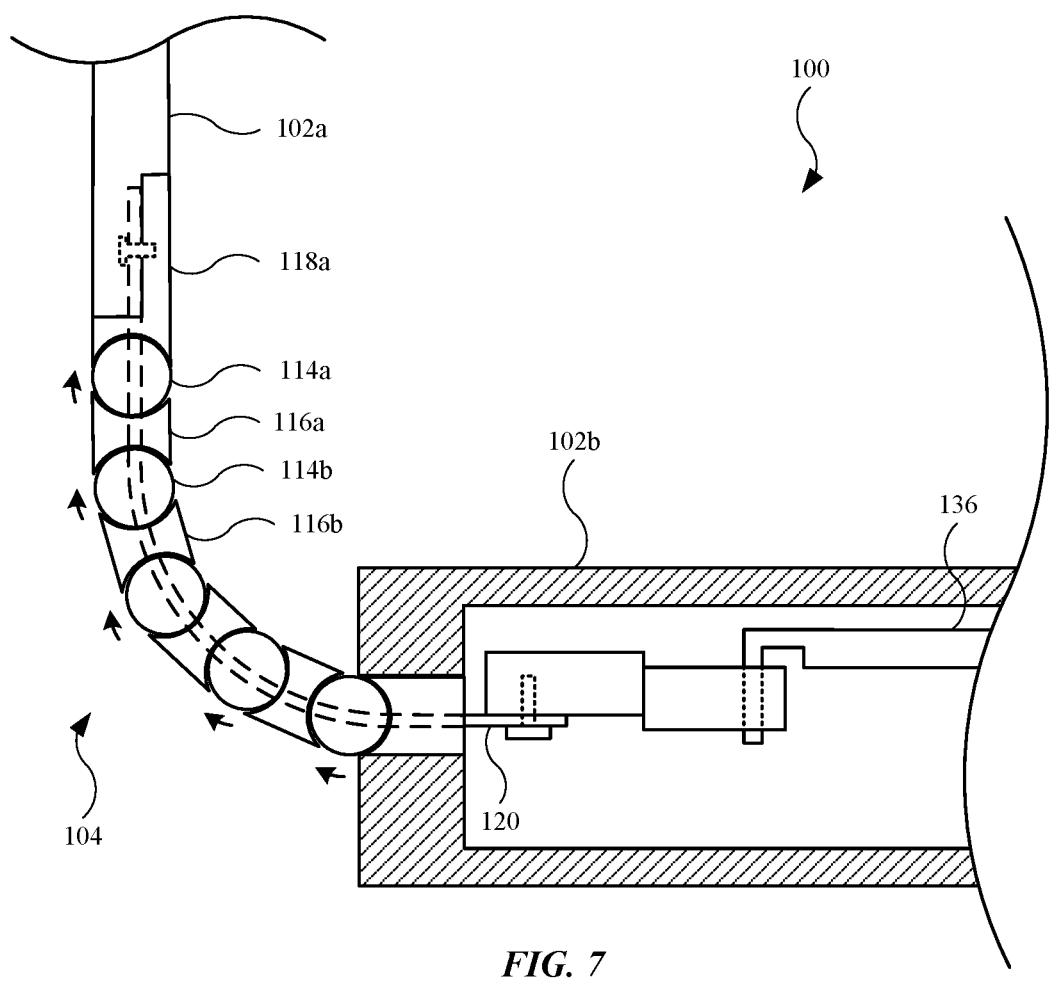
FIG. 7 illustrates a partial cross sectional view of the system shown in FIG. 6, showing the system transitioning from the open position to a partially closed position.

FIG. 7 illustrates a partial cross sectional view of the system 100 shown in FIG. 6, showing the system 100 transitioning from the open position to a partially closed position. A "partially closed position," which refers to a position other than the open or closed position, and can be used interchangeably with "a partially open position." As shown, the hinge assembly 104 allows the first housing part 102a to move or rotate relative to the second housing part 102b. During the movement of the first housing part 102a, each of the roller elements can rotationally move (or roll or slide) relative to the spacer elements, as indicated by the arrows. For example, during movement of the first housing part 102*a* (relative to the second housing part 102*b*), the first roller element 114*a* can rotationally move along a concave surface of the first spacer element 116*a* and along a concave surface of the first housing attachment 118*a*. Also, the second roller element 114*b* can also rotate (at the same time as the first roller element 114*a*), during movement of the first housing part 102*a*, along a concave surface of the first spacer element 116*a* and along a concave surface of the second spacer element 116*b*. The remaining roller elements may also rotate in a similar manner with respect to their respective spacer elements. Further, during movement of the first housing part 102*a* relative to the second housing part 102*b*, the spacer elements and the roller elements may move in two dimensions, while the roller elements are rotating/rolling along the concave surfaces of the spacer elements. This is due in part to the strap 120 and the pulling force provided to the strap 120 from the tensioning element 136.

Figure 8:
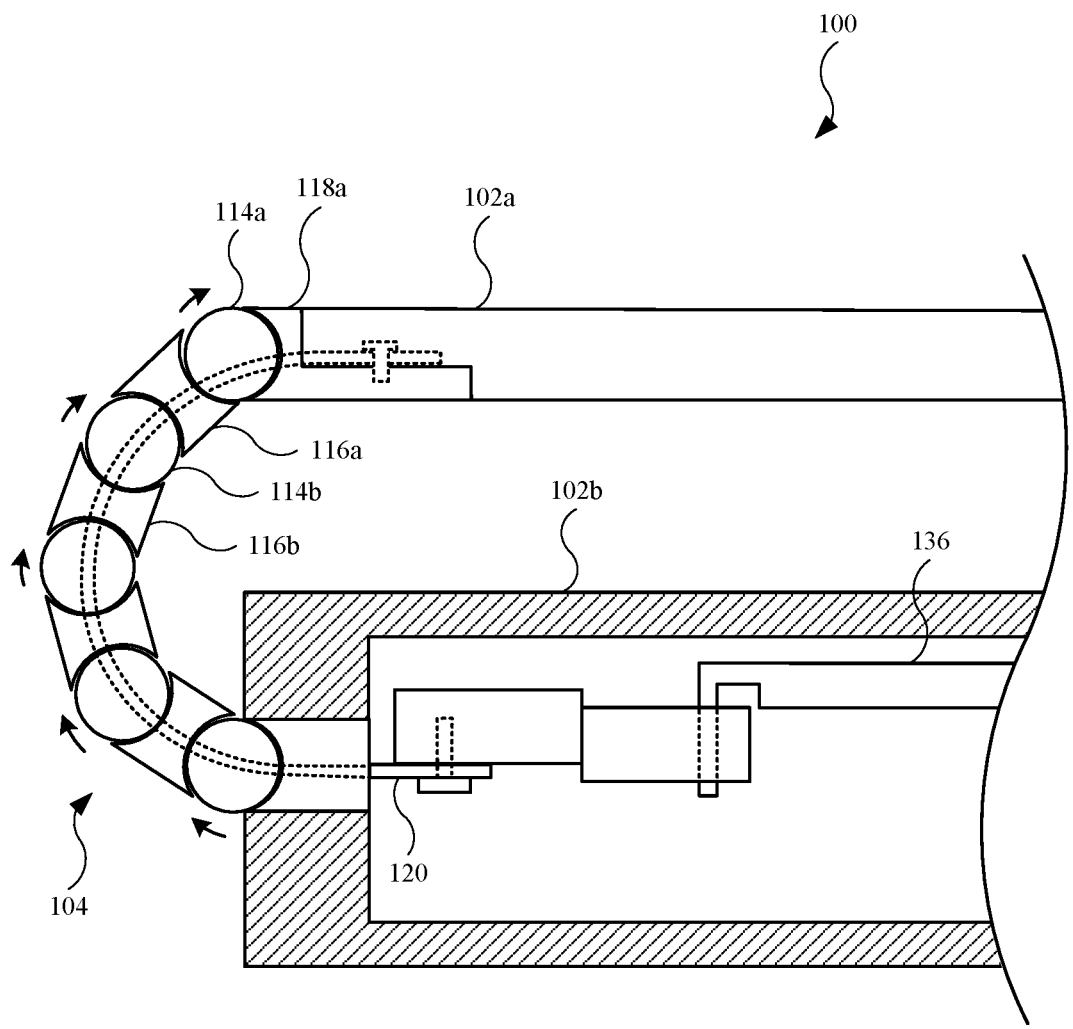
FIG. 8 illustrates an enlarged side view of the system shown in FIG. 7, showing the system transitioning from the partially closed position to the closed position.

FIG. 8 illustrates an enlarged side view of the system 100 shown in FIG. 7, showing the system 100 transitioning from the partially closed position to the closed position. As shown, during movement of the first housing part 102*a* relative to the second housing part 102*b*, the structural elements of the hinge assembly 104 can synchronously move together. For example, similar to the partially closed position (shown in FIG. 7), during movement of the first housing part 102*a* relative to the second housing part 102*b*, the first roller element 114*a* continues to rotate or roll along a concave surface of the first spacer element 116*a* and along a concave surface of the first housing attachment 118*a*. At the same time, the second roller element 114*b* can continue to rotate along a concave surface of the first spacer element 116*a* and along a concave surface of the second spacer element 116*b*. The remaining roller elements may also rotate in a similar manner with respect to their respective spacer elements. Further, during movement of the first housing part 102*a* relative to the second housing part 102*b*, the spacer elements and the roller elements may continue move in two dimensions, while the roller elements continue rotating/rolling along the concave surfaces of the spacer elements, until the system 100 reaches the closed position.

While FIGS. 6-8 illustrate an example of the system 100 transitioning from the open position to the closed position, it should be understood that the roller elements and the spacer elements move in a synchronous manner when the system 100 transitions from the closed position to the open position. However, the roller elements may rotate in rotational direction that is opposite to what is shown in FIGS. 6-8. In other words, if the roller elements rotate in a clockwise manner from the open position to the closed position, the roller elements will rotate in a counter-clockwise manner from the open position to the closed position. Also, when transitioning from the closed position to the open position, the synchronous movement of the roller elements and the spacer elements will mirror the movement from the open position to the closed position.

Figure 9:
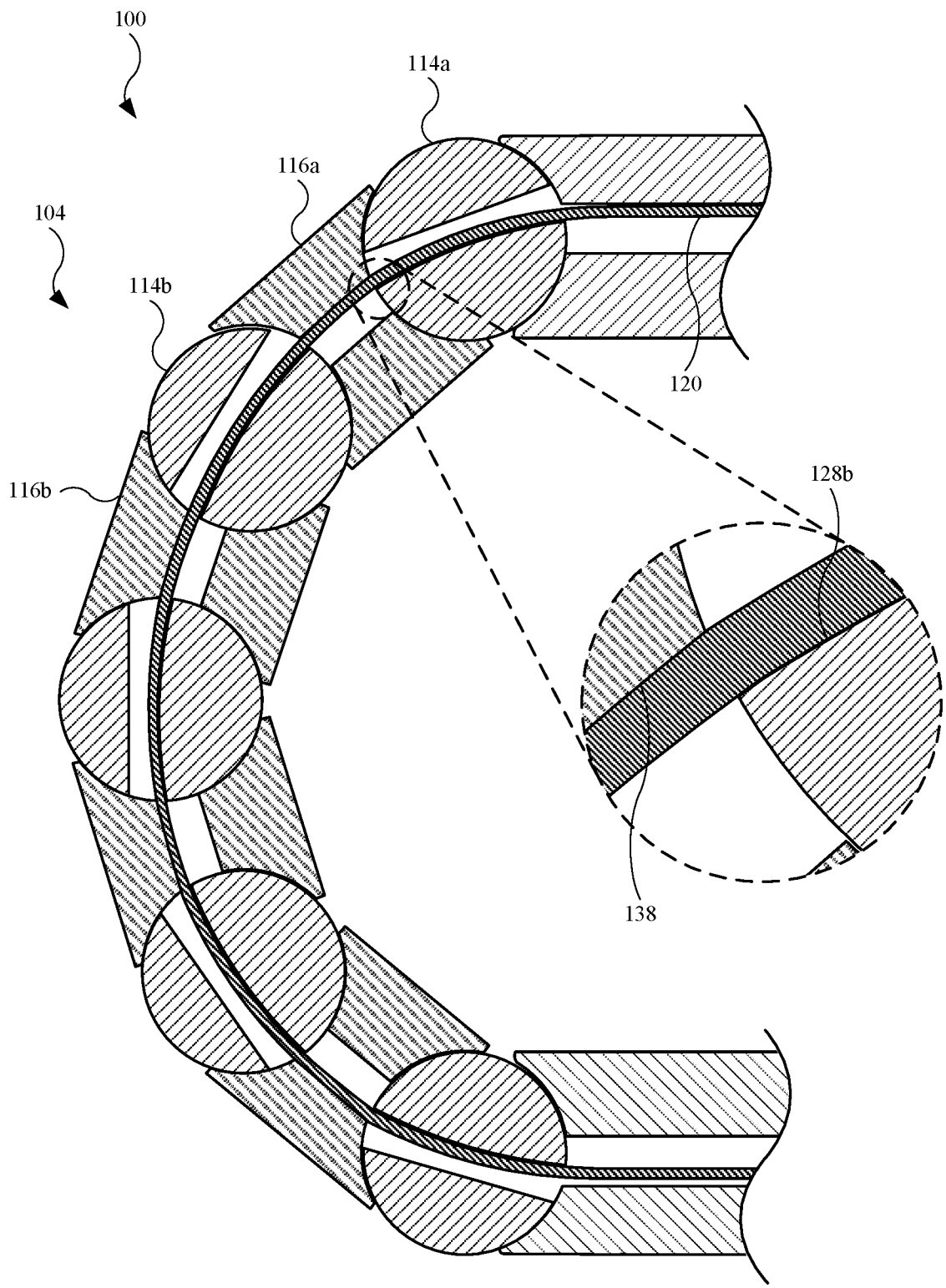
FIG. 9 illustrates an enlarged cross sectional view of the system and the hinge assembly in the closed position, showing various interactions between the strap, the roller elements, and the spacer elements.

FIG. 9 illustrates an enlarged cross sectional view of the system 100 and the hinge assembly 104 in the closed position, showing various interactions between the strap 120, the roller elements, and the spacer elements. As shown in FIG. 9, when the system 100 is in the closed position, some elements of the hinge assembly 104 may engage the strap 120, thereby providing a mechanical stop. For example, the strap 120 can become pinched or clamped between the first roller element 114*a* and the first spacer element 116*a*. As shown in the enlarged view, in the closed position, the strap 120 may engage a portion (including an edge) of the convex surface 128*b* of the first roller element 114*a* and a portion of a surface 138 (including an edge of a top surface) of the first spacer element 116*a*. In the closed position, in order to further provide the mechanical stop, the strap 120 may engage additional roller elements and spacer elements in a similar manner. For example, the strap 120 may be pinched or clamped between the second roller element 114*b* and the second spacer element 116*b* in a manner similar to that of the first roller element 114*a* and the first spacer element 116*a* described above. In the closed position, the strap 120 may be pinched or clamped between each respective pair of a roller element and a spacer element, as shown in FIG. 9, and further provide mechanical stop of the hinge assembly 104.

Figure 10:
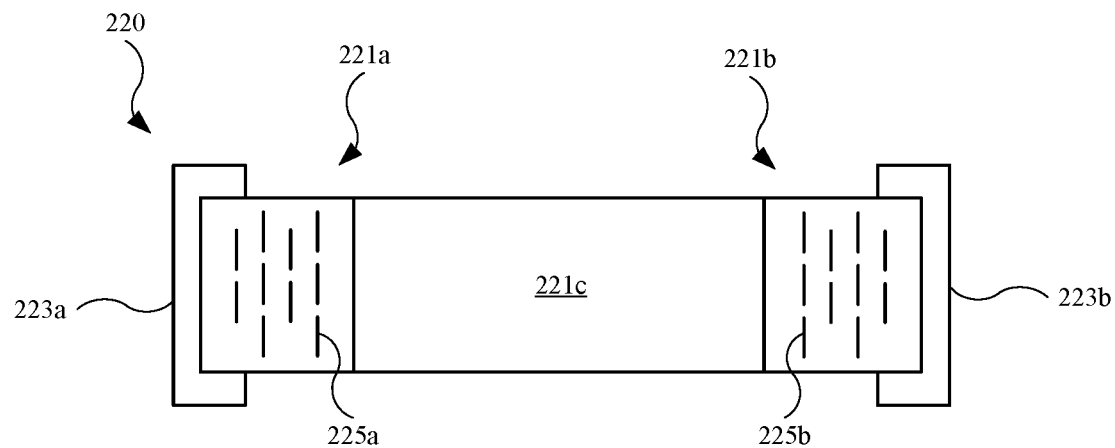
FIG. 10 illustrates a plan view of an alternate embodiment of a strap, in accordance with some described embodiments.

FIG. 10 illustrates a plan view of an alternate embodiment of a strap 220, in accordance with some described embodiments. The strap 220 may be integrated into one or more hinge assemblies (not shown in FIG. 10) described herein. The first end 221*a* and the second end 221*b* may include a first extension 223*a* and a second extension 223*b*, respectively. The strap 220 can be affixed with housing parts of a system (not shown in FIG. 10) by the first extension 223*a* and the second extension 223*b*. In this manner, the strap 220 does not need fastening holes.

Also, the central portion 221*c* may be formed from glass fiber in order to enhance resistance against stress and strain. As shown, the strap 220 may include one or more materials. For example, the strap 220 may include a first end 221*a* and a second end 221*b* connected with the first end 221*a* by a central portion 221*c*. For example, the first end 221*a* and the second end 221*b* may include a flexible or stretchable material, such as elastic (as a non-limiting example). The first end 221*a* and the second end 221*b* may include several cuts, or slits, that form small openings. For example, the strap 220 may include a first cut 225*a* and a second cut 225*b*, representative of several additional cuts.

Figure 11:
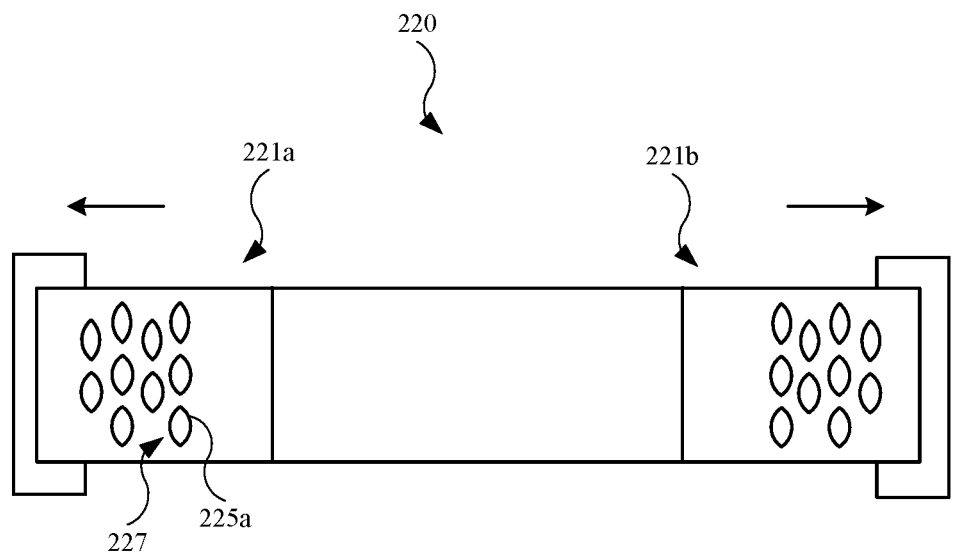
FIG. 11 illustrates a plan view of the strap shown in FIG. 10, showing the strap pulled in tension.

FIG. 11 illustrates a plan view of the strap 220 shown in FIG. 10, showing the strap 220 pulled in tension, as denoted by forces represented by arrows pointed in opposite directions. As shown, when the strap 220 is pulled in tension, the strap 220 can elongate along the first end 221*a* and the second end 221*b*. This is due in part to the stretchable characteristics of the first end 221*a* and the second end 221*b*, along with the first end 221*a* and the second end 221*b* separating along the cuts to form openings. For example, the first end 221*a* includes an opening 227 (representative of several additional openings) defined by the first cut 225*a*. The stretching ability and the cuts to the first end 221*a* and the second end 221*b* provide the strap 220 with flexibility such that the strap 220 includes spring like characteristics. As a result, in some instances, a system that incorporates the strap 220 may not require a tensioning element 136 (shown in FIG. 6).

Figure 12:
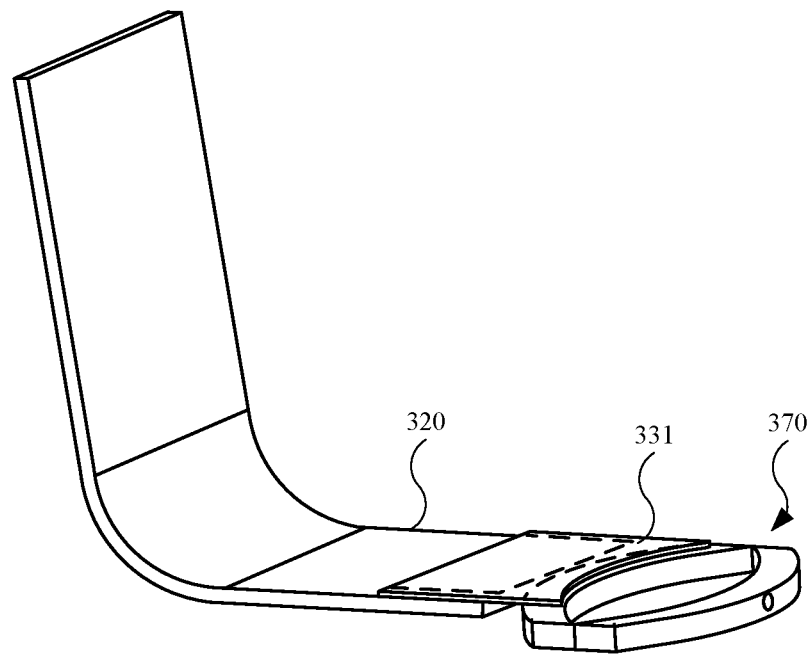
FIG. 12 illustrates an isometric view of an alternate embodiment of a strap connected to a tensioning element by a composite material.

FIG. 12 illustrates an isometric view of an alternate embodiment of a strap 320 connected to a tensioning element 370 by a composite material 331. The tensioning element 370 is designed to act as a spring and flex in response to a force, and may provide tension to the strap 320. The composite material 331 is designed to bond the strap 320 with the tensioning element 370. Further, the composite material 331 can be applied to the strap 320 and the tensioning element 370 when the strap 320 is in a bent configuration, as shown in FIG. 12. In this manner, the composite material 331 can cure without inducing stresses on the strap 320.

Figure 13:
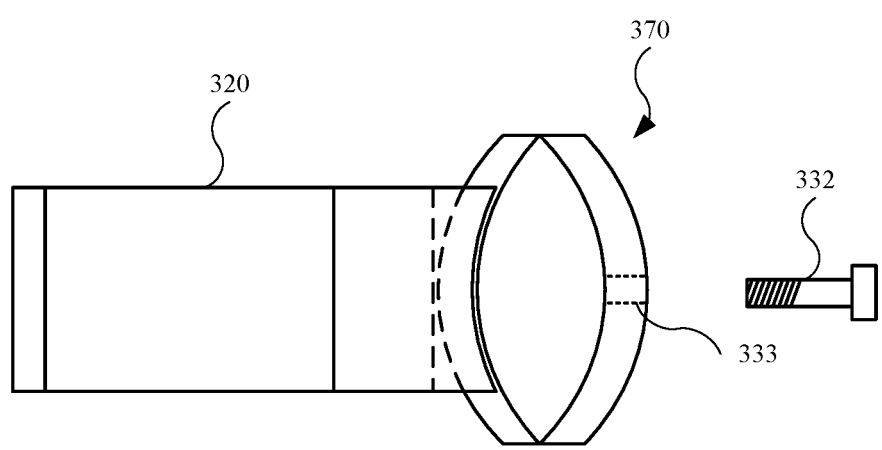
FIG. 13 illustrates a plan view of the strap shown in FIG. 12, showing a fastener capable of coupled with the tensioning element.

FIG. 13 illustrates a plan view of the strap 320 shown in FIG. 12, showing a fastener 332 capable of coupled with the tensioning element 370. The fastener 332 may pass through an opening 333 of the tensioning element 370 and secure to the tensioning element 370. The fastener 332 can be used to couple the strap 320 with housing part of a system (not shown in FIG. 13).

Figure 14:
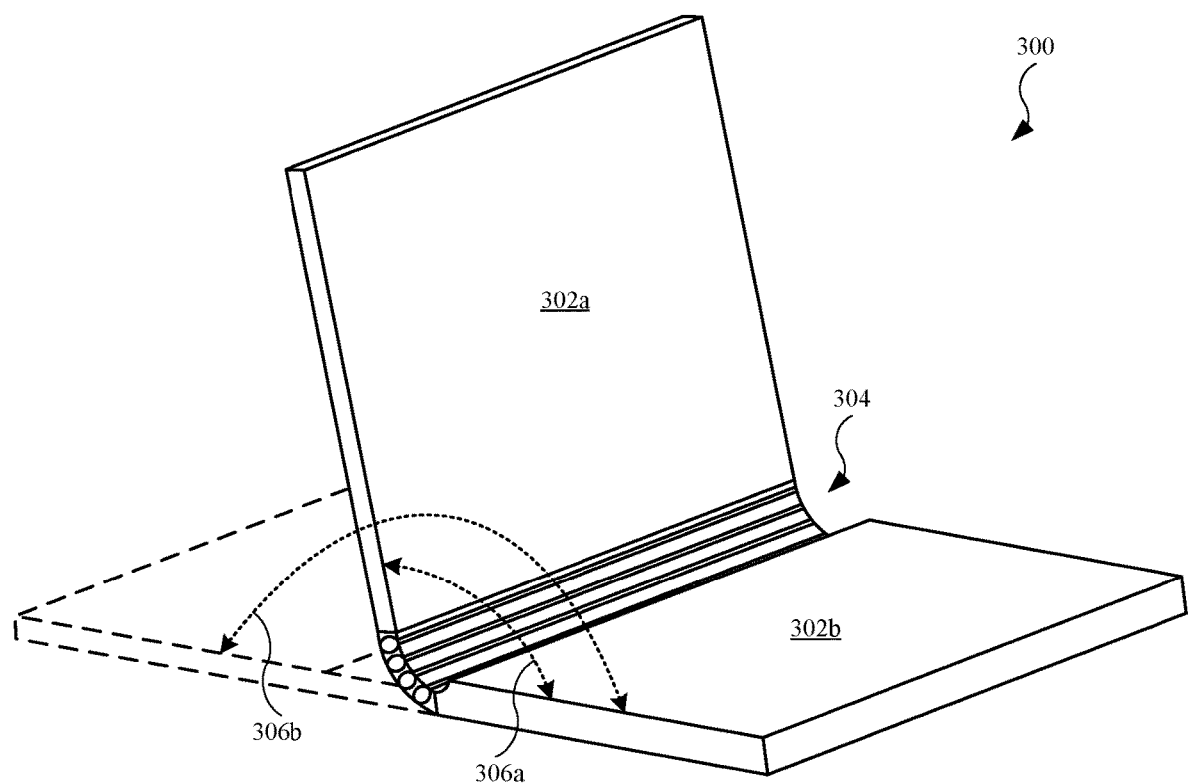
FIG. 14 illustrates an isometric view of an alternate embodiment of a system, in accordance with some described embodiments.

FIG. 14 illustrates an isometric view of an embodiment of a system 300, in accordance with some described embodiments. The system 300 may include a first housing part 302a and a second housing part 302b. In some embodiments, the system 300 includes a laptop computer. In this regard, the first housing part 302a may include a display housing that carries a display (not shown in FIG. 10) designed to present visual information in the form of still and motion images. Also, the second housing part 302b may include a keyboard and a touch input pad (not shown in FIG. 10) designed to provide inputs to a central processing unit (not shown in FIG. 10).

The system 300 may further include a hinge assembly 304 connected to the first housing part 302a and the second housing part 302b. The hinge assembly 304 is designed to allow relative movement of the first housing part 302a with respect to the second housing part 302b, and vice versa. The hinge assembly 304 may include several roller elements along with several spacer elements, with a spacer element positioned between consecutive roller elements. This will be shown and described below.

As shown in FIG. 14 the hinge assembly 304 positions the system 300 in an open position. When the system 300 is a laptop computer, the open position is associated with a configuration in which the display, keyboard, and touch input pad are available for use. The open position may be associated with the first housing part 302a positioned at an angle 306a with respect to the second housing part 302b. The angle 306a may be approximately in the range of 90 to 135 degrees. In some embodiments, the angle 306a is 135 degrees. Further, in some embodiments, the angle 306a represents the maximum angular displacement, or maximum rotational movement, of the first housing part 302a with respect to the second housing part 302b. In this regard, the hinge assembly 304 may limit the angle 306a of the system. This will be further shown and described below. In some instances, as depicted by the dotted lines, the hinge assembly 304 may allow the first housing part 302a to travel to an angle 306b of approximately 180 degrees with respect to the second housing part 302b, in which the first housing part 302a is co-planar with respect to the second housing part 302b.

Figure 15:
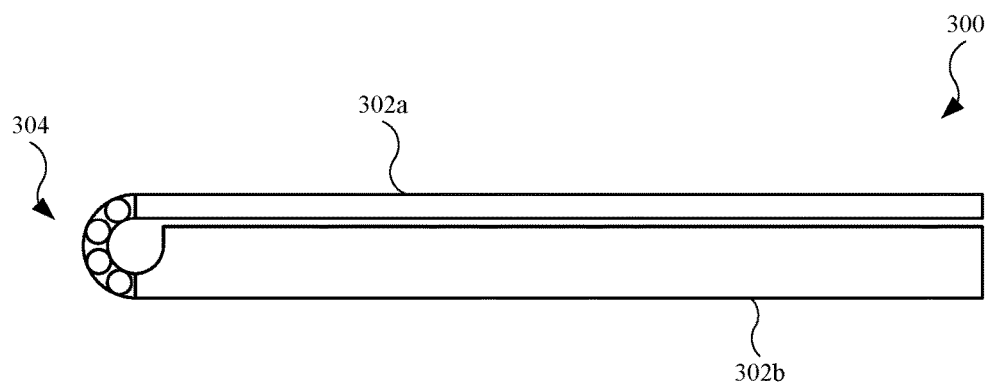
FIG. 15 illustrates a side view of the system shown in FIG. 14.

FIG. 15 illustrates a side view of the system 300 shown in FIG. 14. As shown in FIG. 15, the system 300 is in a closed position, in which the hinge assembly 304 allows the first housing part 302a to rotate with respect to the second housing part 302b, and position the first housing part 302a over the second housing part 302b such that the first housing part 302a is parallel, or at least approximately parallel, with respect to the second housing part 302b. As a result, the angular position of the first housing part 302a with respect to the second housing part 302b is zero. The closed position is generally associated with portability of the system 300 when the system 300 is not in use.

Figure 16:
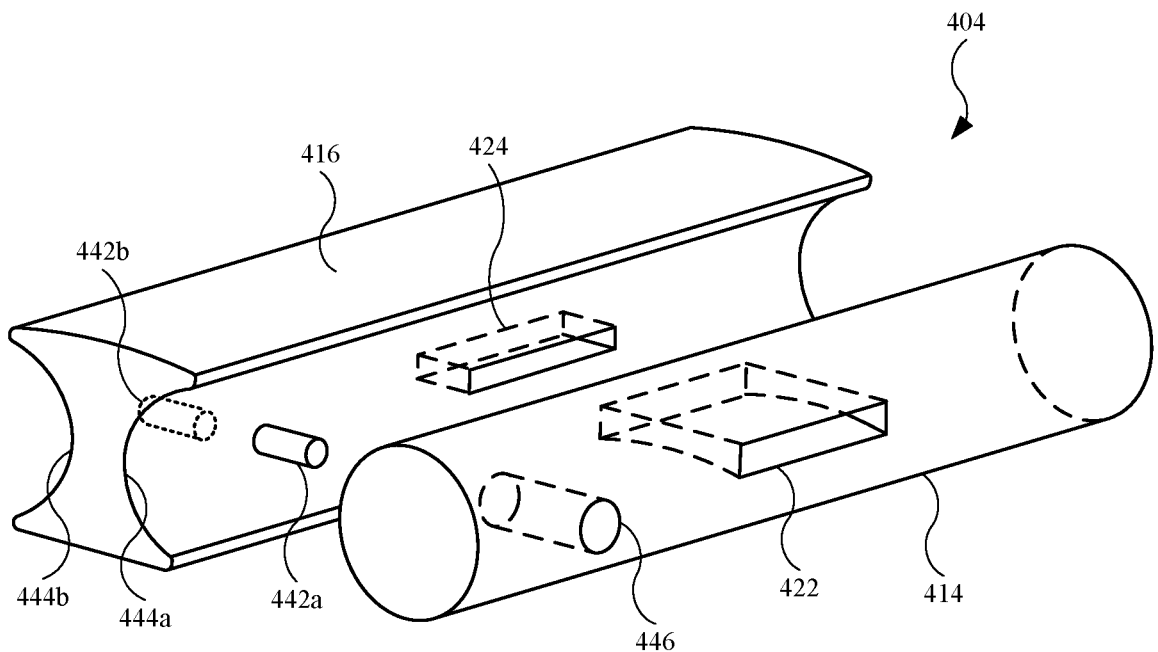
FIG. 16 illustrates an isometric view of a roller element and a spacer element of an alternate embodiment of a hinge assembly, in accordance with some described embodiments.

FIG. 16 illustrates an isometric view of a roller element 414 and a spacer element 416 of an alternate embodiment of a hinge assembly 404, in accordance with some described embodiments. As shown, the spacer element 416 may include a first protrusion 442a on a first concave surface 444a. The roller element 414 may include an opening 446. When the roller element 414 is paired with the spacer element 416, the first protrusion 442a can be positioned in the opening 446. Accordingly, the opening 446 may include a diameter greater than that of the first protrusion 442a. Further, the diameter of the opening 446 may be sufficiently larger than the diameter of the first protrusion 442a such that the roller element 414 can adequately rotate or roll along the first concave surface 444a when the hinge assembly 404 transitions a system (not shown in FIG. 16) from an open position to a closed position, or vice versa. Also, the roller element 414 may include an opening 422 and the spacer element 416 may include an opening 424 that aligns with the opening 422 so that the hinge assembly 404 can receive a strap (not shown in FIG. 16). The spacer element 416 may further include a second protrusion 442b on a second concave surface 444b, with the second protrusion 442b and the second concave surface 444b being substantially similar to the first protrusion 442a and the first concave surface 444a, respectively. Accordingly, the spacer element 416 can accommodate a second roller element (not shown in FIG. 16) that is substantially similar to the roller element 414.

Figure 17:
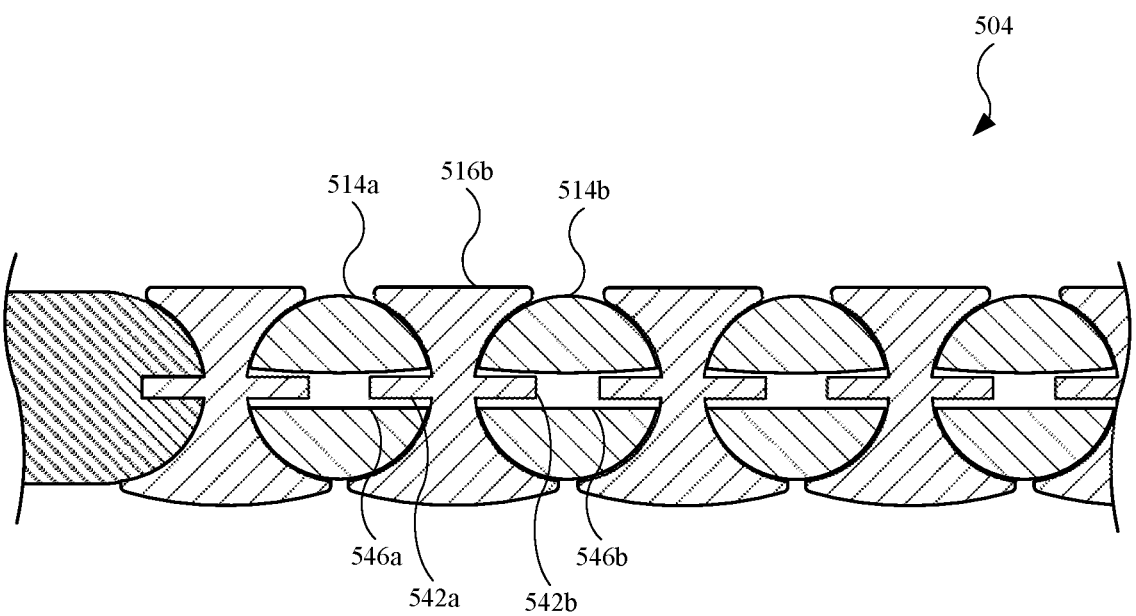
FIG. 17 illustrates a cross sectional view of a hinge assembly, showing multiple roller elements coupled with multiple spacer elements having protrusions positioned in the openings of the roller elements.

FIG. 17 illustrates a cross sectional view of a hinge assembly 504, showing multiple roller elements coupled with multiple spacer elements having protrusions positioned in the openings of the roller elements. As shown, the hinge assembly 504 includes a first spacer element 516a with multiple the concave surfaces designed to receive and engage a first roller element 514a and a second roller element 514b. Further, the first spacer element 516a includes a first protrusion 542a positioned in an opening 546a of the first roller element 514a. The first spacer element 516a includes a second protrusion 542b positioned in an opening 546b of the second roller element 514b. Although not labeled, the remaining roller elements and spacer elements may include similar properties and relationships.

Figure 18:
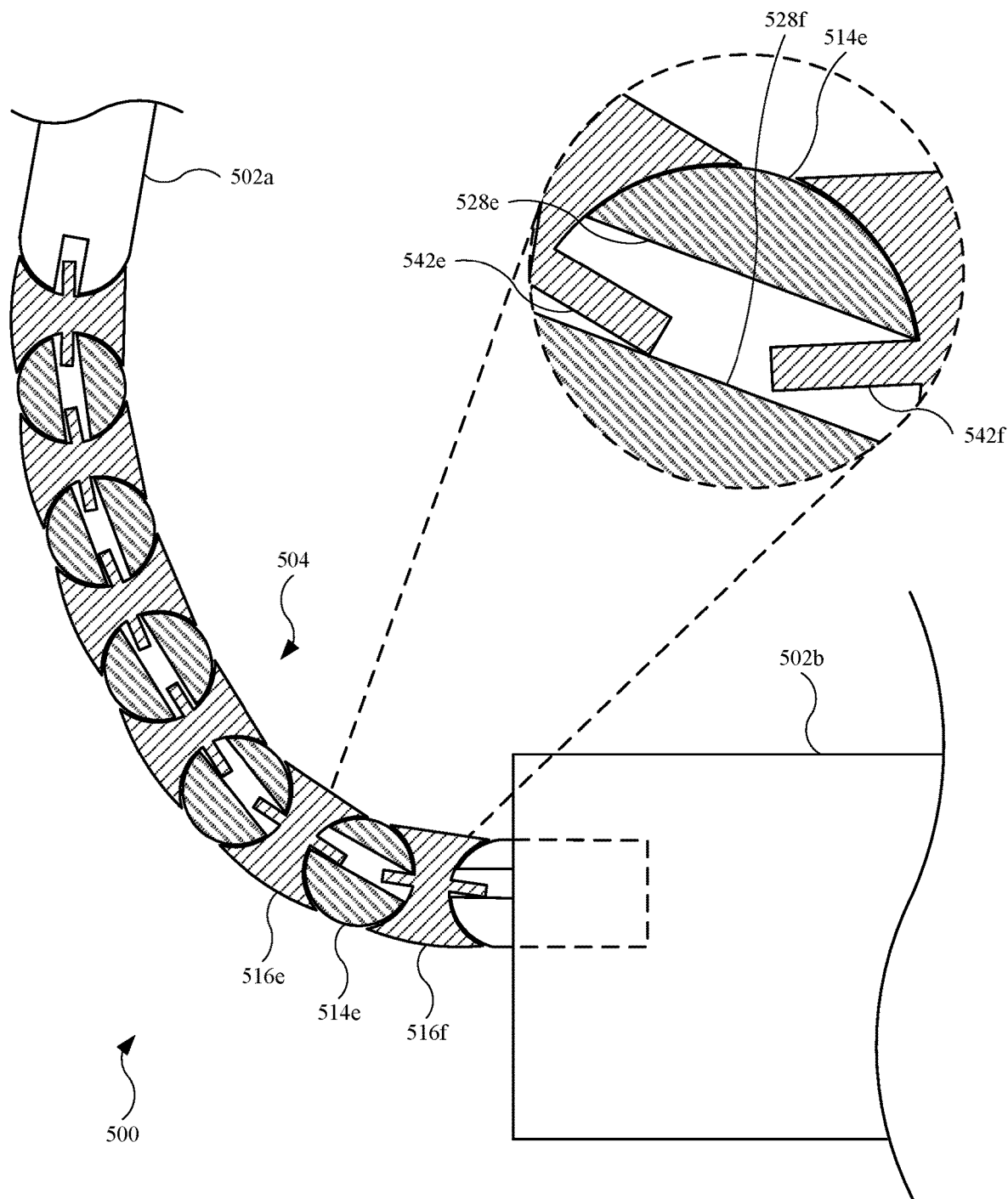
FIG. 18 illustrates an enlarged partial cross sectional view of an alternate embodiment of a system that includes the hinge assembly shown in FIG. 17, in accordance with some described embodiments.

FIG. 18 illustrates an enlarged partial cross sectional view of an alternate embodiment of a system 500 that includes the hinge assembly 504 shown in FIG. 17, in accordance with some described embodiments. The system 500 may include a first housing part 502a and a second housing part 502b, both of which are coupled to the hinge assembly 504 in a manner previously described. Also, although not shown, the hinge assembly 504 may include a strap that extends through the roller elements and spacer elements, and includes ends positioned in the first housing part 502a and the second housing part 502b. The hinge assembly 504 may also include a tensioning element coupled to an end of the strap, similar to a manner previously described.

As shown, when the first housing part 502a is sufficiently moved or rotated relative to the second housing part 502b, movement of some of the roller elements and spacer elements causes the protrusions (of the spacer elements) to engage a surface, or internal surface, of openings of the roller elements. For example, as shown in the enlarged view, the hinge assembly 504 includes a fifth roller element 514e (representing a roller element of the hinge assembly 504 that is nearest the second housing part 502b) that rotates with respect to a fifth spacer element 516e and a sixth spacer element 516f. The clockwise rotation of the fifth roller element 514e causes an edge of the fifth roller element 514e to become pinched between a surface 528e of the fifth roller element 514e and a protrusion 542f of the sixth spacer element 516f such that additional clockwise rotation of the fifth roller element 514e is prevented. The clockwise rotation of the fifth roller element 514e, combined with movement of the fifth spacer element 516e, causes a protrusion 542e of the fifth spacer element 516e to engage a surface 528f of the fifth roller element 514e such that additional movement of the fifth spacer element 516e is prevented. As a result, the hinge assembly 504 includes at least a partial mechanical stop at the fifth roller element 514e.

Figure 19:
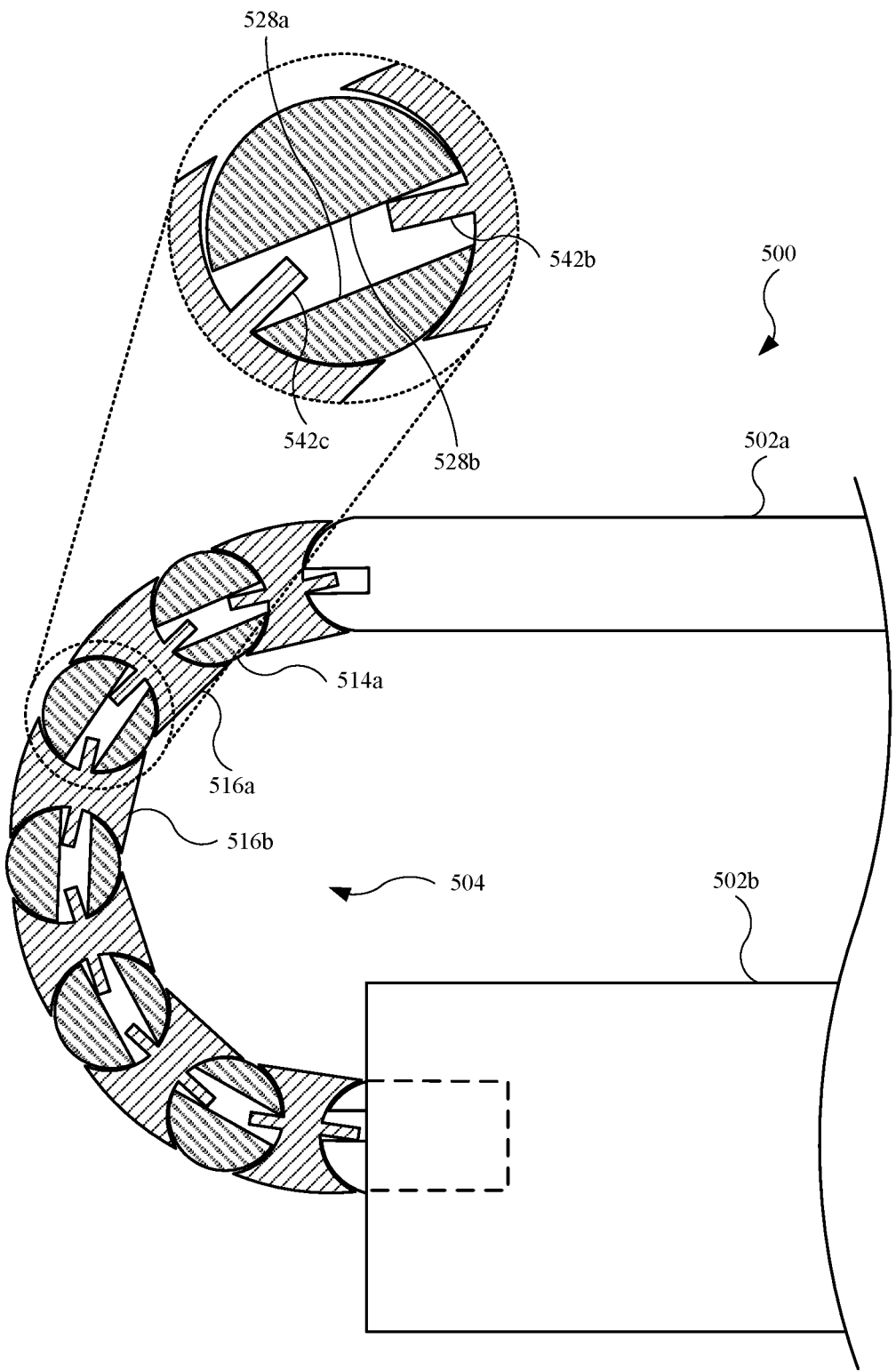
FIG. 19 illustrates an enlarged partial cross sectional view of the system shown in FIG. 18, showing the hinge assembly transitioned from the partially closed position to a closed position.

FIG. 19 illustrates an enlarged partial cross sectional view of the system 500 shown in FIG. 18, showing the hinge assembly 504 transitioned from the partially closed position to a closed position. As shown, the first housing part 502a is substantially positioned over the second housing part 502b. In the closed position, additional protrusions of the spacer elements may be in contact with additional roller elements. For example, the first roller element 514a (representing a roller element of the hinge assembly 504 that is nearest the first housing part 502a) is positioned between and engaged with the first spacer element 516a and the second spacer element 516b. As shown in the enlarged view, the clockwise rotation of the first roller element 514a causes an edge of the first roller element 514a to become pinched between a surface 528a of the first roller element 514a and a protrusion 542c of the second spacer element 516b such that additional clockwise rotation of the first roller element 514a is prevented. The clockwise rotation of the first roller element 514a, combined with movement of the first spacer element 516a, causes the second protrusion 542b of the first spacer element 516a to engage a surface 528b of the first roller element 514a such that additional movement of the second spacer element 516b is prevented. Further, as shown in FIG. 19, in the closed position, several protrusions of the spacer elements may engage a surface of a roller element, and the hinge assembly 504 is prevented from further movement. As a result, the hinge assembly 504 provides a mechanical stop using the protrusions of the spacer elements.

Figure 20:
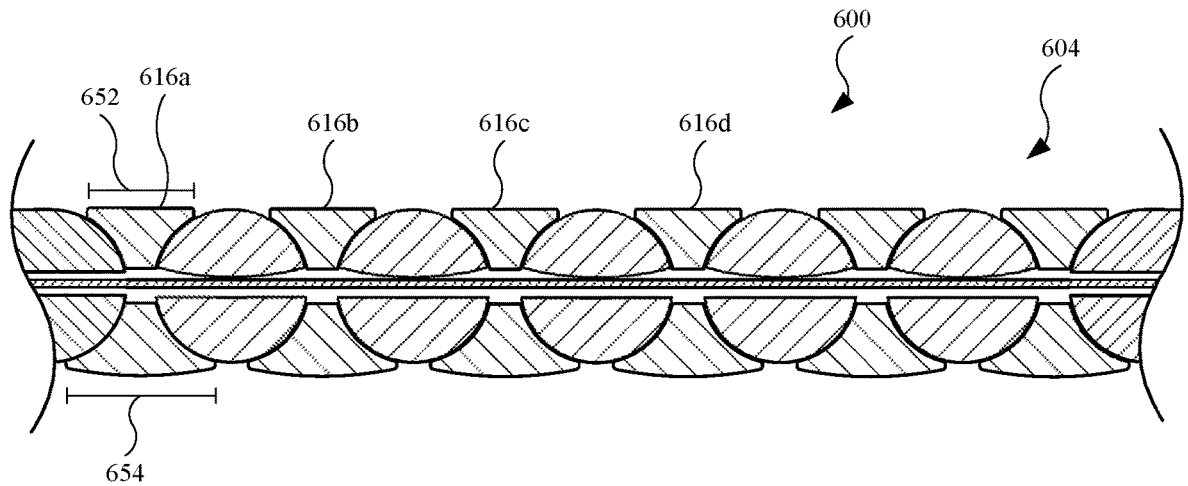
FIG. 20 illustrates an enlarged cross sectional view of an alternate embodiment of a system having a hinge assembly that includes spacer elements designed to contact one another, in accordance with some described embodiments.

FIG. 20 illustrates an enlarged cross sectional view of an alternate embodiment of a system 600 having a hinge assembly 604 that includes spacer elements designed to contact one another, in accordance with some described embodiments. The hinge assembly 604 may include multiple spacer elements, such as a first spacer element 616a, a second spacer element 616b, a third spacer element 616c, and a fourth spacer element 616d. As shown, the first spacer element 616a may include a first dimension 652 at one end of the first spacer element 616a, and may further include a second dimension 654 at another (opposing) end of the first spacer element 616a. In some embodiments, the first dimension 652 is the same or substantially similar to the second dimension 654. In the embodiment shown in FIG. 20, the first dimension 652 is less than the second dimension 654. Also, the second spacer element 616b, the third spacer element 616c, and the fourth spacer element 616d (and any additional spacer elements) may include a dimensional relationship similar to that of the first spacer element 616a.

Figure 21:
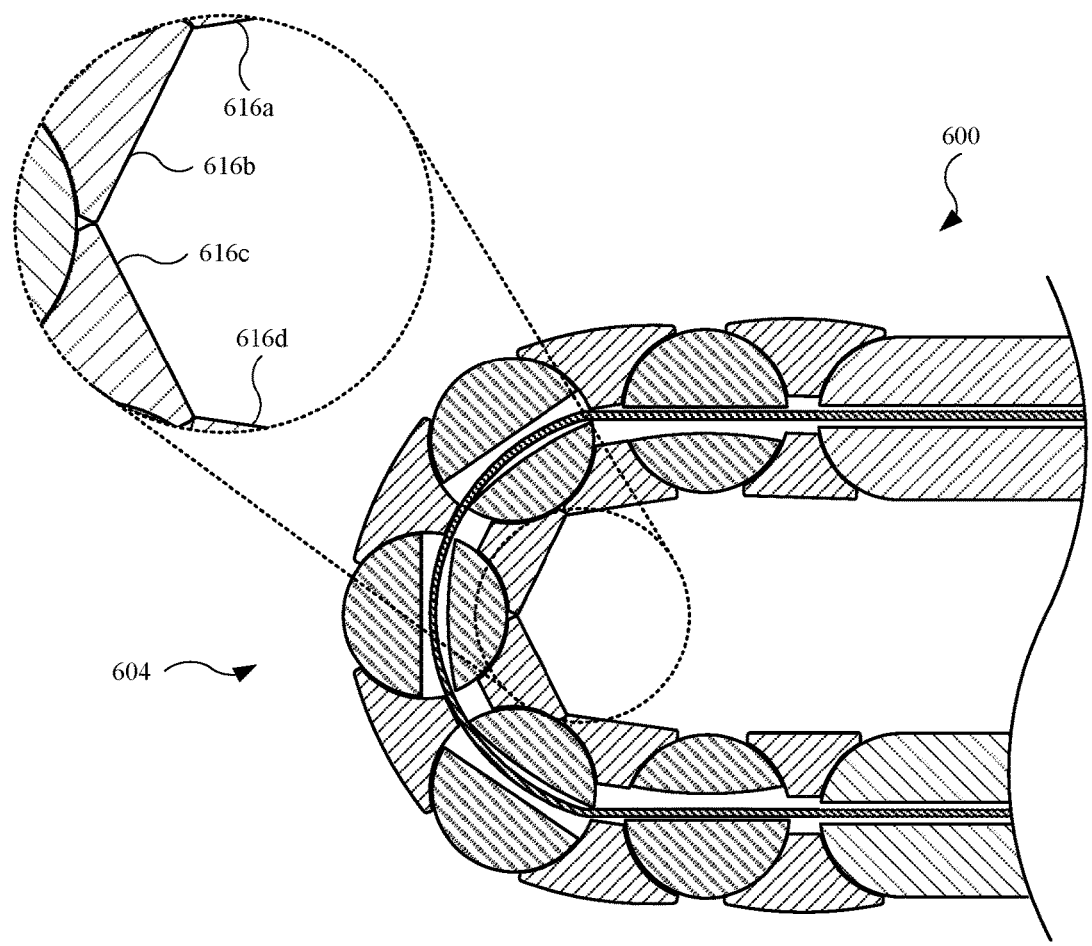
FIG. 21 illustrates an enlarged cross sectional view of the system shown in FIG. 20, further showing the system in a closed position and several adjacent spacer elements in contact with one another.

As shown in FIG. 20, the system 600 is in the open position. However, when the system 600 transitions from the open position to a closed position, at least some of the spacer element may contact one another due in part to the dimensions of the spacer elements. For example, FIG. 21 illustrates an enlarged cross sectional view of the system 600 shown in FIG. 20, further showing the system 600 in a closed position and several adjacent spacer elements in contact with one another. As shown in the enlarged view, the first spacer element 616a is in contact with the second spacer element 616b, the second spacer element 616b is in contact with the third spacer element 616c, and the third spacer element 616c is in contact with the fourth spacer element 616d. Accordingly, the hinge assembly 604 can provide a mechanical stop based upon dimensional relationships of the spacer elements.

Figure 22:
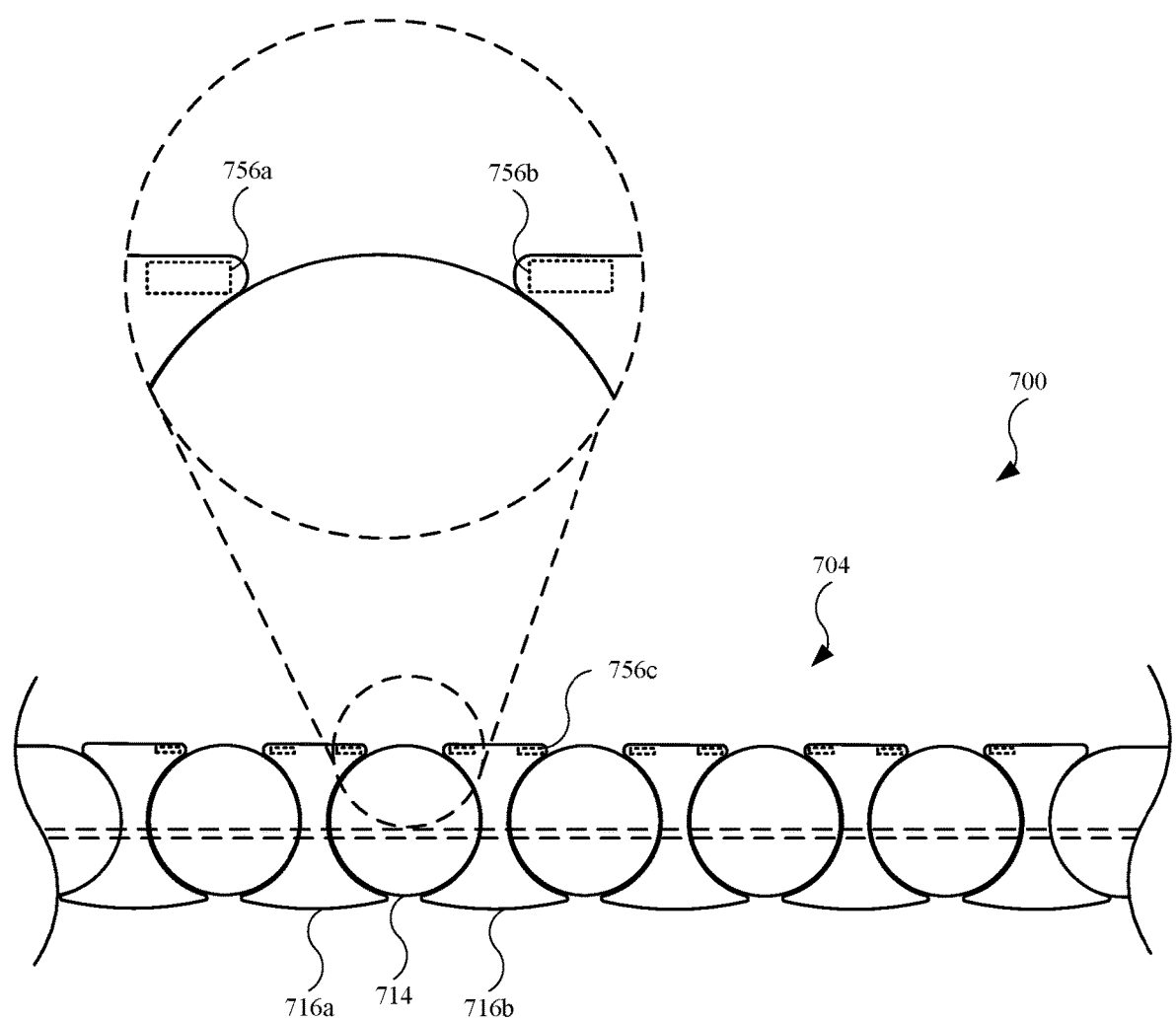
FIG. 22 illustrates an enlarged side view of an alternate embodiment of a system having a hinge assembly that includes spacer elements with magnetic elements, in accordance with some described embodiments.

FIG. 22 illustrates an enlarged side view of an alternate embodiment of a system 700 having a hinge assembly 704 that includes spacer elements with magnetic elements, in accordance with some described embodiments. The magnetic elements (indicated as dotted lines) may be embedded in the spacer elements. Further, the magnetic elements may be embedded in their respective spacer elements such that an external magnetic field provided by the magnetic elements is at least partially external with respect to the spacer elements in which the magnetic element is embedded. Also, it should be noted that the spacer elements may be made from a material or materials that do not include a ferrous material so as to not affect the external magnetic fields. The hinge assembly 704 may include a roller element 714 positioned between a first spacer element 716a and a second spacer element 716b. As shown in the enlarged view, the hinge assembly 704 includes a first magnetic element 756a in the first spacer element 716a, and a second magnetic element 756b in the second spacer element 716b. The magnetic polarity of the first magnetic element 756a may be opposite to that of the second magnetic element 756b such that when the first magnetic element 756a and the second magnetic element 756b are sufficiently close to one another, the first magnetic element 756a magnetically couples with the second magnetic element 756b to form a magnetic circuit, causing the first spacer element 716a to magnetically couple with the second spacer element 716b. This will be shown below. As an example, the first magnetic element 756a may include a north facing polarity, or North Pole, and the second magnetic element 756b may include a south facing polarity, or South Pole, of such that the first magnetic element 756a is magnetically attracted to the second magnetic element 756b. Also, although not labeled, the remaining spacer elements may include magnetic elements arranged in a similar relationship such that magnetic circuits may magnetically couple together adjacent spacer elements. Further, several spacer elements, including the first spacer element 716a and the second spacer element 716b, may include two magnetic elements. As an example, in addition to the second magnetic element 756b, the second spacer element 716b includes a third magnetic element 756c.

Figure 23:
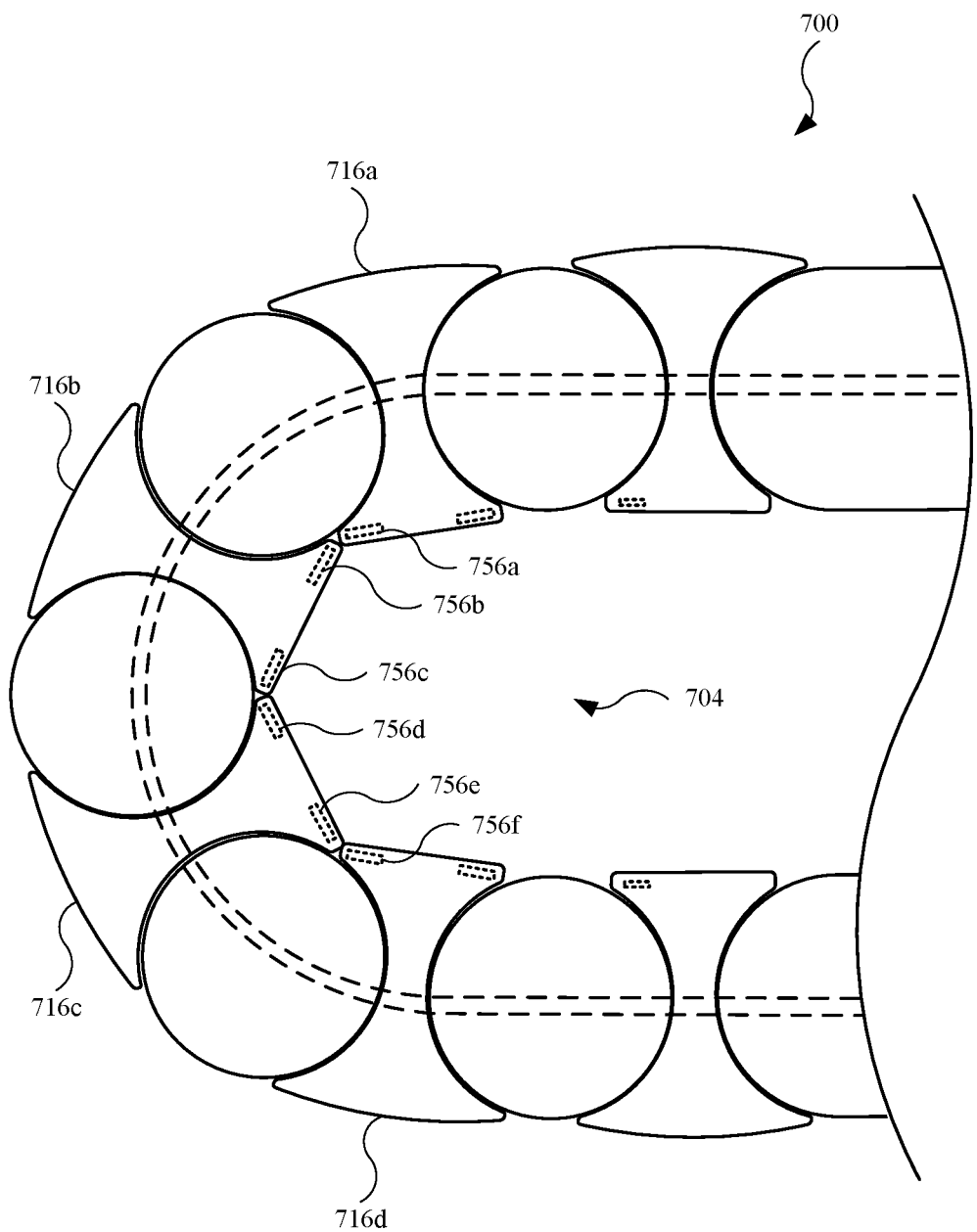
FIG. 23 illustrates an enlarged side view of the system shown in FIG. 22, further showing the system in a closed position and several adjacent spacer elements magnetically coupled with one another by way of magnetic elements.

In FIG. 22, the system 700 is in an open position. However, when the system 700 transitions to a closed position, the spacer elements move closer together causing some magnetic elements to magnetically couple to other magnetic elements. For example, FIG. 23 illustrates an enlarged side view of the system 700 and hinge assembly 704 shown in FIG. 22, further showing the system 700 in a closed position and several adjacent spacer elements magnetically coupled with one another by way of magnetic elements. In the closed position, the first spacer element 716a is sufficiently close to the second spacer element 716b such that the first magnetic element 756a is magnetically coupled to the second magnetic element 756b. Moreover, the magnetic coupling between the first magnetic element 756a and the second magnetic element 756b may draw the first spacer element 716a in contact with the second spacer element 716b. Also, it should be noted that the magnetic circuit formed by the magnetic coupling between the first magnetic element 756a and the second magnetic element 756b provides a magnetic force strong enough to maintain an engagement (physical contact) between the first spacer element 716a and the second spacer element 716b. However, a sufficient user-applied force can overcome the magnetic force and remove this engagement in order to return the system 700 to the open position.

Additional magnetic elements may form magnetic circuits to maintain an engagement between additional spacer elements. For example, the hinge assembly 704 may include a third spacer element 716c and a fourth spacer element 716d. As shown, the third spacer element 716c can be coupled to the second spacer element 716b by way of a magnetic coupling between the third magnetic element 756c and a fourth magnetic element 756d (located in the third spacer element 716c). Also, the fourth spacer element 716d can be coupled to the third spacer element 716c by way of a magnetic coupling between a fifth magnetic element 756e (located in the third spacer element 716c) and a sixth magnetic element 756f (located in the fourth spacer element 716d).

Figure 25:
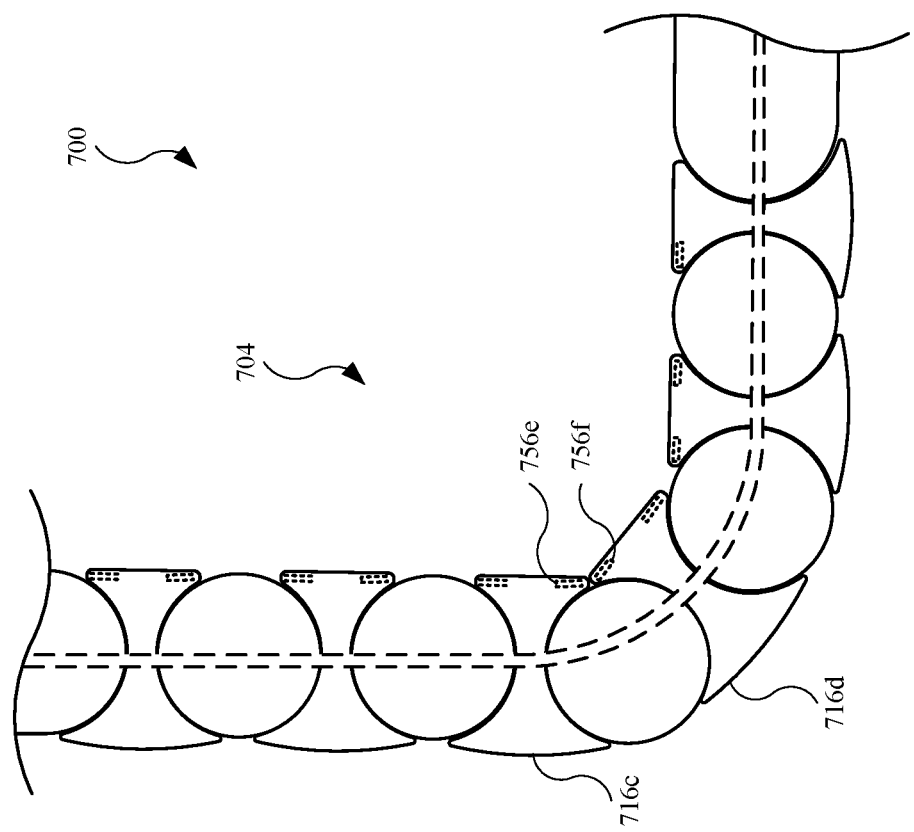
FIG. 25 illustrates an enlarged side view of the system shown in FIG. 24, showing a second set of adjacent spacer elements magnetically coupled with one another to retain the system in a partially closed position.
Figure 24:
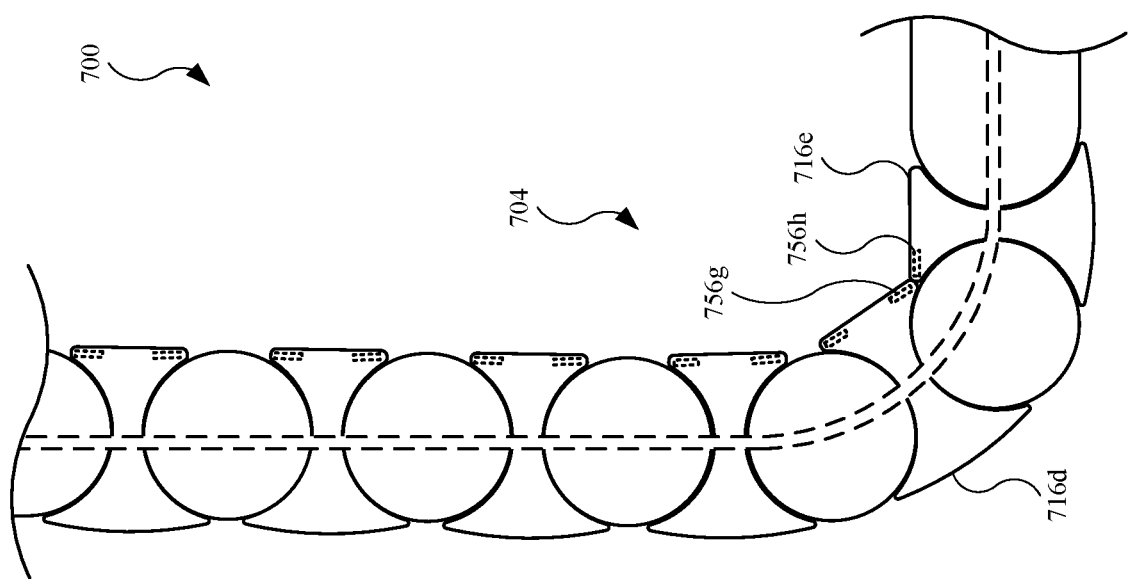
FIG. 24 illustrates an enlarged side view of the system shown in FIGS. 22 and 23, showing a first set of adjacent spacer elements magnetically coupled with one another to retain the system in a partially closed position.

FIGS. 24 and 25 show several static positions that can be maintained by the hinge assembly 704 using magnetic elements. FIG. 24 illustrates an enlarged side view of the system 700 shown in FIGS. 22 and 23, showing a first set of adjacent spacer elements magnetically coupled with one another to retain the system 700 in a partially closed position. As shown, the fourth spacer element 716d is engaged with the fifth spacer element 716e and held together by a magnetic coupling between a seventh magnetic element 756g (located in the fourth spacer element 716d) and an eighth magnetic element 756h (located in the fifth spacer element 716e).

FIG. 25 illustrates an enlarged side view of the system shown in FIG. 24, showing a second set of adjacent spacer elements magnetically coupled with one another to retain the system 700 in a partially closed position. As shown, the third spacer element 716c is engaged with the fourth spacer element 716d and held together by a magnetic coupling between the fifth magnetic element 756e (located in the third spacer element 716c) and the sixth magnetic element 756f (located in the fourth spacer element 716d). Accordingly, the hinge assembly 704 can place the system 700 in various, static partially closed (or partially open) positions based upon magnetic couplings. Although not shown, other mechanical features previously described (such as the protrusions in FIGS. 16-19) for a hinge assembly can places a system in various, static partially closed (or partially open) positions.

Figure 26:
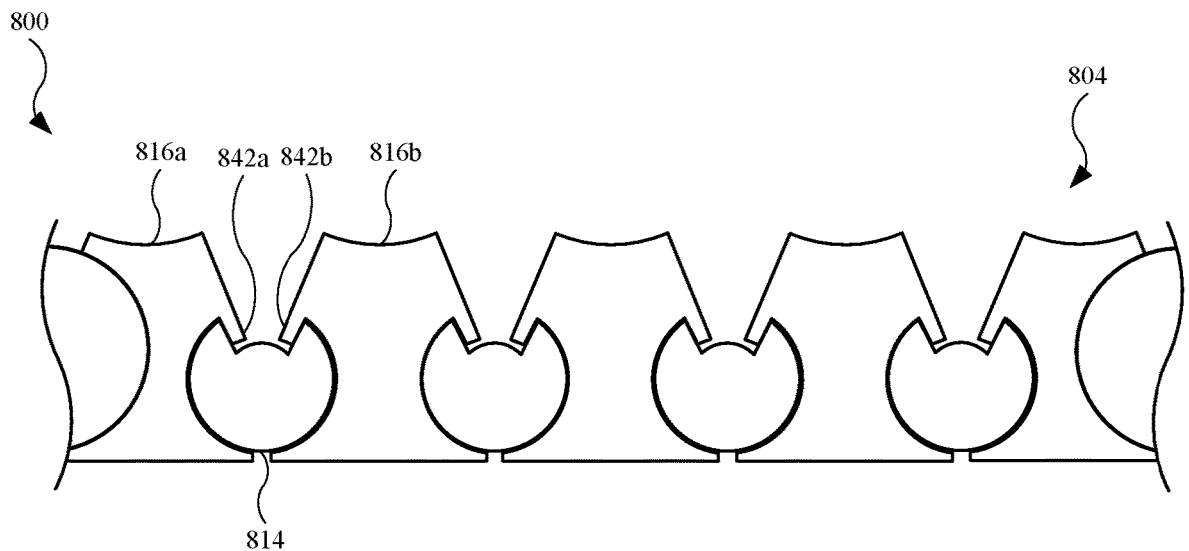
FIG. 26 illustrates a side view of an alternate embodiment of a system having a hinge assembly with extended spacer elements, in accordance with some described embodiments.

FIG. 26 illustrates a side view of an alternate embodiment of a system 800 having a hinge assembly 804 with extended spacer elements, in accordance with some described embodiments. As shown, the hinge assembly 804 may include a roller element 814 positioned between a first spacer element 816a and a second spacer element 816b. The roller element 814 is grooved to receive a protruding feature 842a and a protruding feature 842b of the first spacer element 816a and the second spacer element 816b, respectively. Further, the aforementioned protruding features may at least partially define mating surfaces for the first spacer element 816a and the second spacer element 816b. The hinge assembly 804 places the system 800 in an open position, as shown in FIG. 26. However, in a closed position, the mating surfaces may engage each other. It should be noted that remaining roller and spacer elements may include similar relationships.

Figure 27:
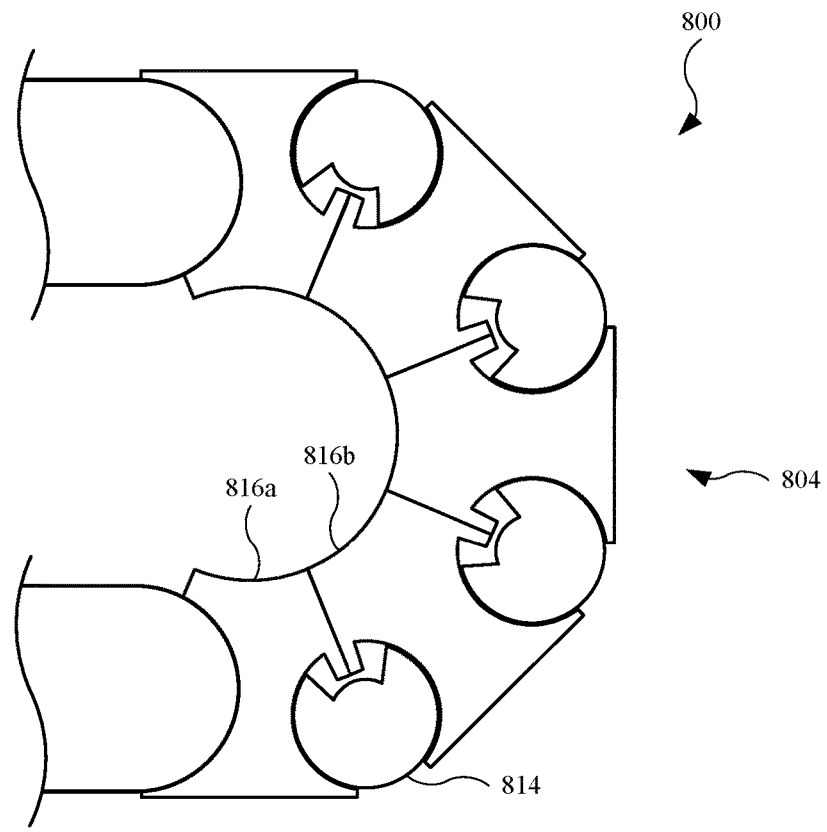
FIG. 27 illustrates a side view of the system shown in FIG. 26, showing the system in the closed position.

FIG. 27 illustrates a side view of the system 800 shown in FIG. 26, showing the system 800 in the closed position. In the closed position, the mating surfaces of the spacer elements contact each other to prevent further movement. For example, the first spacer element 816a engages the second spacer element 816b along respective mating surfaces. The first spacer element 816a and the second spacer element 816b may both rotate along the roller element 814 in order to engage each other. By using spacer elements with extended features that form mating surfaces, the hinge assembly 804 may not require engagement between mechanical interlocking between spacer elements and roller elements, and the manufacturing complexity of both the spacer elements and the roller elements may be reduced.

Figure 28:
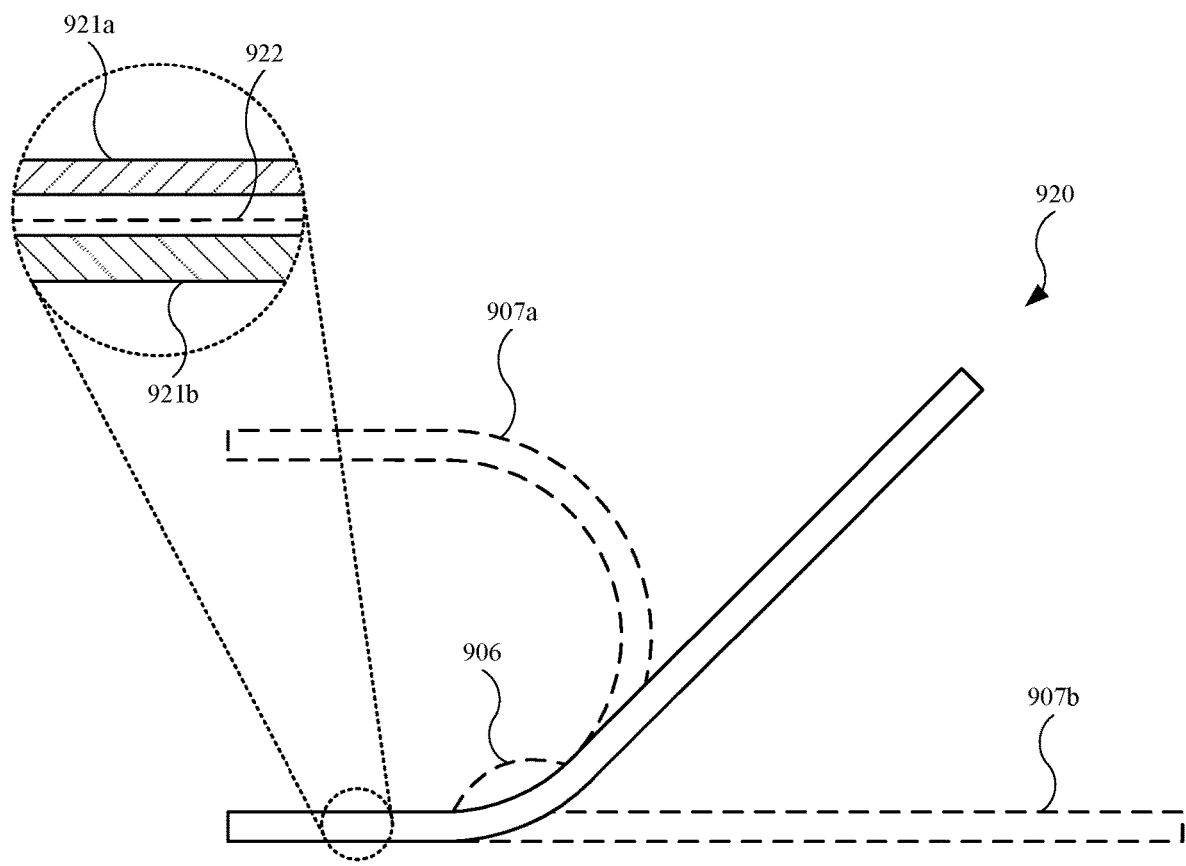
FIG. 28 illustrates a side view of an embodiment of a strap formed from multiple materials designed to limit movement of the strap, in accordance with some described embodiments.

FIG. 28 illustrates a side view of an embodiment of a strap 920 formed from multiple materials designed to limit movement of the strap 920, in accordance with some described embodiments. The strap 920 may be incorporated into one or more hinge assemblies described herein. As shown in the enlarged view, the strap 920 may include a first layer 921a and a second layer 921b. Both the first layer 921a and the second layer 921b may lie outside a central axis line 922 passing through a center of the strap 920. The first layer 921a may include a manufactured fiber made from a liquid crystal polymer material. The second layer 921b may include a metal, such as steel (as a non-limiting example). These may allow generally free movement of the strap 920 one direction, while limiting the strap 920 to movement in another (opposing) direction to a predetermined or pre-defined angle. This will be shown below. Also, although not described, a central material may be positioned between, and engaged with, the first layer 921a and the second layer 921b.

The strap 920 may provide asymmetric stop capabilities designed to limit movement of a hinge assembly (not shown in FIG. 28). As shown, the strap 920 is positioned at an angle 906. However, the angle 906 may change. For example, in a closed position of a hinge assembly (not shown in FIG. 28), the strap 920 bends to a first position 907a (shown as dotted lines). In an open position, the strap 920 bends to a second position 907b (shown as dotted lines) indicating that the strap 920 is flat, with opposing ends positioned at 180 degrees with respect to each other. The first layer 921a is designed to prevent the strap 920 from further movement. In other words, the first layer 921a is designed to prevent the strap 920 from bending beyond a 180-degree angle. In the second position 907b, the tension in the strap 920, and in particular, the first layer 921a, increases sufficiently to prevent additional movement. However, the tension in the first layer 921a reduces as the strap 920 moves from the second position 907b to the first position 907a. By providing a hinge assembly with the strap 920 (or multiple straps with similar properties), the hinge assembly may include a stop mechanism provided through the strap 920, which may eliminate the need for mechanical stops by mechanical interlocking between spacer elements and roller elements. Although the first layer 921a permits bending to a 180-degree angle, other angles are possible. For example, in some embodiments (not shown in FIG. 28), the first layer 921a permits bending to an angle approximately in the range of 90 to 135 degrees.

Figure 29:
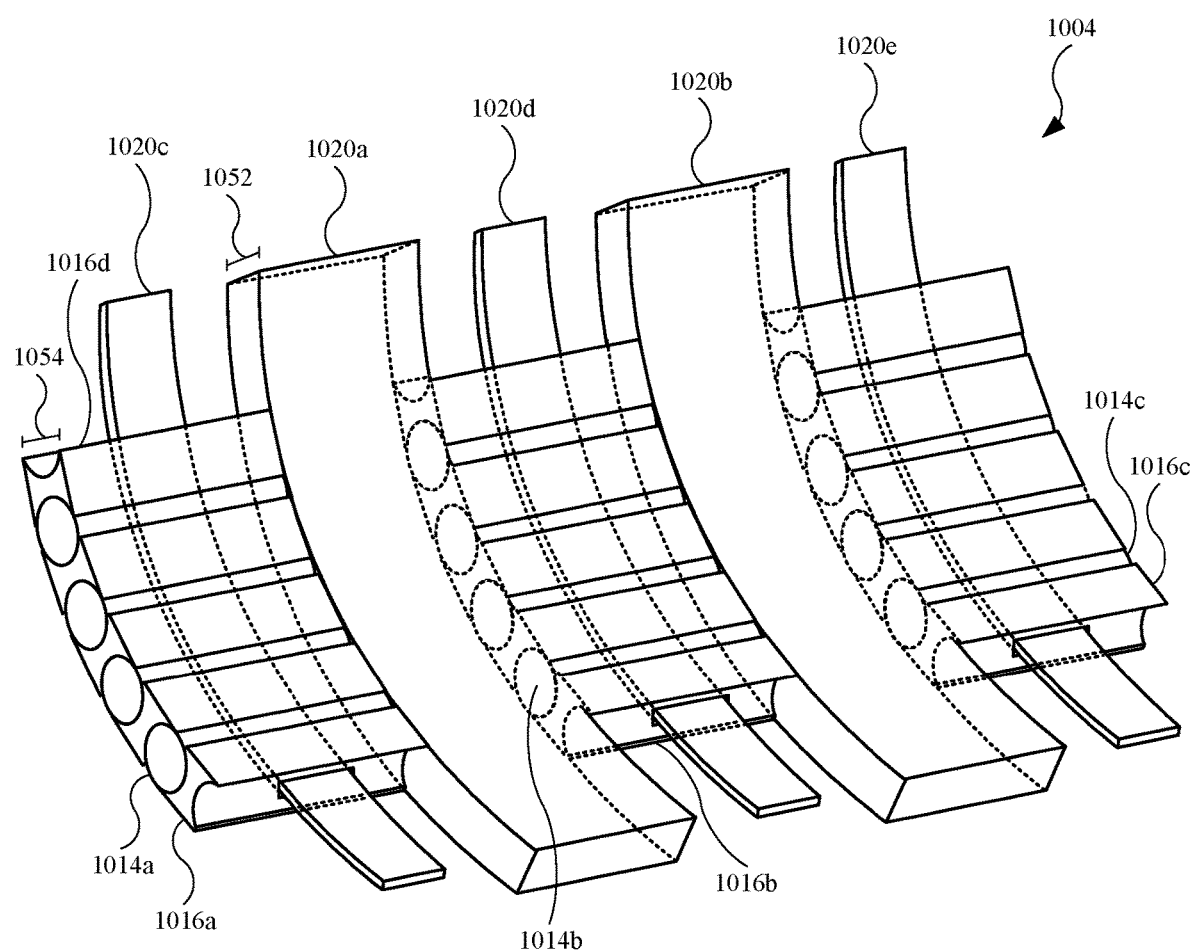
FIG. 29 illustrates an isometric view of an embodiment of a hinge assembly, showing straps positioned between segmented roller elements and spacer elements.

FIG. 29 illustrates an isometric view of an embodiment of a hinge assembly 1004, showing straps positioned between segmented roller elements and spacer elements. As shown, the hinge assembly 1004 includes several roller elements and spacer elements. For example, the hinge assembly 1004 includes a first roller element 1014a and a first spacer element 1016a, as well as a second roller element 1014b and a second spacer element 1016b. The hinge assembly 1004 may include a first strap 1020a that separates the first roller element 1014a from the second roller element 1014b, and also separates the first spacer element 1016a from the second spacer element 1016b. The hinge assembly 1004 may further include a third roller element 1014c and a third spacer element 1016c. The hinge assembly 1004 may include a second strap 1020b that separates the second roller element 1014b from the third roller element 1014c, and also separates the second spacer element 1016b from the third spacer element 1016c.

The first strap 1020a and the second strap 1020b may include any features described for the strap 920 (shown in FIG. 28). Furthermore the first strap 1020a and the second strap 1020b may include a dimension (such as a height) that is the same as, or at least proximately similar to, a dimension of a spacer element or a roller element. For example, the first strap 1020a includes a dimension 1052 and a spacer element 1016d includes a dimension 1054 that is the same as, or at least proximately similar to, the dimension 1052. It should be noted that the second strap 1020b includes the same dimensions as the first strap 1020a, and the roller elements and spacer elements (including those not labeled) includes same dimensions as each other. In other words, the roller elements include approximately the same dimensions as each other, and the spacer elements include approximately the same dimensions as each other.

The hinge assembly 1004 may include additional straps passing through openings, or slots, of the roller elements and the spacer elements. As shown, the hinge assembly 1004 includes a third strap 1020c passing through roller elements and spacer elements, including the first roller element 1014a and the first spacer element 1016a. The hinge assembly 1004 includes a fourth strap 1020d passing through roller elements and spacer elements, including the second roller element 1014b and the second spacer element 1016b. The hinge assembly 1004 includes a fifth strap 1020e passing through roller elements and spacer elements, including the third roller element 1014c and the third spacer element 1016c. These straps may be pulled in tension and may also maintain frictional engagement between their respective roller and spacer elements. Alternatively, or in combination, the third strap 1020c, the fourth strap 1020d, and the fifth strap 1020e may include circuitry, thereby providing a flexible circuit that routes signals between components carried by housing parts (not shown in FIG. 29) that are coupled to the hinge assembly 1004. Alternatively, or in combination, the third strap 1020c, the fourth strap 1020d, and the fifth strap 1020e may include a thermally conductive material (such as graphite, as a non-limiting example), thereby providing heat-dissipating properties that draw heat out of heat-generating components (such as displays and/or processor circuits, as non-limiting examples) carried by housing parts (not shown in FIG. 29) that are coupled to the hinge assembly 1004.

Figure 30:
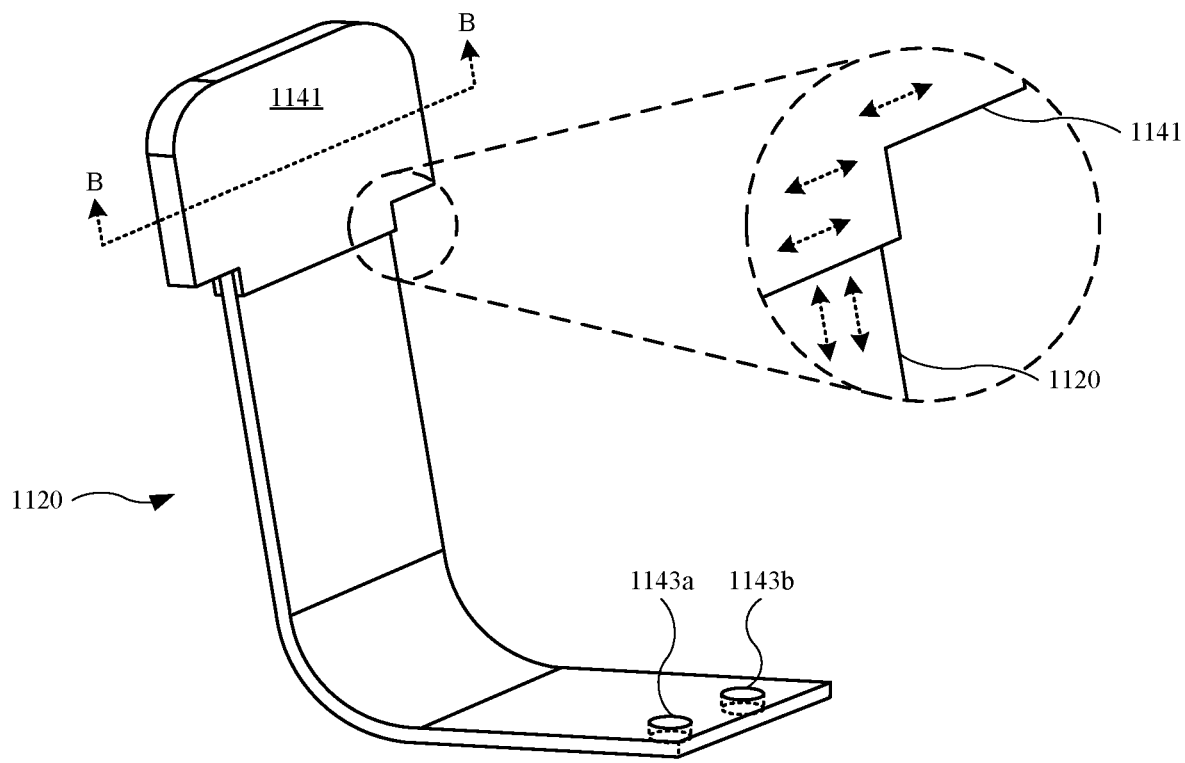
FIG. 30 illustrates an isometric view of an embodiment of a strap with an end piece coupled to the strap, in accordance with some described embodiments.

FIG. 30 illustrates an isometric view of an embodiment of a strap 1120 with an end piece 1141 coupled to the strap 1120, in accordance with some described embodiments. The end piece 1141 may provide an insertion point into a housing part of a system (not shown in FIG. 30) in order to couple the strap 1120 with the housing part. The end piece 1141 includes a flange design in which ends of the end piece 1141 extend beyond the ends of the strap 1120.

The strap 1120 may include multiple layers of glass fibers, and the end piece 1141 may include carbon fiber. As shown the enlarged view, a layer of strap 1120 includes a layer with fibers aligned in one direction (as indicted by the dotted lines with arrows), while a layer of end piece 1141 includes fibers aligned in another direction (as indicted by the dotted lines with arrows). As shown in FIG. 30, the direction of the fibers in the strap 1120 is perpendicular with respect to the direction of the fibers in the end piece 1141. In this regard, when strap 1120 is pulled in tension, the end piece 1141 can provide resistance to the pulling force. Although not shown, the end piece 1141 may include other materials, such as layered steel or a steel block. Also, the strap 1120 may include a first opening 1143a and a second opening 1143b designed to receive a first fastener and a second fastener, respectively, in order to secure an end of the strap 1120 (opposite the end piece 1141) to an additional housing part (not shown in FIG. 30). Although not shown, the first opening 1143a and the second opening 1143b can be replaced by an end piece having any feature described for the end piece 1141.

Figure 31:
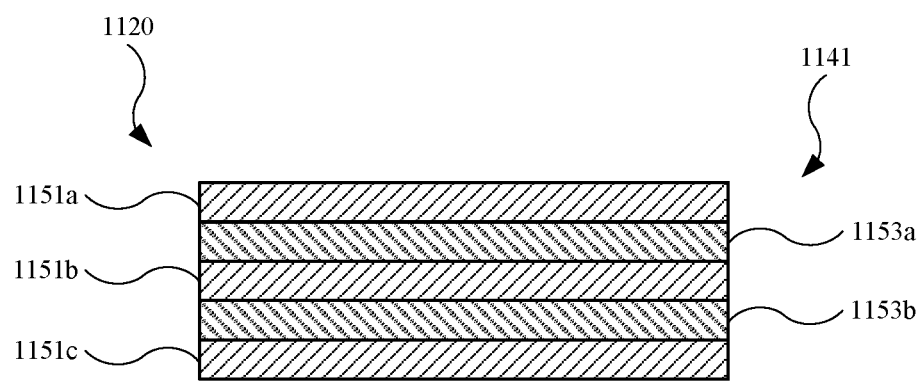
FIG. 31 illustrates a cross sectional view of the strap shown in FIG. 30, taken along line B-B, showing varies layers of a composite that forms the end piece and the strap.

To further integrate the end piece 1141 with the strap 1120, alternating layers of the end piece 1141 and the strap 1120 may be secured or bonded to each other. For example, FIG. 31 illustrates a cross sectional view of the strap 1120 shown in FIG. 30, taken along line B-B, showing various layers of a composite that forms the end piece 1141 and the strap 1120. As shown, the end piece 1141 may include a first layer 1151a, or first ply, bonded to a first layer 1153a, or first ply, of the strap 1120. The first layer 1153a may bond to a second layer 1151b of the end piece 1141. Also, the second layer 1151b of the end piece 1141 may bond to a second layer 1153b of the strap 1120. Further, the second layer 1153b of the strap 1120 may bond to a third layer 1151c of the end piece 1141. Additional layers for each of the strap 1120 and the end piece 1141 may be present. Also, the fibers in the layers for the strap 1120 may be aligned in a direction that is perpendicular with respect to the direction of the fibers in the end piece 1141.

Figure 32:
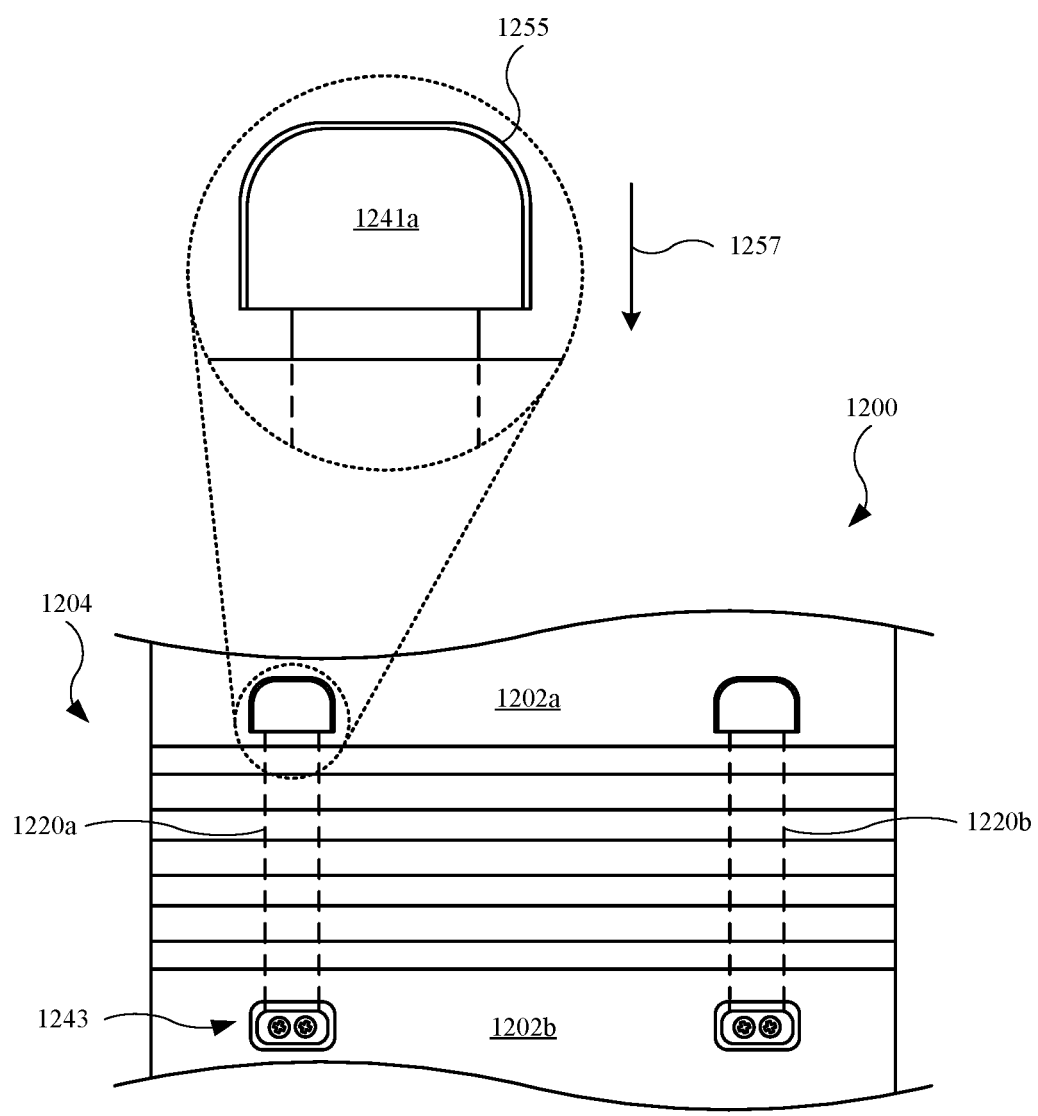
FIG. 32 illustrates a plan view of a system, showing several straps anchored into the system, in accordance with some described embodiments.

FIG. 32 illustrates a plan view of a system 1200, showing several straps anchored into the system 1200, in accordance with some described embodiments. The straps may include features described for the strap 1120 (shown in FIGS. 30 and 31). For example, the system 1200 may include a hinge assembly 1204 that includes a first strap 1220a and a second strap 1220b. The first strap 1220a and the second strap 1220b are secured to a first housing part 1202a and a second housing part 1202b of the system 1200. As shown the enlarged view, the first strap 1220a includes a first end piece 1241a positioned in a first cavity 1255, or pocket, in the first housing part 1202a. The first cavity 1255 includes a size and shape such that the flange regions of the first end piece 1241a engage the first housing part 1202a within the first cavity 1255, particularly when a pulling force is exerted on the first strap 1220a (in the direction of the arrow 1257). The tension from the pulling force can maintain the first end piece 1241a in engagement with the first housing part 1202a, and fasteners and/or adhesives may not be needed. Also, the first strap 1220a is secured to the second housing part 1202b via fasteners 1243. The second strap 1220b (designed for insertion into a second cavity of the first housing part 1202a) may include any features and may be secured with the first housing part 1202a and the second housing part 1202b in a similar manner as described for the first strap 1220a.

Figure 33:
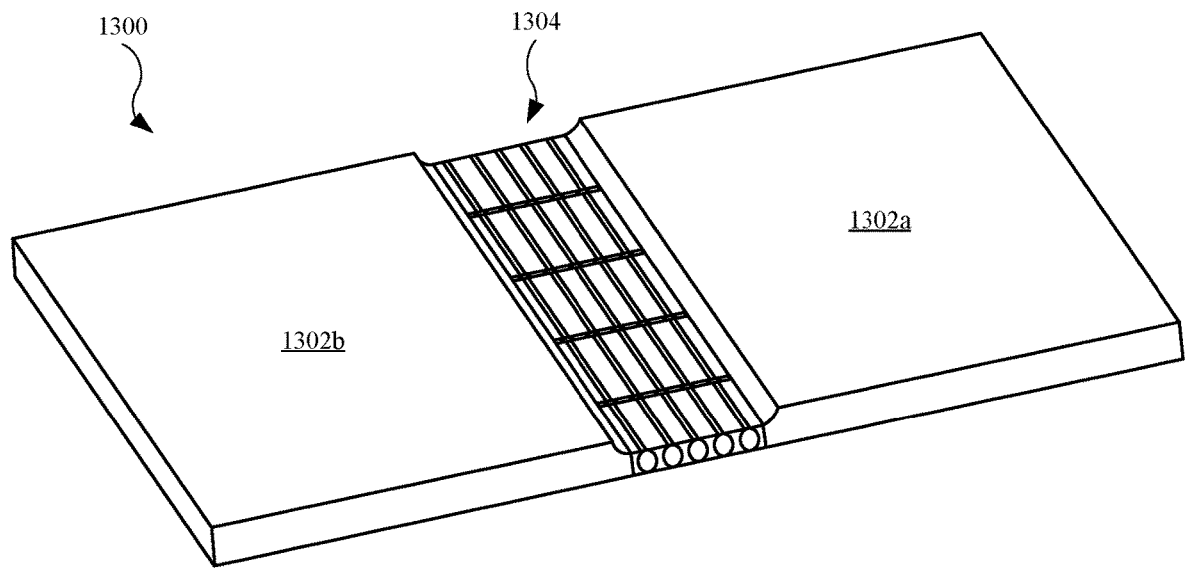
FIG. 33 illustrates an isometric view of an alternate embodiment of a system having a hinge assembly coupled to a first housing part and a second housing part, with the system in an open position, in accordance with some described embodiments.

FIG. 33 illustrates an isometric view of an alternate embodiment of a system 1300 having a hinge assembly 1304 coupled to a first housing part 1302a and a second housing part 1302b, with the system 1300 in an open position, in accordance with some described embodiments. As shown, the hinge assembly 1304 may be partitioned into multiple segments, and accordingly, the hinge assembly 1304 may be referred to as a multi-segment hinge assembly. FIG. 33 shows the hinge assembly 1304 including five segments. However, the number of segments may vary. In this regard, each segment may include multiple roller elements, and one or more straps. This will be shown below. Also, the first housing part 1302a and the second housing part 1302b may include any component(s) previously described for a first housing part and a second housing part, respectively.

Figure 34:
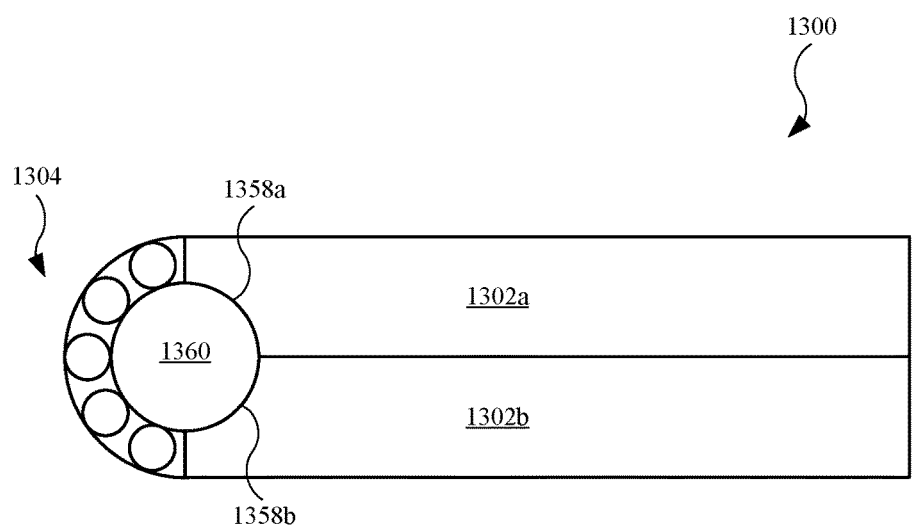
FIG. 34 illustrates an isometric view of the system shown in FIG. 33, with the system transitioned to a closed position.

FIG. 34 illustrates an isometric view of the system 1300 shown in FIG. 33, with the system 1300 transitioned to a closed position. The "closed position" may refer to the first housing part 1302*a* positioned substantially over the second housing part 1302*b*, as shown in FIG. 34. The first housing part 1302*a* and the second housing part 1302*b* may include a first curved surface 1358*a* and a second curved surface 1358*b*, respectively. In this regard, in the closed position, the hinge assembly 1304, the first housing part 1302*a*, and the second housing part 1302*b* define an opening 1360 that includes a circular shape. In instances when the first housing part 1302*a* and/or the second housing part 1302*b* includes as a display assembly (not shown in FIG. 34), the opening 1360 may provide a space to receive an object (not shown in FIG. 34) that can be used in conjunction with the display assembly. For example, the opening 1360 may receive a stylus or other tool that can be used to provide an input or command to the display assembly. Also, it should be noted that the roller elements and spacer elements of the hinge assembly 1304 may undergo synchronous motion similar to a manner previously described for a hinge assembly.

Figure 35:
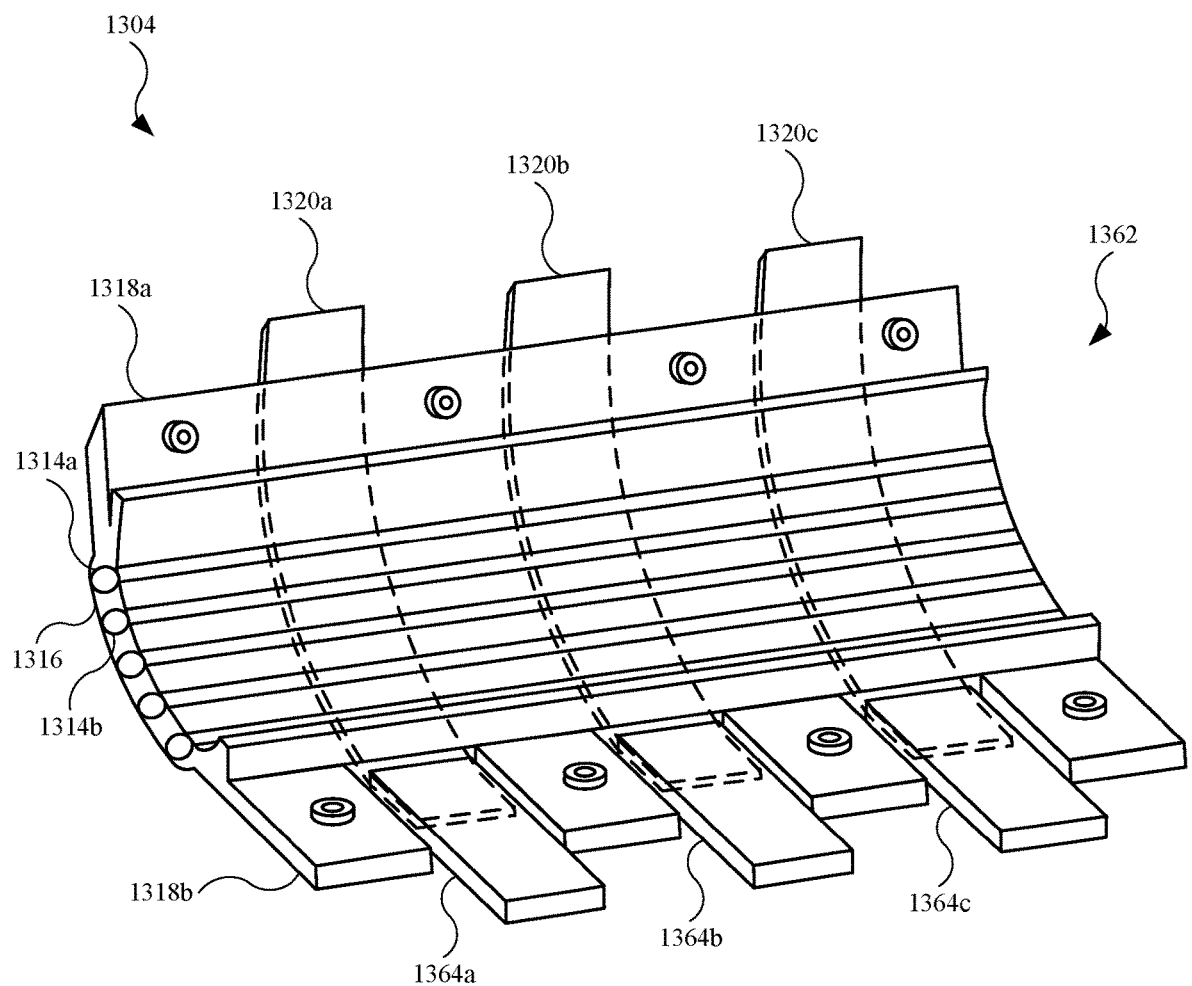
FIG. 35 illustrates an isometric view of a segment of the hinge assembly.

FIG. 35 illustrates an isometric view of a segment 1362 of the hinge assembly 1304. The segment 1362 may refer to one of the five aforementioned segments of the hinge assembly 1304 shown in FIG. 33. As shown, the segment 1362 may include multiple roller elements, including a first roller element 1314*a* and a second roller element 1314*b*. The segment 1362 may include several additional roller elements (not labeled). The segment 1362 may further include several spacer elements positioned between adjacent roller elements. For example, the segment 1362 may include a spacer element 1316 positioned between the first roller element 1314*a* and the second roller element 1314*b*. The segment 1362 may include several additional spacer elements (not labeled). The segment 1362 may facilitate movement of the housing parts (shown in FIGS. 33 and 34) by the roller elements rotating along concave surfaces of the spacer elements, similar to a manner previously described. The segment 1362 may further include a first housing attachment 1318*a* and a second housing attachment 1318*b* designed to couple or fasten to the first housing part 1302*a* (shown in FIGS. 33 and 34) and the second housing part 1302*b* (shown in FIGS. 33 and 34), respectively. The remaining segments of the hinge assembly 1304 (shown in FIG. 33) may include any feature(s) described herein for the segment 1362.

The segment 1362 may further include one or more straps that extend through the housing attachment elements, the roller elements, and the spacer elements. As shown in FIG. 35, the segment 1362 may include a first strap 1320*a*, a second strap 1320*b*, and a third strap 1320*c*. These straps may include any material and provide any function previously described for a strap. Also each of the straps may provide a different purpose. For example, the first strap 1320*a* may be used by the segment 1362 to maintain engagement between the various elements, the second strap 1320*b* may be used to provide stiffness to the segment 1362 in order to maintain fixed positioned of the segment 1362, and the third strap 1320*c* may be used as a flexible circuit in order to carry electrical communication to components in the first housing part 1302*a* and the second housing part 1302*b* (shown in FIGS. 33 and 34). Alternatively, one of the first strap 1320*a*, the second strap 1320*b*, and the third strap 1320*c* may provide a counterbalance that can offset the force provided by the weight of a housing part (not shown in FIG. 35) in either position, and may counterbalance the force of the housing part in generally any position of the first housing part. Alternatively, one of the first strap 1320*a*, the second strap 1320*b*, and the third strap 1320*c* may include a thermally conductive material, thereby providing heat-dissipating properties that draw heat out of heat-generating components (such as displays and/or processor circuits, as non-limiting examples) carried by housing parts (not shown in FIG. 35) that are coupled to the hinge assembly 1304. Referring again to FIG. 33, the hinge assembly 1304 may include multiple segments, with each segment having one or more straps (not shown in FIG. 33). It should be noted that each strap may include any one of the functions described herein the straps shown in FIG. 35.

Alternatively, the first strap 1320*a*, the second strap 1320*b*, and the third strap 1320*c* may provide the segment 1362 with an increased stiffness, as opposed to the stiffness provided by a single strap. Each of the first strap 1320*a*, the second strap 1320*b*, and the third strap 1320*c* may be coupled to a tensioning element (shown later) designed to increase the frictional forces between the roller elements and the spacer elements. Further, when the additional segments (shown in FIG. 33) include multiple straps used for stiffness, the hinge assembly 1304 may provide an increased stiffness for the system 1300 (shown in FIGS. 33 and 34). In this regard, the straps may offset the forces associated with the weight the housing parts. This will be shown and discussed below. Also, the first strap 1320*a*, the second strap 1320*b*, and the third strap 1320*c* can be coupled to a first strap retention element 1364*a*, a second strap retention element 1364*b*, and a third strap retention element 1364*c*, respectively, with the aforementioned strap retention elements acting as intermediaries between the straps and the tensioning elements (not shown).

Figure 36:
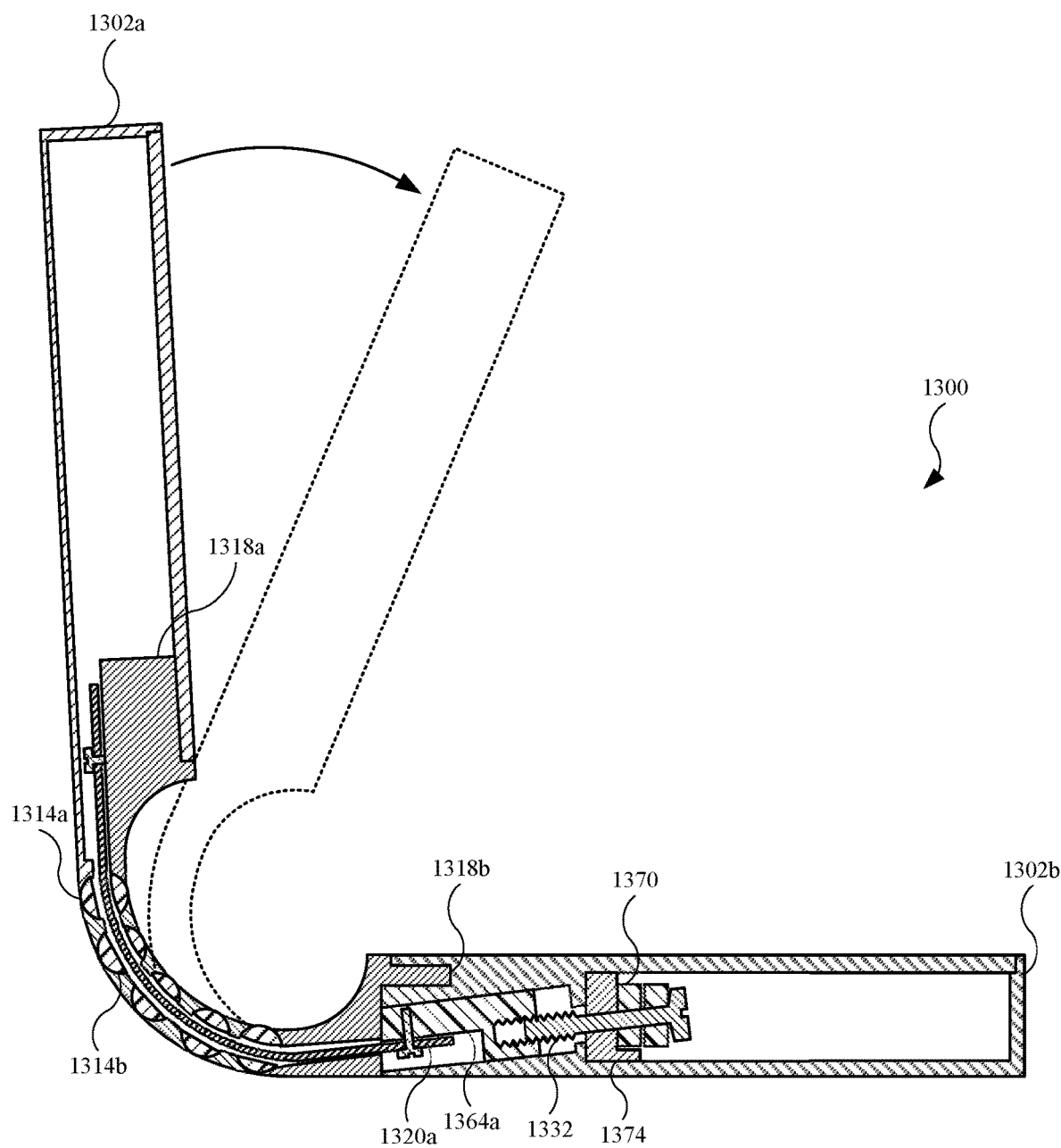
FIG. 36 illustrates a cross sectional view of the system shown in FIG. 35, showing relative movement of the first housing part with respect to the second housing part.

FIG. 36 illustrates a cross sectional view of the system 1300 shown in FIG. 35, showing relative movement of the first housing part 1302*a* with respect to the second housing part 1302*b*. As shown, the first strap 1320*a* extends into the first housing part 1302*a* and is secured to the first housing attachment 1318*a* that is positioned in and secured to the first housing part 1302*a*. Also, the first strap 1320*a* and the first strap retention element 1364*a* may extend into the second housing part 1302*b*, and the first strap retention element 1364*a* may be secured to a tensioning element 1370 by a fastener 1332. The tensioning element 1370 may be separated from the first strap retention element 1364*a* by a stationary block 1374.

As shown, the fastener 1332 is in threaded engagement with the first strap retention element 1364*a*. Also, the tensioning element 1370 may expand to engage both the fastener 1332 and the stationary block 1374. In this manner, the tensioning element 1370 may bias the head (not labeled) of the fastener 1332 in a direction away from the stationary block 1374, thereby biasing the first strap retention element 1364*a* in a direction toward the stationary block 1374. As a result of the biasing force, the tensioning element 1370 may provide a tension, or pulling force, to the first strap 1320*a* and increase the frictional forces between the roller elements and the spacer elements of the hinge assembly 1304. However, by turning/rotating the fastener 1332, the tensioning element 1370 may expand or contract and increase or decrease, respectively, the amount of pulling force applied to the first strap 1320*a*. In this regard, the tensioning element 1370 and the fastener 1332 may be part of an adjustable tension system. As the system 1300 is in use over time, the roller elements and/or the spacer elements may wear down due to continued use. This may affect the user experience of the system 1300. For example, the system 1300 may not open or close as smoothly, or the first housing part 1302a, when moving from an initial position to a subsequent position (represented by a dotted line), may not remain fixed in the subsequent position according to a desired user setting. However, the tensioning element 1370 may be adjusted by the fastener 1332 and increase the tension applied to the first strap 1320a, thereby increasing the frictional forces between the roller elements and the spacer elements, and the system 1300 may return to its original operation, and the first housing part 1302a may remain in a desired position relative to the second housing part 1302b. Although not shown, the system 1300 may include a tensioning element, a fastener, and a stationary block for each strap used in the system 1300. Accordingly, when the system 1300 includes five segments similar to the segment 1362 (shown in FIG. 35) with three straps per segment, the system 1300 may include fifteen straps and fifteen tensioning elements. As a result, the system 1300 may rely more upon the stiffness of the straps, and less upon frictional forces between the roller elements and the spacer elements as the relatively high number of straps can hold and maintain the housing parts in various desired positions. However, should additional friction be required or desired, the tension applied to each of the straps can be adjusted using one or more of the aforementioned adjustable tension systems.

The straps may be used to counterbalance the housing parts. For example, when the first housing part 1302a is moved from an initial position to a subsequent position (represented by dotted lines), the force provided by the weight of the first housing part 1302a shifts. However, the stiffness provided by the straps can counterbalance the force provided by the weight of the first housing part 1302a in either position, and may counterbalance the force of the first housing part 1302a in generally any position of the first housing part 1302a. Also, due in part to the known properties (such as material and thickness) of the straps, the roller elements, and the spacer elements, the amount of applied force the required to move the first housing part 1302a is more predicable to a user. Accordingly, the user of the system 1300 can more readily provide the amount of force required to overcome static friction exerted on first housing part 1302a, and provide a kinetic friction moves the first housing part 1302a, thereby providing a more predicable user experience may result.

Also, similar to prior embodiments, any forces applied to the roller elements (such as the first roller element 1314a and the second roller element 1314b) do not place the roller elements in torsion. In other words, the roller elements are not twisted for any position of the system 1300. This may prevent unwanted wear on the roller elements and the spacer elements over time. Also, due to the roller elements not being twisted and placed in torsion, the roller elements store little or no energy. As a result, the roller elements do not attempt to redistribute the energy, in the form of a counterforce, to the first housing part 1302a and the second housing part 1302b, and the first housing part 1302a and the second housing part 1302b due not undergo bowing or warping from the roller elements. In this regard, both the first housing part 1302a and the second housing part 1302b may remain generally flat.

Figure 37:
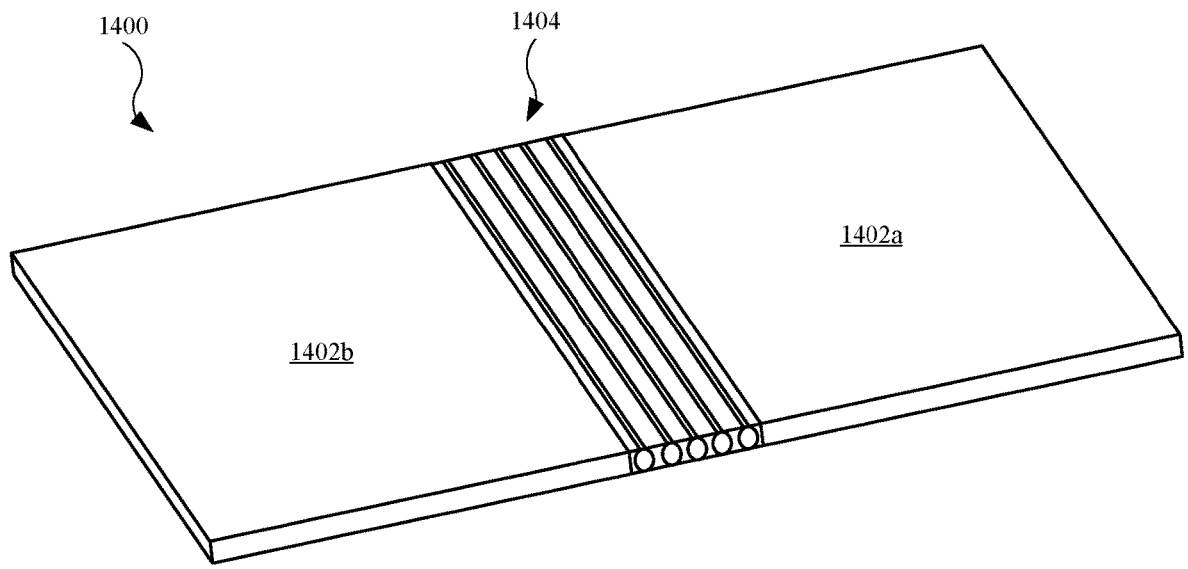
FIG. 37 illustrates an isometric view of an alternate embodiment of a system having a hinge assembly coupled to a first housing part and a second housing part, with the system in an open position, in accordance with some described embodiments.

FIG. 37 illustrates an isometric view of an alternate embodiment of a system 1400 having a hinge assembly 1404 coupled to a first housing part 1402a and a second housing part 1402b, with the system 1400 in an open position, in accordance with some described embodiments. As shown, the hinge assembly 1404 may extend end-to-end, that is, the hinge assembly 1404 may extends to opposing ends of the first housing part 1402a (or alternatively, from opposing ends of the second housing part 1402b). Similar to prior embodiments, the hinge assembly 1404 may include multiple roller elements and multiple spacer elements. Also, the first housing part 1402a and the second housing part 1402b may include any component(s) previously described for a first housing part and a second housing part, respectively.

Figure 38:
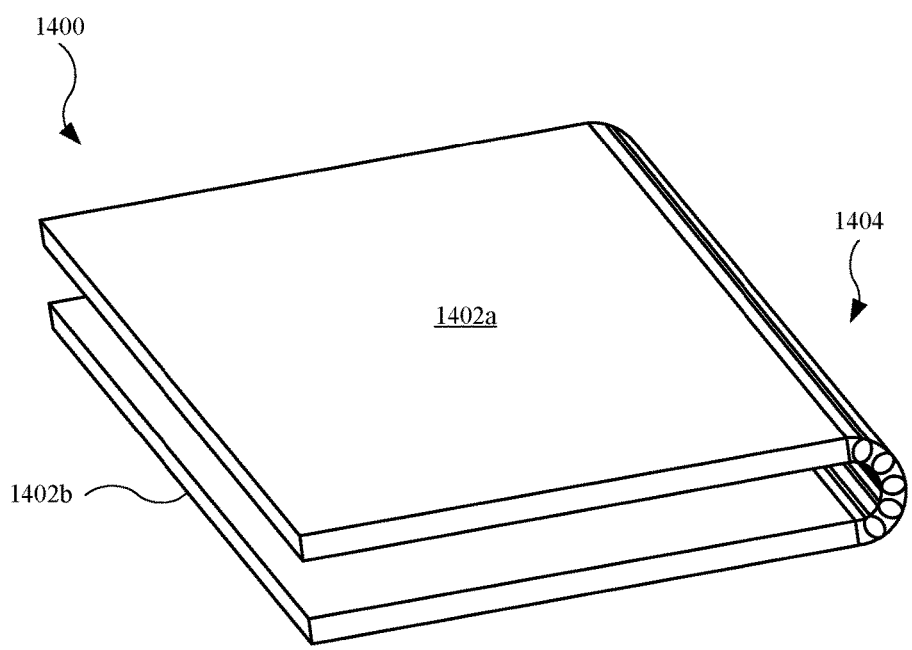
FIG. 38 illustrates an isometric view of the system shown in FIG. 37, with the system transitioned to a closed position.

FIG. 38 illustrates an isometric view of the system 1400 shown in FIG. 37, with the system 1400 transitioned to a closed position. The "closed position" may refer to the first housing part 1402a positioned substantially over the second housing part 1402b, as shown in FIG. 38. Similar to prior embodiments, the hinge assembly 1404 provides the system 1400 with flexibility and allows for several different positions, in addition to the open and closed positions. Also, it should be noted that the roller elements and spacer elements of the hinge assembly 1404 may undergo synchronous motion similar to a manner previously described for a hinge assembly. Further, the hinge assembly 1404 may allow any type of movement or rotation of the first housing part 1402a relative to the second housing part 1402b previously described.

Figure 39:
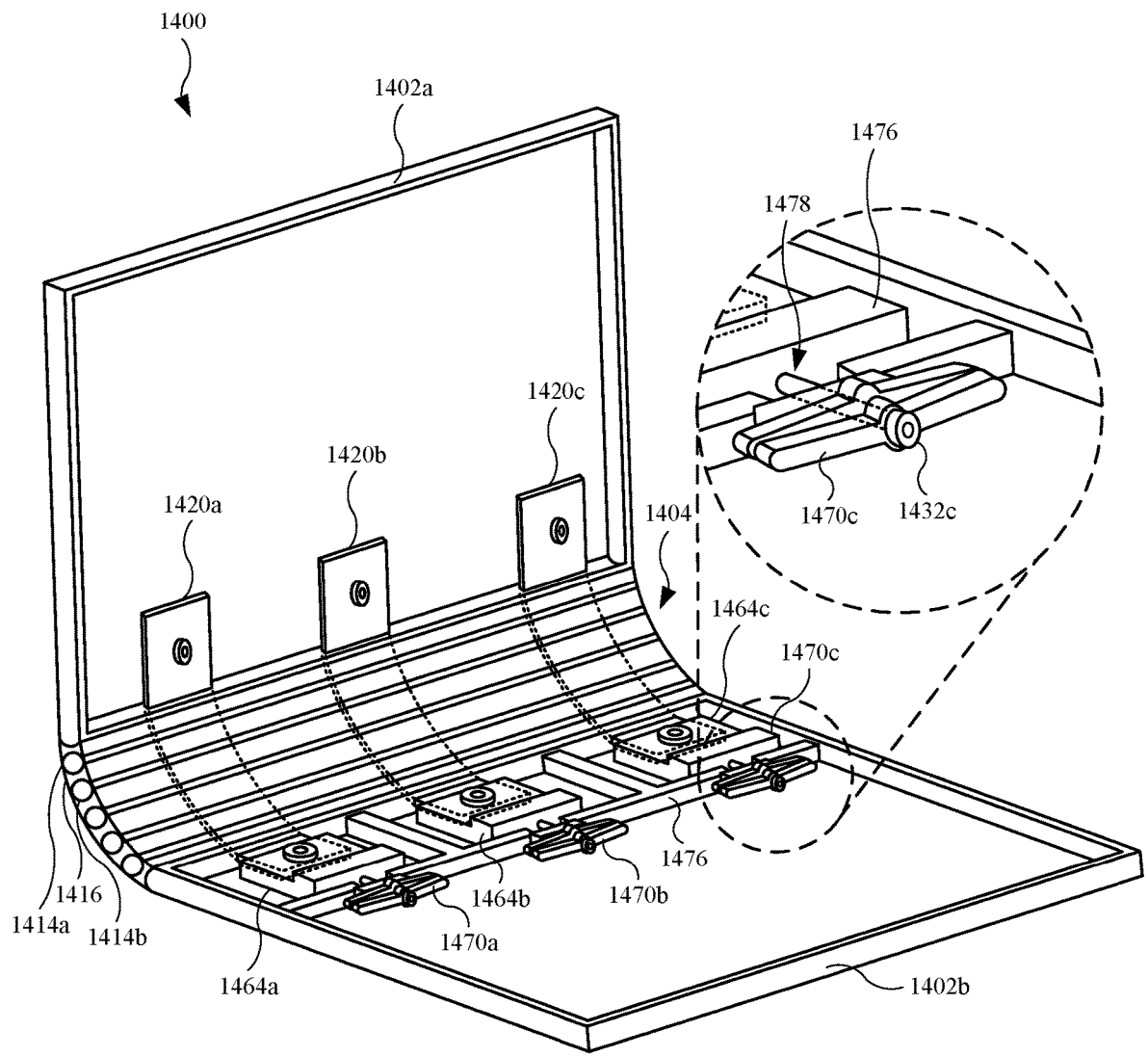
FIG. 39 illustrates an isometric view of the system shown in FIGS. 37 and 38, with portions of the first housing part and the second housing part removed to show additional features of the hinge assembly.

FIG. 39 illustrates an isometric view of the system 1400 shown in FIGS. 37 and 38, with portions of the first housing part 1402a and the second housing part 1402b removed to show additional features of the hinge assembly 1404. As shown, the hinge assembly 1404 may include multiple roller elements, including a first roller element 1414a and a second roller element 1414b. The hinge assembly 1404 may include several additional roller elements (not labeled). The hinge assembly 1404 may further include several spacer elements positioned between adjacent roller elements. For example, the hinge assembly 1404 may include a spacer element 1416 positioned between the first roller element 1414a and the second roller element 1414b. The hinge assembly 1404 may include several additional spacer elements (not labeled). The hinge assembly 1404 may facilitate movement of the first housing part 1402a and the second housing part 1402b by the roller elements rotating along concave surfaces of the spacer elements, similar to a manner previously described.

The hinge assembly 1404 may further include multiple straps. As shown, the hinge assembly 1404 includes a first strap 1420a, a second strap 1420b, and a third strap 1420c. The straps may include any material or feature previously described for a strap. The first strap 1420a, the second strap 1420b, and the third strap 1420c include an end secured within an internal volume of the first housing part 1402a. As indicated by the dotted lines, the first strap 1420a, the second strap 1420b, and the third strap 1420c pass through the roller elements and the spacer elements, so that an opposing end can be positioned in an internal volume of the second housing part 1402b. The first strap 1420a, the second strap 1420b, and the third strap 1420c may couple to a first strap retention element 1464a, a second strap retention element 1464b, and a third strap retention element 1464c, respectively. Also, the first strap retention element 1464a, the second strap retention element 1464b, and the third strap retention element 1464c couple to a first tensioning element 1470a, a second tensioning element 1470b, and a third tensioning element 1470c (shown in the enlarged view), respectively. The tensioning elements are designed to provide a pulling force to their respective straps, which may increase the frictional forces between the roller elements and the spacer elements. In some embodiments, the tensioning elements include a bevel washer. Each tension element may include a fastener (similar to a fastener 1432c, in the enlarged view) that is in threaded engagement with a strap retention element. Accordingly, similar to a prior embodiment, each of the first tensioning element 1470a, the second tensioning element 1470b, and the third tensioning element 1470c can be part of an adjustable tensioning system.

The aforementioned tensioning elements may be separated from their respective strap retention elements by wall 1476 in the second housing part 1402b. The wall 1476 may include openings or voids in locations corresponding to the tensioning elements. For example, as shown in the enlarged view, the wall 1476 includes an opening 1478 that allows the fastener 1432c to extend through the third tensioning element 1470c and through the wall 1476 (via the opening 1478). However, the opening 1478 is also small enough to prevent the third tensioning element 1470c from passing through the opening 1478. In other words, the wall 1476 maintains the third tensioning element 1470c (as well as the remaining tensioning elements).

Figure 40:
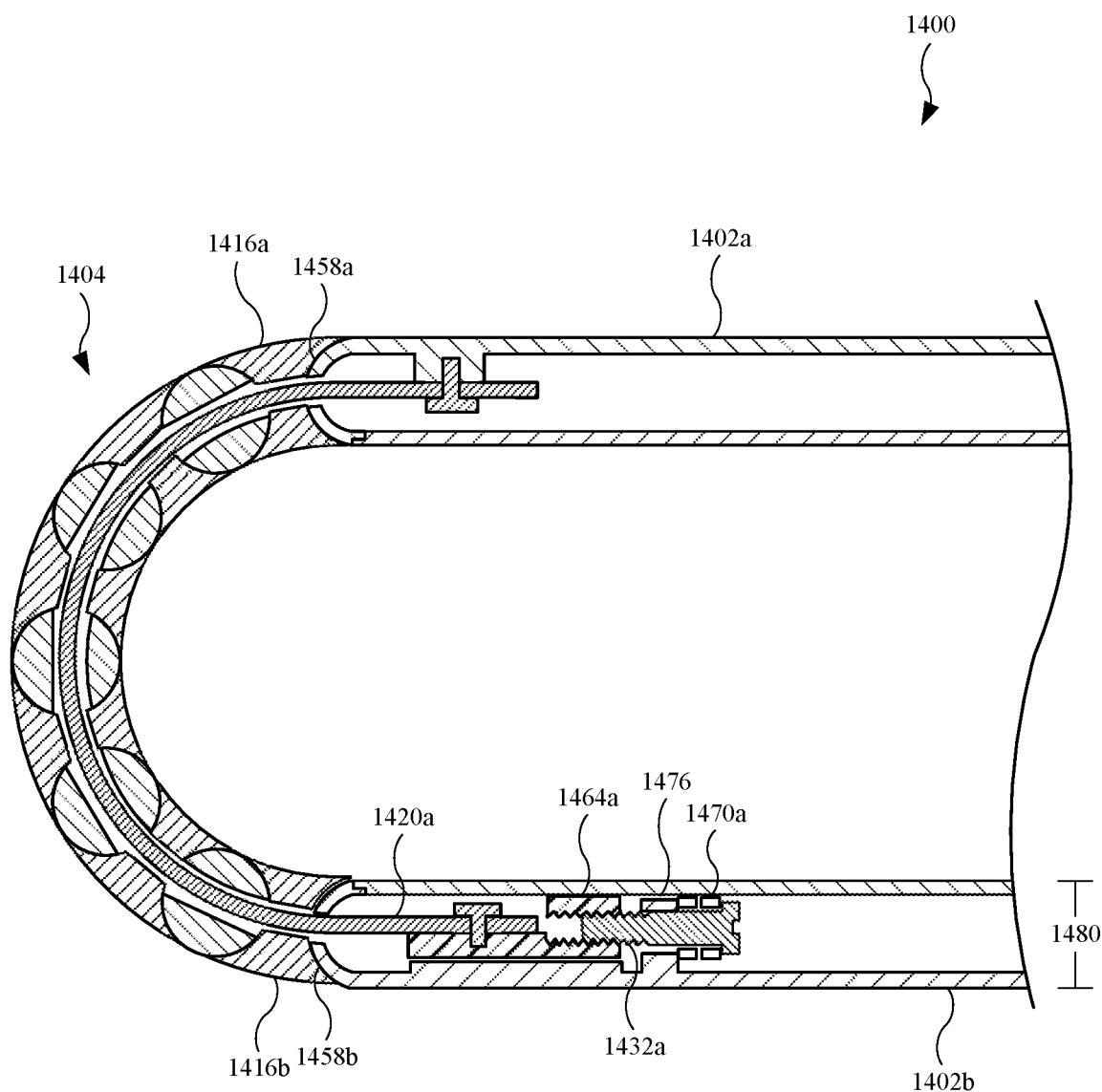
FIG. 40 illustrates a cross sectional view of the system shown in FIGS. 37-39, with the system in the closed position.

FIG. 40 illustrates a cross sectional view of the system 1400 shown in FIGS. 37-39, with the system 1400 in the closed position. The first housing part 1402a and the second housing part 1402b may be modified to mate or couple with the hinge assembly 1404. For example, the first housing part 1402a may include a first curved surface 1458a having a convex surface that mates with a concave surface of a first spacer element 1416a. Also, the second housing part 1402b may include a second curved surface 1458b having a convex surface that mates with a concave surface of a second spacer element 1416b.

As shown in FIG. 40, the first strap 1420a is pulled in tension by way of the first tensioning element 1470a. Also, a fastener 1432a is in threaded engagement with the first strap retention element 1464a. In order to adjust the tension to the first strap 1420a, the fastener 1432a can be rotated. Also, the first tensioning element 1470a may expand to engage both the fastener 1432a and the wall 1476. In this manner, the first tensioning element 1470a may bias the head (not labeled) of the fastener 1432a in a direction away from the wall 1476, thereby biasing the first strap retention element 1464a in a direction toward the wall 1476. As a result of the biasing force, the first tensioning element 1470a may provide a tension, or pulling force, to the first strap 1420a and increase the frictional forces between the roller elements and the spacer elements of the hinge assembly 1404. However, similar to a prior embodiment, the fastener 1432a can be turned/rotated, causing the first tensioning element 1470a to expand or contract to increase or decrease, respectively, the amount of pulling force applied to the first strap 1420a. It should be noted that the second strap 1420b and the third strap 1420c (shown in FIG. 39) may be placed in tension by their respective tensioning elements in a similar manner.

Also, as compared to other systems, the system 1400 shown in FIGS. 37-40 may provide a low-profile system. In this regard, the components in the first housing part 1402a and the second housing part 1402b that are used with the hinge assembly 1404 may occupy less space. For example, the first tensioning element 1470a may include a smaller footprint as compared to that of the tensioning element 136 (shown in FIG. 6). As a result, a height 1480 of the second housing part 1402b is significantly less than a comparable height of the second housing part 102b (in FIG. 2) and the second housing part 1302b (in FIG. 34).

Figure 41:
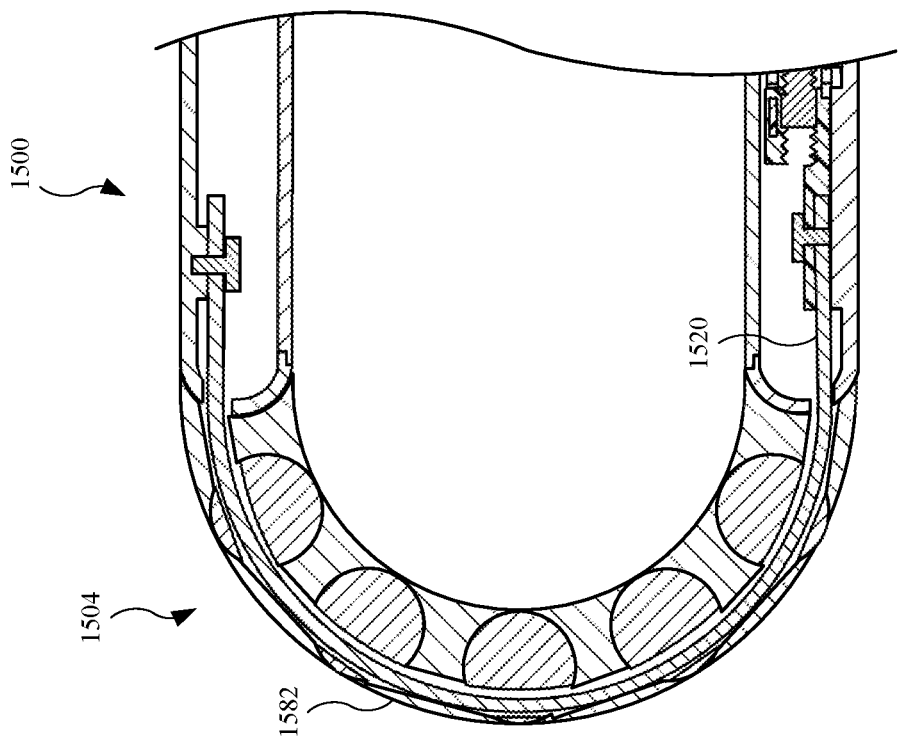
FIG. 41 illustrates a cross sectional view of an alternate embodiment of a system in a closed position, showing the system having a hinge assembly with a strap extending along an outer region of the hinge assembly.

FIG. 41 illustrates a cross sectional view of an alternate embodiment of a system 1500 in a closed position, showing the system having a hinge assembly 1504 with a strap 1520 extending along an outer region 1582 of the hinge assembly 1504. As shown, the hinge assembly 1504 includes roller elements and spacer elements (not labeled) with openings located near the outer region 1582. In the closed position, the tension exerted on the strap 1520 may provide a frictional force to roller elements and the spacer elements of the hinge assembly 1504. However, when the system 1500 transitions to a partially open (or fully open) position, the tension exerted on the strap 1520 may change. For example, the tension exerted on the strap 1520 may increase, causing an increased friction force between the roller elements and the spacer elements. As a result, the system 1500 may provide a lower frictional force in the closed position (which may facilitate opening the system 1500), and a higher frictional force in the partially open (or fully open) position (which may facilitate maintaining the system 1500 in a desired position when the system is not closed).

Figure 42:
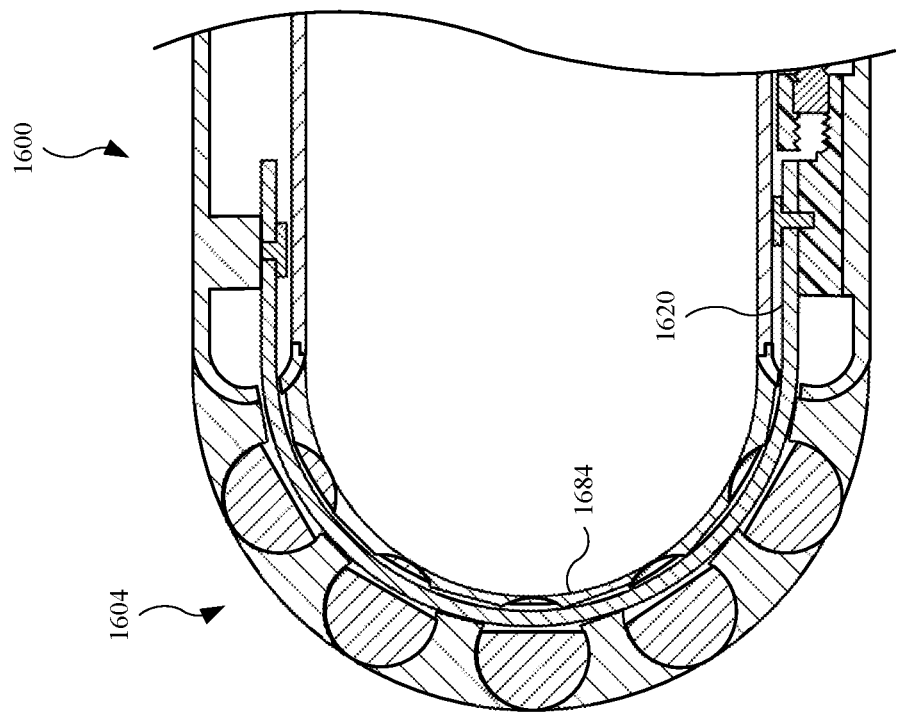
FIG. 42 illustrates a cross sectional view of an alternate embodiment of a system in a closed position, showing the system having a hinge assembly with a strap extending along an inner region of the hinge assembly.

FIG. 42 illustrates a cross sectional view of an alternate embodiment of a system 1600 in a closed position, showing the system 1600 having a hinge assembly 1604 with a strap 1620 extending along an inner region 1684 of the hinge assembly 1604. As shown, the hinge assembly 1604 includes roller elements and spacer elements (not labeled) with openings located near the inner region 1684. In the closed position, the tension exerted on the strap 1620 may provide a frictional force to roller elements and the spacer elements of the hinge assembly 1604. However, when the system 1600 transitions to a partially open (or fully open) position, the tension exerted on the strap 1620 may change. For example, the tension exerted on the strap 1620 may decrease, causing a decreased friction between the roller elements and the spacer elements. As a result, the system 1600 may provide a lower frictional force in the partially open (or fully open) position (which may facilitate movement while in these positions), and a higher frictional force in the closed position (which may facilitate maintaining the closed position of the system 1600 until a user transitions the system 1600 to another position).

Figure 43:
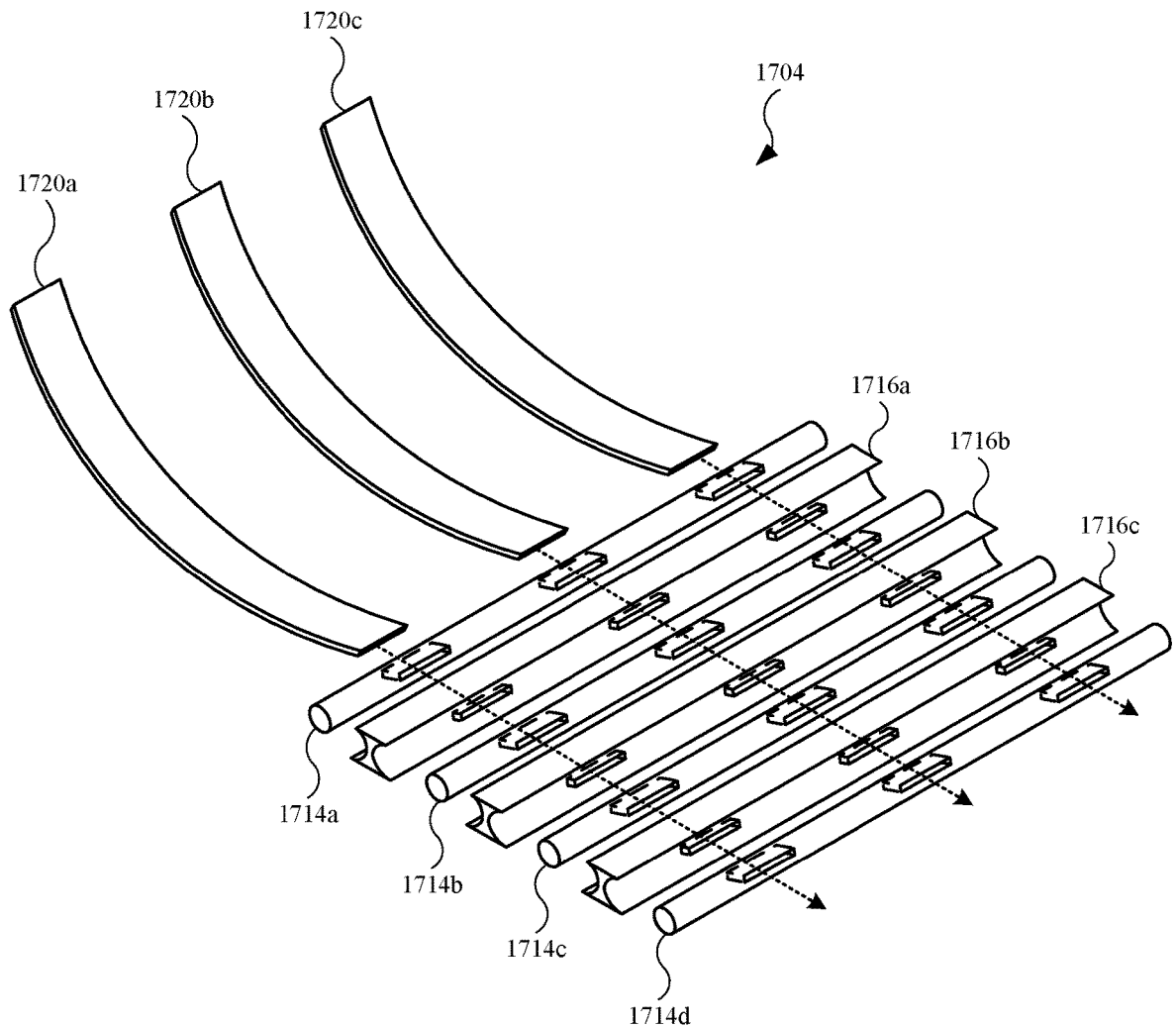
FIG. 43 illustrates an exploded view of an embodiment of a hinge assembly, in accordance with some described embodiments.

Hinge assemblies described herein may include several structural elements. For example, FIG. 43 illustrates an exploded view of an embodiment of a hinge assembly 1704, in accordance with some described embodiments. As shown, the hinge assembly 1704 may include several roller elements. For example, the hinge assembly 1704 includes a first roller element 1714a, a second roller element 1714b, a third roller elements 1714c, and a fourth roller element 1714d. Generally, the roller elements include a cylindrical shape, and accordingly, a circular cross section. However, other shapes (including oblong cross sections) are possible. The hinge assembly 1704 may further include several spacer elements, with a spacer element positioned between roller elements. For example, the hinge assembly 1704 includes a first spacer element 1716a, a second spacer element 1716b, and a third spacer element 1716c. The spacer elements may be referred to as linking elements, as the spacer elements form a *nexus* between consecutive roller elements. Further, the spacer elements may include two concave surfaces, with each concave surface designed to engage the round/curved surface a roller element. The radius of the roller elements may be substantially similar to the radius of curvature of the concave surfaces of the spacer elements. However, in some embodiments, the radius of the roller elements differs from the radius of curvature of the concave surfaces of the spacer elements. This will be shown below.

The hinge assembly 1704 may further include several straps, with each strap passing through a through hole (not labeled), or opening, of the roller elements and the spacer elements. The hinge assembly 1704 includes a first strap 1720a, a second strap 1720b, and a third strap 1720c. The straps may further couple or connect to housing parts, such as the first housing part 102a and the second housing part 102b (shown in FIG. 1). The straps may include materials such as metal (including aluminum or copper), nylon, and/or fiber. Generally, the straps may include a material with flexible and deformable properties.

The straps may provide multiple functions. For example, at least one of the straps can maintain engagement between the roller elements and the spacer elements, when the hinge assembly 1704 is both stationary and in motion. Further, at least one of the straps may be used to limit or prevent movement of the hinge assembly 1704, thereby limiting the hinge assembly 1704 such that a system is restricted to an open position (shown in FIG. 1) or a closed position (shown in FIG. 2). Moreover, some straps described herein are formed from a material known for relatively thermal conductivity (such as graphite). In this manner, the strap can transfer heat from a heat generating component in, for example, the second housing part 102b (shown in FIG. 1) to the first housing part 102a, thereby allowing the transferred to be convectively dissipated from the system 100. However, it should be noted that the straps allow the hinge assembly 1704 to move freely between the two positions. Also, in some instances, each strap provides a different function. For example, the first strap 1720a may couple together two housing parts, thereby providing a force that maintains engagement between the roller elements and the spacer elements. The second strap 1720b may set limits to the movement of the hinge assembly 1704, thereby limiting the angular position of one housing part relative to another housing part. The third strap 1720c may include a flexible circuit, which may form a communication channel for data and power between components in one housing part (such as a display) and another housing part (such as a circuit board, integrated circuits, and a battery). The features shown and described for the hinge assembly 1704 may be present in other hinge assemblies described herein.

Figure 44:
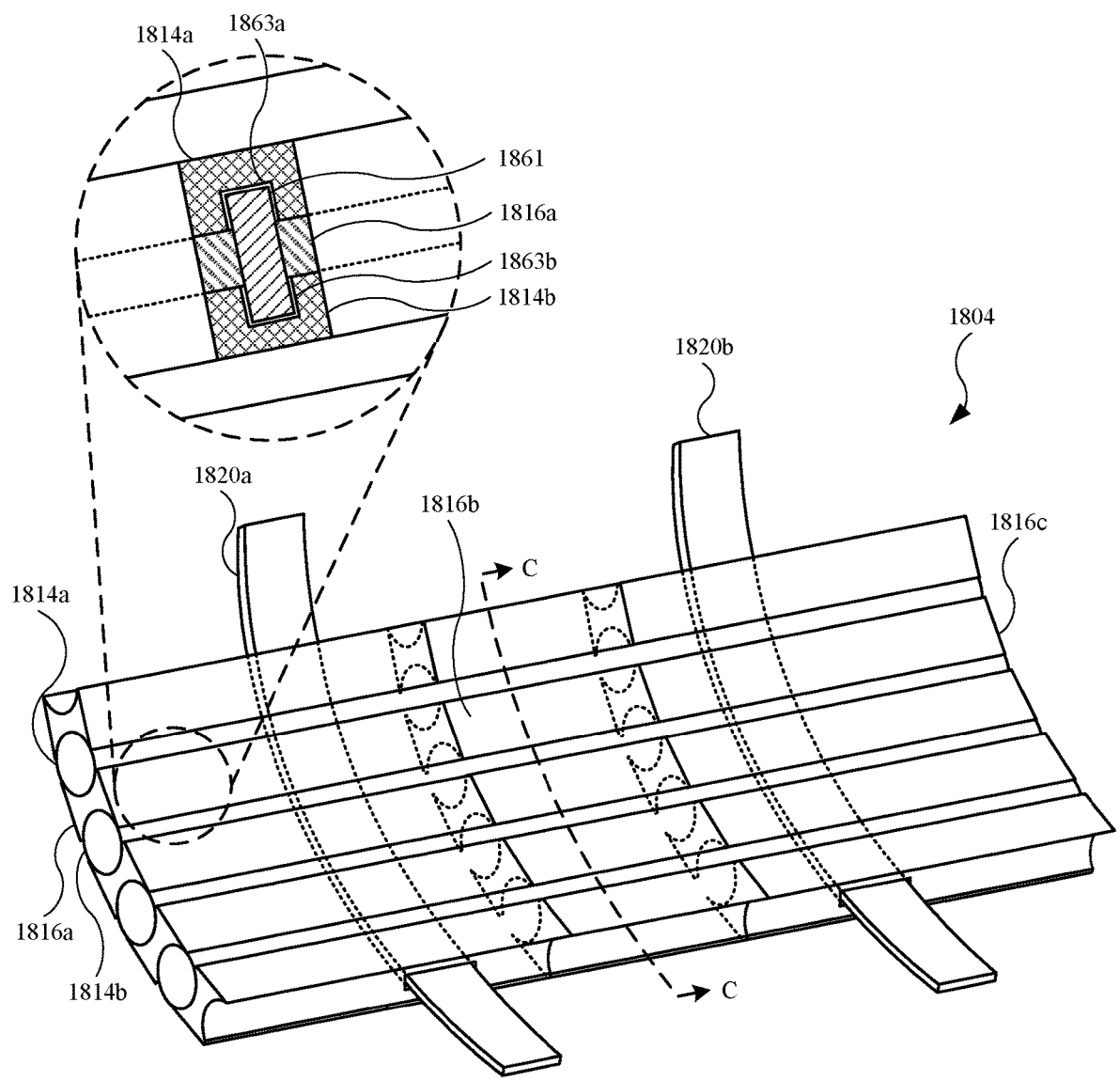
FIG. 44 illustrates an isometric view of an alternate embodiment of a hinge assembly, showing the hinge assembly having segmented spacer elements, in accordance with some described embodiments.

FIG. 44 illustrates an isometric view of an alternate embodiment of a hinge assembly 1804, showing the hinge assembly 1804 having segmented spacer elements, in accordance with some described embodiments. As shown, the hinge assembly 1804 includes a first roller element 1814a and a second roller element 1814b, with a first spacer element 1816a positioned between, and engaged with, the first roller element 1814a and the second roller element 1814b. The first roller element 1814a and the second roller element 1814b (as well as any additional roller elements of the hinge assembly 1804) may extend to opposing outer ends (or opposing edges) of the hinge assembly 1804. However, the spacer elements may be segmented. For example, the first spacer element 1816a is separated from, but aligned with, a second spacer element 1816b, which can be separate from, but aligned with, a third spacer element 1816c.

The segmented configuration of the spacer elements may provide a specific function. For example, the first set of spacer elements (that includes the first spacer element 1816a) and the third set of spacer elements (that includes the third spacer element 1816c) may provide frictional engagement between the spacer elements and roller elements. The second set of spacer elements (that includes the second spacer element 1816b) may include mechanical stop features that limit the hinge assembly 1804 to predetermined positions. The mechanical stop features will be shown and described below. In order to maintain frictional engagement between some roller and spacer elements, the hinge assembly 1804 may include a first strap 1820a that passes through the first set of roller elements and spacer elements (that includes the first roller element 1814a, the second roller element 1814b, and the first spacer element 1816a), and a second strap 1820b that passes through the third set of roller elements and spacer elements (that includes the third spacer element 1816c). The straps may support frictional engagement between, and synchronous motion of, the roller and spacer elements.

To prevent relative lateral movement between roller and spacer elements, the hinge assembly 1804 may include several pins. For example, the enlarged view shows a partial cross sectional view of the first spacer element 1816a having a pin 1861 that extends into a cavity 1863a of the first roller element 1814a and into a cavity 1863b of the second roller element 1814b. The pin 1861 is designed to limit or prevent relative movement of the roller elements with respect to the spacer elements, and vice versa, in order to maintain the first spacer element 1816a, the first roller element 1814a, and the second roller element 1814b with the hinge assembly 1804. Although not shown, the spacer elements through which the first strap 1820a and the second strap 1820b pass may include a pin.

Figure 45:
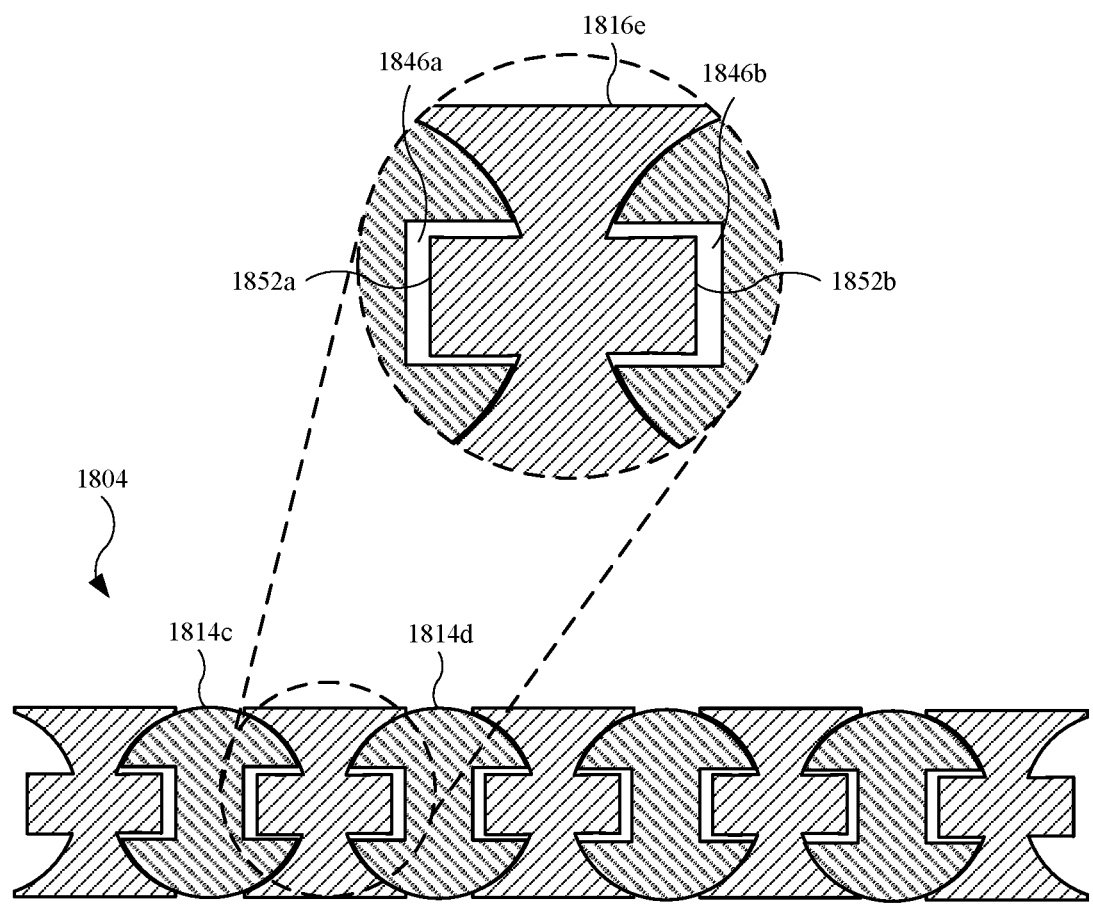
FIG. 45 illustrates a cross sectional view of the hinge assembly shown in FIG. 44, showing the middle spacer segments having protruding features that extending into cavities of the roller elements, in accordance with some described embodiments.

FIG. 45 illustrates a cross sectional view of the hinge assembly 1804 shown in FIG. 44, taken along line C-C, showing the middle spacer segments having protruding features that extending into cavities of the roller elements, in accordance with some described embodiments. As shown in the enlarged view, a spacer element 1816e includes a first protruding feature 1852a and a second protruding feature 1852b, each of which may extend from a concave surface of the spacer element 1816e (with each concave surface designed to engage a roller element). Also, a third roller element 1814c includes a cavity 1846a that receives the first protruding feature 1852a, and a fourth roller element 1814d includes a cavity 1846b that receives the second protruding feature 1852b. The third roller element 1814c and the fourth roller element 1814d include an additional cavity (not labeled). The hinge assembly 1804 may include additional spacer elements (not labeled) with a protruding feature positioned in the additional cavities of roller elements.

The third roller element 1814c and the fourth roller element 1814d are capable of rotational movement (clockwise and counter-clockwise) with respect the spacer element 1816e. However, the first protruding feature 1852a can prevent at least some rotational movement of the third roller element 1814c, as the first protruding feature 1852a can engage the third roller element 1814c within the cavity 1846a. Similarly, the second protruding feature 1852b can prevent at least some rotational movement of the fourth roller element 1814d, as the second protruding feature 1852b can engage the fourth roller element 1814d within the cavity 1846b.

Figure 46:
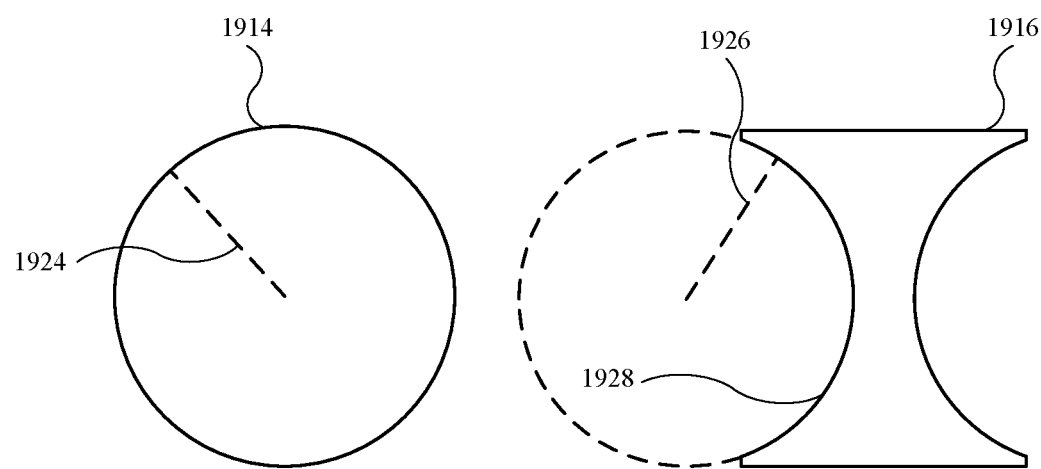
FIG. 46 illustrates a side view of a roller element and a spacer element, showing a comparison between a radius of the roller element and a radius of curvature of the spacer element, in accordance with some described embodiments.

FIG. 46 illustrates a side view of a roller element 1914 and a spacer element 1916, showing a comparison between a radius 1924 of the roller element 1914 and a radius of curvature 1926 of the spacer element 1916, in accordance with some described embodiments. As shown, the spacer element 1916 includes a concave surface 1928 that defines a receiving for the roller element 1914. The concave surface 1928 also defines the radius of curvature 1926 of the spacer element 1916. The radius of curvature 1926 of the spacer element 1916 may include a dimension that is substantially similar, or even greater than, the radius 1924 of the roller element 1914. However, in the embodiment shown in FIG. 46, the radius of curvature 1926 of the spacer element 1916 is less than the radius 1924 of the roller element 1914. This will be shown and discussed below. It should be noted that the spacer element 1916 includes an addition concave surface (not labeled) that may include any properties described for the concave surface 1928.

Figure 47:
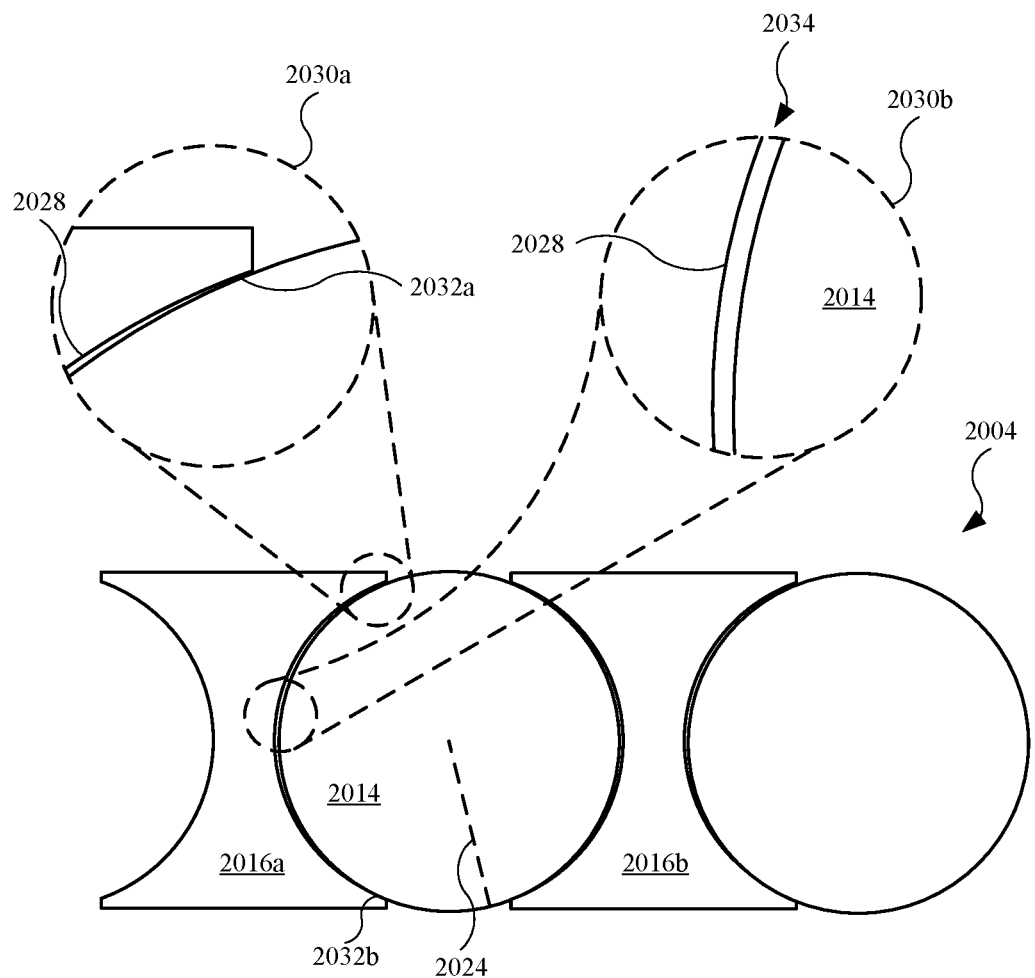
FIG. 47 illustrates a side view of an embodiment of a hinge assembly that includes several roller elements and the spacer element, showing a relationship between roller elements and spacer elements, in accordance with some described embodiments.

FIG. 47 illustrates a side view of an embodiment of a hinge assembly 2004 that includes several roller elements and the spacer element, showing a relationship between roller elements and spacer elements, in accordance with some described embodiments. As shown, a roller element 2014 is positioned between, and engaged with, both a first spacer element 2016a and a second spacer element 2016b. The first spacer element 2016a and the second spacer element 2016b have a similar size and shape. As shown in the first enlarged view 2030a, the roller element 2014 engages the first spacer element 2016a at a first location 2032a, or first engagement region, along a concave surface 2028 of the first spacer element 2016a. The roller element 2014 may also engage the first spacer element 2016a at a second location 2032b, or second engagement region, along the concave surface 2028.

Due in part to the first spacer element 2016a having a concave surface 2028 that is smaller than a radius 2024 of the roller element 2014, the round/curved surface of the roller element 2014 may not engage the concave surface 2028 at certain locations. For example, as shown in the second enlarged view 2030b, the roller element 2014 is separated from the concave surface 2028 (of the first spacer element 2016a) by a gap 2034. The gap 2034 may span from the first location 2032a to the second location 2032b. However, the gap 2034 may vary. For instance, the gap 2034 may gradually increase at a location(s) further from the first location 2032a and the second location 2032b. The first spacer element 2016a may include a symmetric design, and accordingly, the remaining convex surface (not labeled) of the first spacer element 2016a may be similar to the concave surface 2028. Also, it should be noted that the relationship described herein between the roller element 2014 and the first spacer element 2016a may exist between other roller elements and spacer elements of the hinge assembly 2004, such as the second spacer element 2016b.

Figure 48:
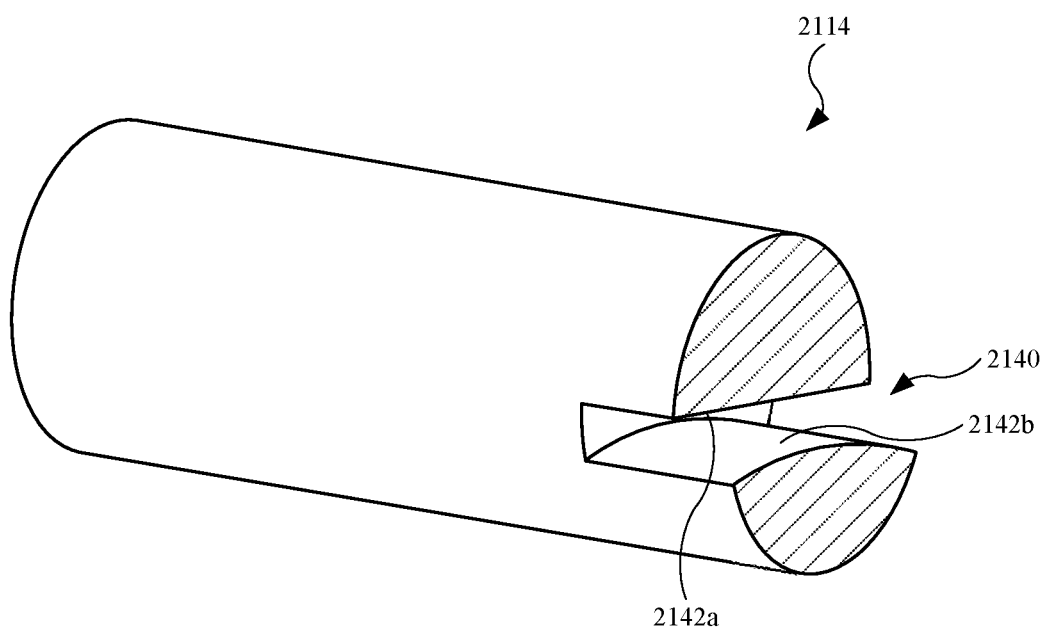
FIG. 48 illustrates a partial cross sectional view of an embodiment of a roller element, showing features of a through hole in the roller element, in accordance with some described embodiments.

FIG. 48 illustrates a partial cross sectional view of an embodiment of a roller element 2114, showing features of a through hole 2140 in the roller element, in accordance with some described embodiments. As shown, the through hole 2140 defines an opening that passes through the roller element 2114. Further, the through hole 2140 may include surfaces of different geometries. For example, the through hole 2140 may include a first surface 2142a having a flat, or generally flat shape. The through hole 2140 may further include a second surface 2142b having a convex shape. The second surface 2142b may define a surface on which an aforementioned strap (not shown in FIG. 48) may lie in certain positions or configurations of a portable computing device (not shown in FIG. 48) that includes the roller element 2114. This will be shown below. Also, although not shown, a roller element described herein may include a through hole with two flat surfaces, with each surface being similar to the first surface 2142a of the roller element 2114.

Alternatively, although not shown, a roller element described herein may include a through hole with two convex surfaces, with each surface being similar to the second surface 2142b of the roller element 2114.

Figure 49:
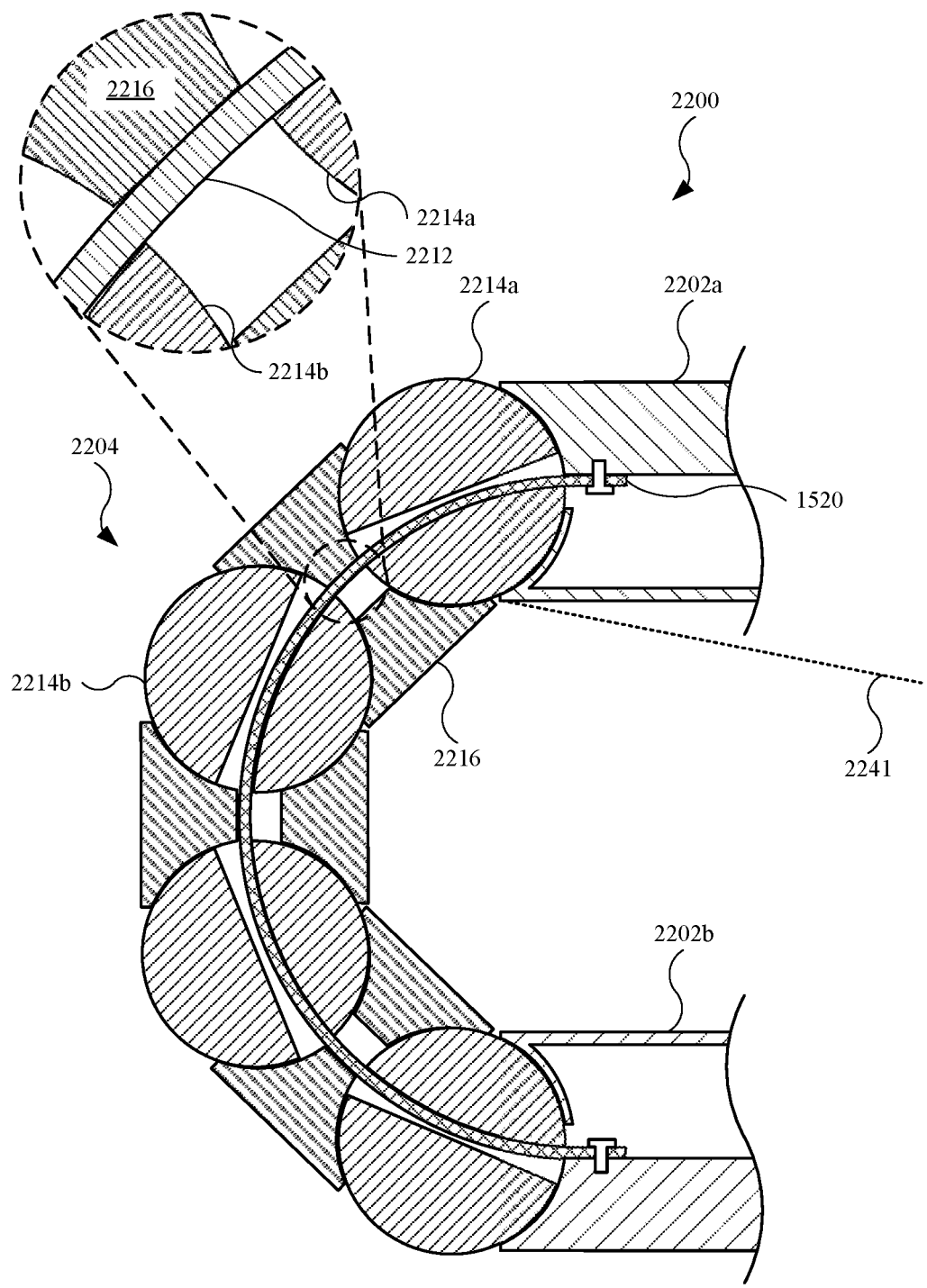
FIG. 49 illustrates a cross sectional view of an embodiment of a system that includes a hinge assembly with a strap limiting movement of the roller elements and the spacer elements, in accordance with some described embodiments.

FIG. 49 illustrates a cross sectional view of an embodiment of a system 2200 that includes a hinge assembly 2204 with a strap 2212 limiting movement of the roller elements and the spacer elements, in accordance with some described embodiments. As shown, the system 2200 includes a first housing part 2202a and a second housing part 2202b connected to a hinge assembly 2204. The hinge assembly 2204 may include a first roller element 2214a, a second roller element 2214b, and a spacer element 2216 positioned between (and engaging) the first roller element 2214a and the second roller element 2214b. The strap 2212 is connected to the first housing part 2202a and the second housing part 2202b and passes through the roller elements and the spacer elements of the hinge assembly 2204.

In FIG. 49, the system 2200 is shown a closed position. As shown, each of the roller elements includes a convex surface on which the strap 2212 is positioned. Also, in the closed position, the strap 2212 may limit the first housing part 2202a from further rotational movement (in a direction toward the dotted line 2241) relative to the second housing part 2202b. Accordingly, the strap 2212 may act as a stop mechanism that limits the roller elements and spacer elements of the hinge assembly 2204. As shown in the enlarged view, the strap 2212 is engaged with surfaces of the first roller element 2214a, the second roller element 2214b, and the spacer element 2216. As a result, the first roller element 2214a, the second roller element 2214b, and spacer element 2216 are prevented from additional two-dimensional movement, and the first roller element 2214a and the second roller element 2214b are prevented from further clockwise rotational movement. However, it should be noted that the strap 2212 may allow movement of the roller elements in the counter-clockwise direction, such that hinge assembly 2204 allows relative movement of the first housing part 2202a relative to the second housing part 2202b, and allows the system 2200 to transition to an open position.

Figure 50:
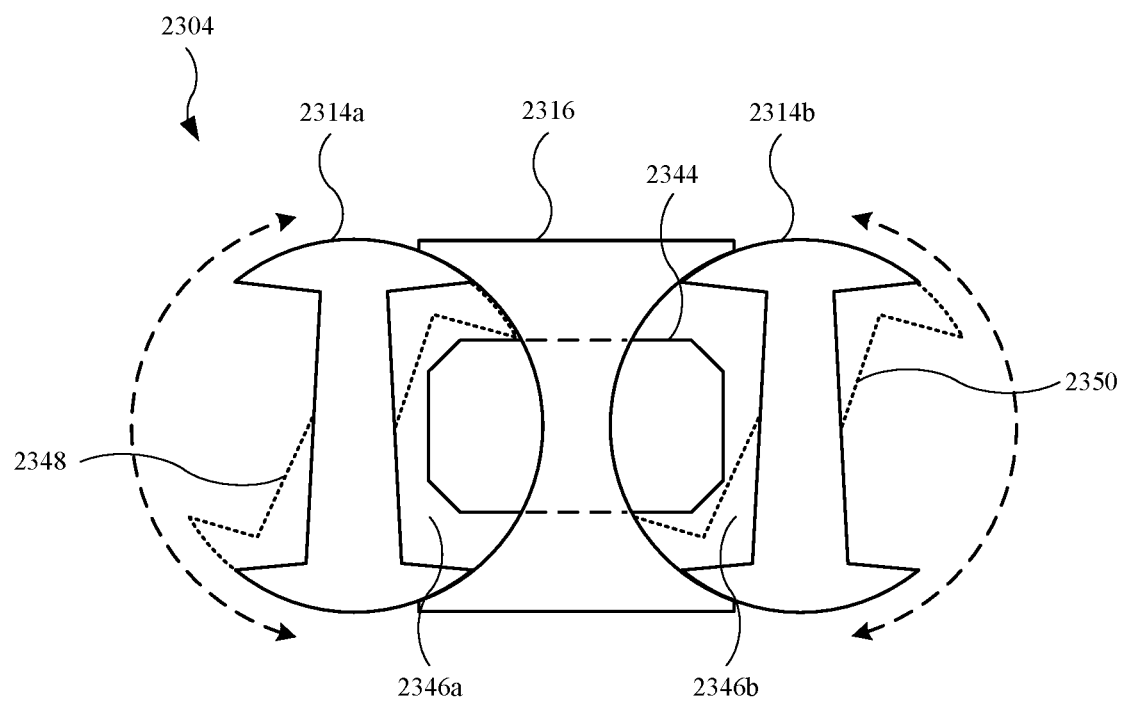
FIG. 50 illustrates a side view of an embodiment of a hinge assembly that includes a spacer element and roller elements, with the spacer element having a pin designed to limit movement of the roller elements, in accordance with some described embodiments.

FIG. 50 illustrates a cross sectional view of an embodiment of a hinge assembly 2304 that includes a spacer element 2316 and roller elements, with the spacer element 2316 having a pin 2344 designed to limit movement of the roller elements, in accordance with some described embodiments. As shown, the hinge assembly 2304 includes a first roller element 2314a and a second roller element 2314b, both of which engage the spacer element 2316. Also, The first roller element 2314a includes a cavity 2346a and the second roller element 2314b includes a cavity 2346b, with the pin 2344 positioned in the cavity 2346a and the cavity 2346b. A "cavity" refers to a void or space in the roller elements. The first roller element 2314a and the second roller element 2314b include an additional cavity (not labeled). The hinge assembly 2304 may include additional spacer elements (not shown in FIG. 50) with a pin positioned in the additional cavities.

The first roller element 2314a and the second roller element 2314b are capable of rotational movement (clockwise and counter-clockwise) with respect the spacer element 2316. However, the pin 2344 (secured to the spacer element 2316) limits at least some rotational movement of the roller elements. For example, a first dotted line 2348 represents clockwise movement of the first roller element 2314a until the first roller element 2314a engages the pin 2344, and a second dotted line 2350 represents clockwise movement of the second roller element 2314b until the second roller element 2314b engages the pin 2344. Accordingly, the pin 2344 may limit rotational movement of the roller elements. It should be noted that the pin 2344 may limit rotational counter-clockwise movement of both the first roller element 2314a and the second roller element 2314b.

Figure 51:
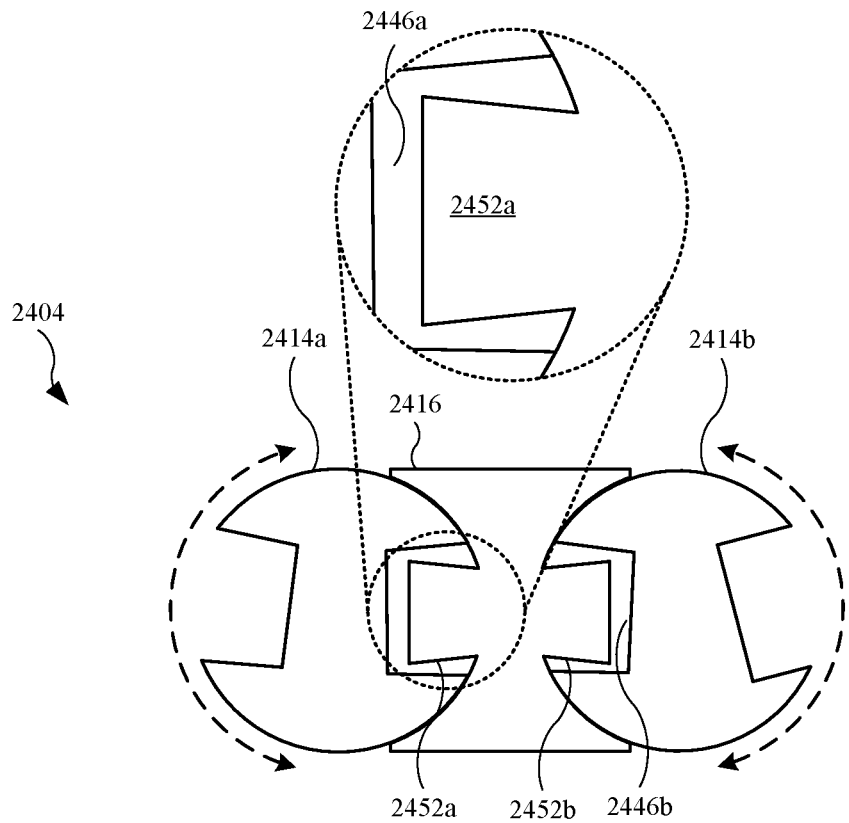
FIG. 51 illustrates a side view of an embodiment of a hinge assembly that includes a spacer element and roller elements, with the spacer element having protruding features designed to limit movement of the roller elements, in accordance with some described embodiments.

FIG. 51 illustrates a cross sectional view of an embodiment of a hinge assembly 2404 that includes a spacer element 2416 and roller elements, with the spacer element 2416 having protruding features designed to limit movement of the roller elements, in accordance with some described embodiments. As shown, the spacer element 2416 includes a first protruding feature 2452a and a second protruding feature 2452b, each of which may extend from a concave surface of the spacer element 2416 (with each concave surface designed to engage a roller element).

In some embodiments, the first protruding feature 2452a and the second protruding feature 2452b define a protrusion. In the embodiment shown in FIG. 51, the first protruding feature 2452a and the second protruding feature 2452b define a dovetail protrusion. As shown in the enlarged view, the first protruding feature 2452a includes multiple tapered regions. The second protruding feature 2452b may include similar features as that of the first protruding feature 2452a. Also, the first roller element 2414a includes a cavity 2446a that receives the first protruding feature 2452a, and the second roller element 2414b includes a cavity 2446b that receives the second protruding feature 2452b. The first roller element 2414a and the second roller element 2414b include an additional cavity (not labeled). The hinge assembly 2404 may include additional spacer elements (not shown in FIG. 51) with a protruding feature positioned in the additional cavities.

The first roller element 2414a and the second roller element 2414b are capable of rotational movement (clockwise and counter-clockwise) with respect the spacer element 2416. However, the first protruding feature 2452a can prevent at least some rotational movement of the first roller element 2414a, as the first protruding feature 2452a can engage the first roller element 2414a within the cavity 2446a. Similarly, the second protruding feature 2452b can prevent at least some rotational movement of the second roller element 2414b, as the second protruding feature 2452b can engage the second roller element 2414b within the cavity 2446b.

Figure 52:
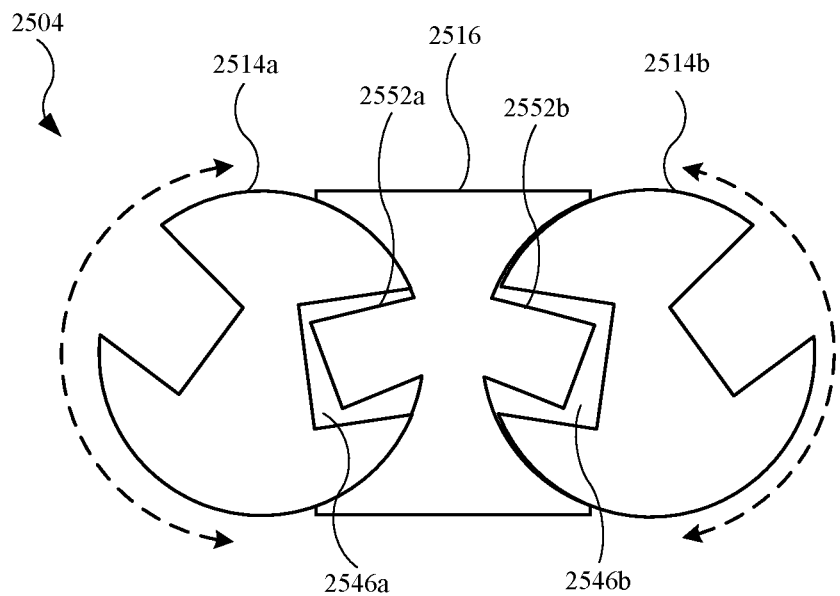
FIG. 52 illustrates a side view of an embodiment of a hinge assembly that includes a spacer element and roller elements, with the spacer element having an enhanced protruding features designed to limit movement of the roller elements, in accordance with some described embodiments.

FIG. 52 illustrates a cross sectional view of an embodiment of a hinge assembly 2504 that includes a spacer element 2516 and roller elements, with the spacer element 2516 having an enhanced protruding features designed to limit movement of the roller elements, in accordance with some described embodiments. As shown, the hinge assembly 2504 includes a first roller element 2514a and a second roller element 2514b, both of which engage the spacer element 2516. Also, the first roller element 2514a and the second roller element 2514b are capable of rotational movement (clockwise and counter-clockwise) with respect the spacer element 2516. The spacer element 2516 may include a first protruding feature 2552a and a second protruding feature 2552b. The first protruding feature 2552a and the second protruding feature 2552b may define a dovetail protrusion. Further, the first protruding feature 2552a and the second protruding feature 2552b may be angled. In other words, the first protruding feature 2552a and the second protruding feature 2552b are positioned on their respective concave surfaces at some non-zero angle with respect to a horizontal line. Also, the first roller element 2514a includes a cavity 2546a that receives the first protruding feature 2552a, and the second roller element 2514b includes a cavity 2546b that receives the second protruding feature 2552b. The first roller element 2514a and the second roller element 2514b include an additional cavity (not labeled). The hinge assembly 2504 may include additional spacer elements (not shown in FIG. 52) with a protruding feature positioned in the additional cavities.

The first roller element 2514a and the second roller element 2514b are capable of rotational movement (clockwise and counter-clockwise) with respect the spacer element 2516. However, the first protruding feature 2552a can prevent at least some rotational movement of the first roller element 2514a, as the first protruding feature 2552a can engage the first roller element 2514a within the cavity 2546a. Similarly, the second protruding feature 2552b can prevent at least some rotational movement of the second roller element 2514b, as the second protruding feature 2552b can engage the second roller element 2514b within the cavity 2546b.

FIGS. 50-52 illustrate hinge assemblies with a single spacer element and a pair of roller elements. It should be noted that the hinge assemblies shown and described in FIGS. 50-52 may include several additional roller elements and spacer elements, similar to other hinge assemblies described herein.

Figure 53:
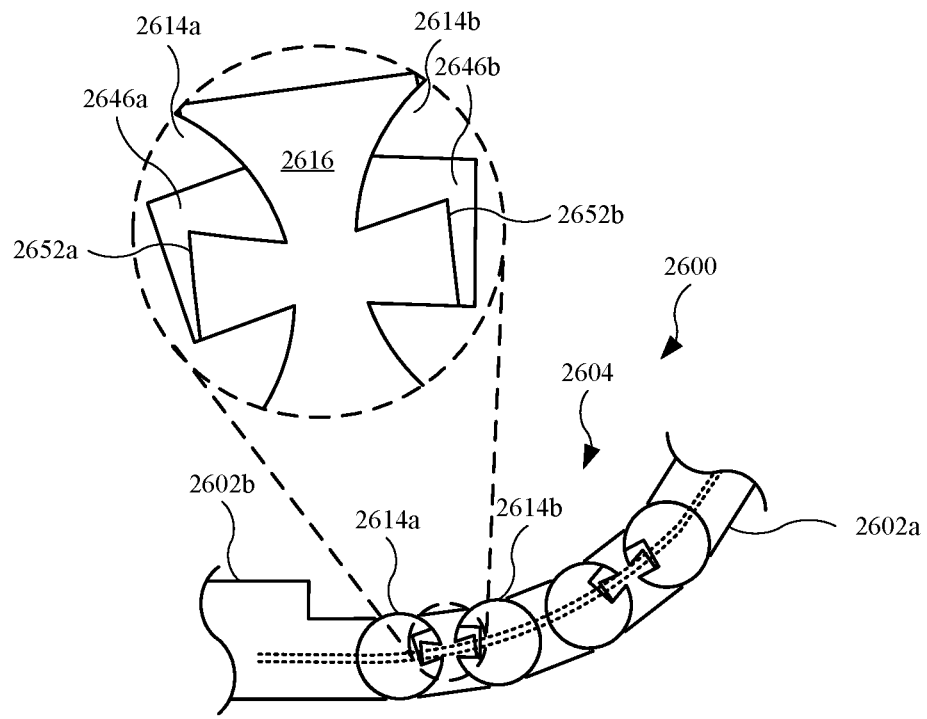
FIG. 53 illustrates a side view of an embodiment of a system in an open position, showing a dovetail configuration of a spacer element limiting movement of roller elements in the open position, in accordance with some described embodiments.

FIG. 53 illustrates a cross sectional view of an embodiment of a system 2600 in an open position, showing a dovetail configuration of a spacer element 2616 limiting movement of roller elements in the open position, in accordance with some described embodiments. As shown, the system 2600 includes a first housing part 2602a connected to a second housing part 2602b by a hinge assembly 2604, with the hinge assembly 2604 having spacer elements, including the spacer element 2616, and several roller elements, including a first roller element 2614a and a second roller element 2614b. The first roller element 2614a includes a cavity 2646a and the second roller element 2614b includes a cavity 2646b. Also, the spacer element 2616 includes a first protruding feature 2652a positioned in the cavity 2646a, and a second protruding feature 2652b positioned in the cavity 2646b.

The hinge assembly 2604 is designed to limit rotation and define the open position of the system 2600. For example, as shown in the enlarged view, the first protruding feature 2652a engages a surface of the first roller element 2614a within the cavity 2646a, and the second protruding feature 2652b engages a surface of the second roller element 2614b within the cavity 2646b, thereby preventing further movement of the hinge assembly 2604. The remaining roller elements and spacer elements (not labeled) may undergo a similar relationship.

Figure 54:
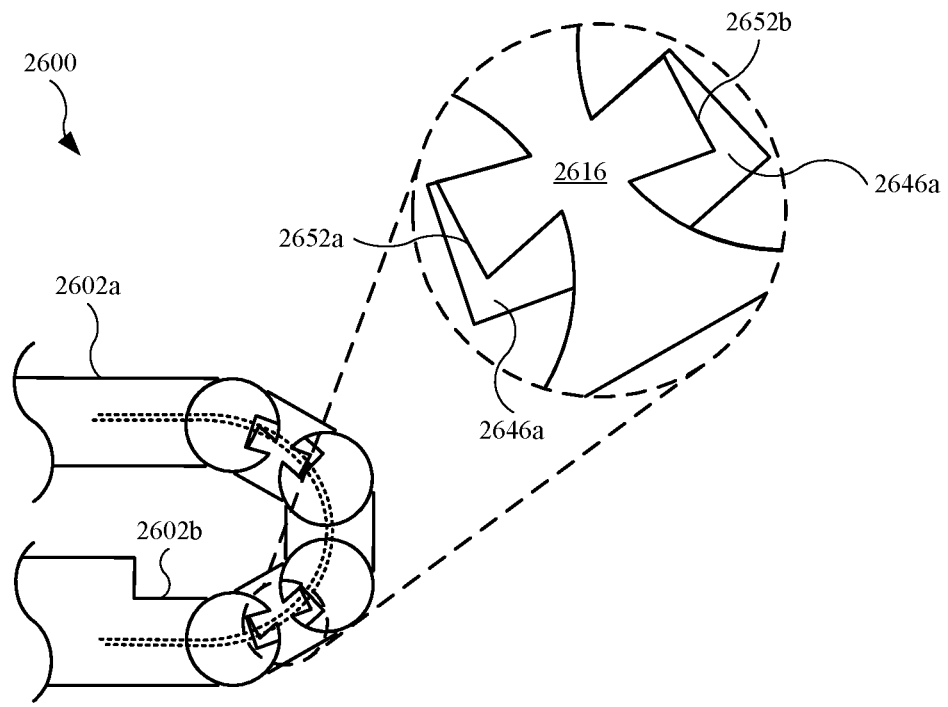
FIG. 54 illustrates a side view of the system shown in FIG. 53, showing the system transition from the open position to a closed position.

FIG. 54 illustrates a side sectional view of the system 2600 shown in FIG. 53, showing the system 2600 transition from the open position to a closed position. As shown, the first housing part 2602a is positioned over the second housing part 2602b, and the housing parts are parallel (or least approximately parallel) in the closed position. As shown in the enlarged view, the first protruding feature 2652a engages a different surface of the first roller element 2614a within the cavity 2646a, as compared to the surface of the first roller element 2614a in the open position (shown in FIG. 40). Also, the second protruding feature 2652b engages a different surface of the second roller element 2614b within the cavity 2646b, as compared to the surface of the second roller element 2614b in the open position (shown in FIG. 40). As a result, the spacer element 2616 prevents further respective movement of the first roller element 2614a and the second roller element 2614b in the closed position. The remaining roller elements and spacer elements (not labeled) may undergo a similar relationship. Accordingly, spacer elements can limit movement of the hinge assembly 2604 for both the open and closed positions.

Figure 55:
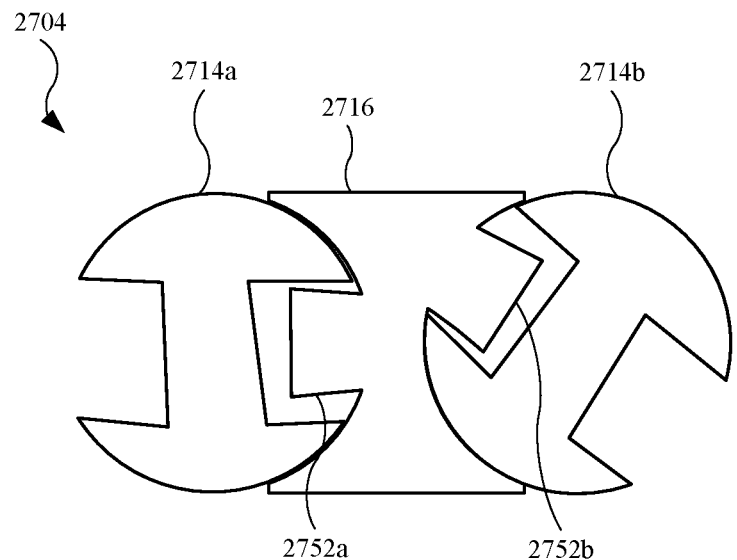
FIG. 55 illustrates a side view of an embodiment of a hinge assembly, showing a spacer element having a protruding feature that is off-center on a concave surface of the spacer element, in accordance with some described embodiments.

FIG. 55 illustrates a side view of an embodiment of a hinge assembly 2704, showing a spacer element 2716 having a protruding feature that is off-center on a concave surface of the spacer element 2716, in accordance with some described embodiments. As shown, the spacer element 2716 is positioned between a first roller element 2714a and a second roller element 2714b. The spacer element 2716 includes a first protruding feature 2752a and a second protruding feature 2752b, each of which may extend from a concave surface of the spacer element 2716 (with each concave surface designed to engage a roller element). As shown, the first protruding feature 2752a is centered, or at least approximately, centered on a concave surface of the spacer element 2716. However, the second protruding feature 2752b is off-center on another concave surface of the spacer element 2716. As a result, the relative degree of rotation between the first roller element 2714a and the second roller element 2714b may differ. This may cause the hinge assembly 2704 to cease movement and cause the positioning a system (not shown in FIG. 55) to differ, as compared to prior embodiments, and different relative positions between housing parts (not shown in FIG. 55) may be achieved.

Figure 56:
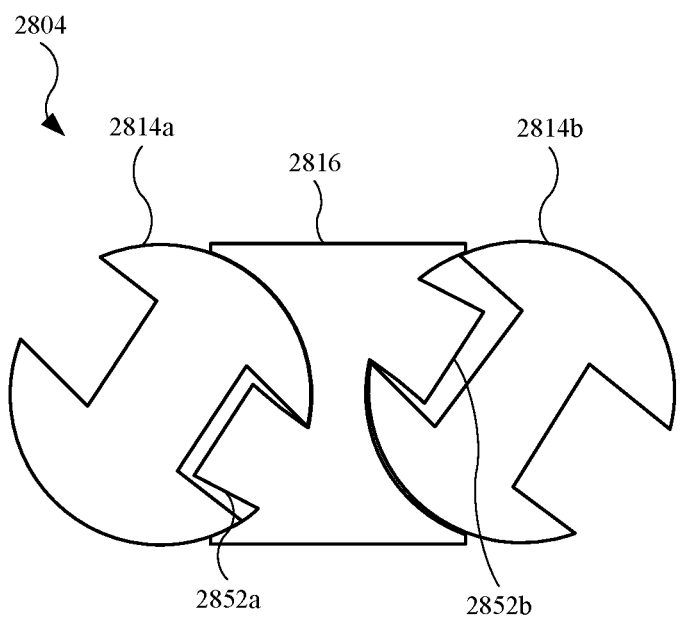
FIG. 56 illustrates a side view of an embodiment of a hinge assembly, showing the spacer element having multiple protruding features that are off-center on concave surfaces of the spacer element, in accordance with some described embodiments.

FIG. 56 illustrates a side view of an embodiment of a hinge assembly 2804, showing the spacer element having multiple protruding features that are off-center on concave surfaces of the spacer element, in accordance with some described embodiments. As shown, the spacer element 2816 is positioned between a first roller element 2814a and a second roller element 2814b. The spacer element 2816 includes a first protruding feature 2852a and a second protruding feature 2852b, each of which may extend from a concave surface of the spacer element 2816 (with each concave surface designed to engage a roller element). As shown, both the first protruding feature 2852a and the second protruding feature 2852b are off-center on their respective concave surfaces of the spacer element 2816. As a result, the relative degree of rotation between the first roller element 2814a and the second roller element 2814b may again differ. This may cause the hinge assembly 2804 to cease movement and cause the positioning a system (not shown in FIG. 56) to differ, as compared to prior embodiments, and different relative positions between housing parts (not shown in FIG. 56) may again be achieved.

Figure 57:
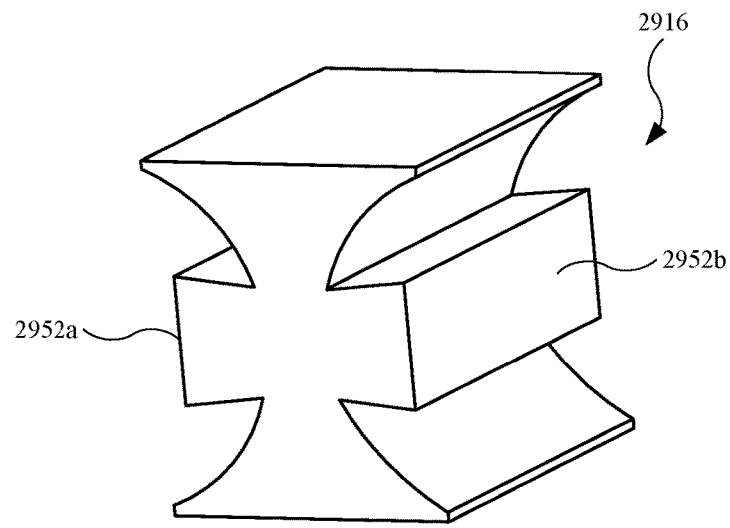
FIG. 57 illustrates an isometric view of a modular spacer element used with a hinge assembly, in accordance with some described embodiments.

FIG. 57 illustrates an isometric view of a modular spacer element 2916 used with a hinge assembly (not shown in FIG. 57), in accordance with some described embodiments. As shown, the modular spacer element 2916 may include a first protruding feature 2952a and a second protruding feature 2952b, similar to prior embodiments. However, the modular spacer element 2916 is designed for removal, if desired, from a hinge assembly (not shown in FIG. 57). This provides a hinge assembly with added flexibility. For example, when the modular spacer element 2916 is installed in a hinge assembly, an open position and/or a closed of a system (not shown in FIG. 57) may be limited to a defined angle. However, when the modular spacer element 2916 is removed from the hinge assembly, the angles defined by the open and closed positions of the system may change.

Figure 58:
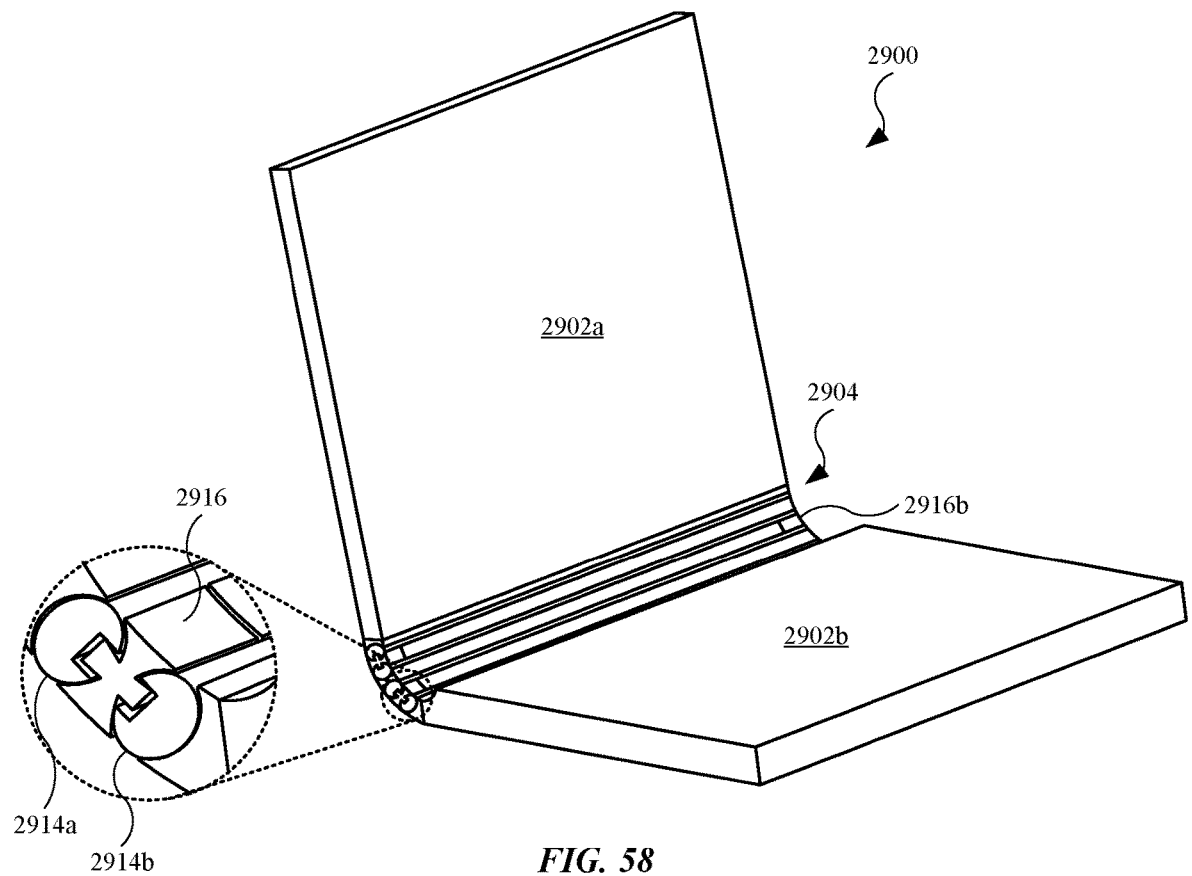
FIG. 58 illustrates an isometric view of an embodiment of a system that includes a hinge assembly with modular spacer elements, in accordance with some described embodiments.

FIG. 58 illustrates an isometric view of an embodiment of a system 2900 that includes a hinge assembly 2904 with modular spacer elements, in accordance with some described embodiments. As shown, the system 2900 includes a first housing part 2902a connected to a second housing part 2902b by the hinge assembly 2904. The modular spacer element 2916 is integrated with the hinge assembly 2904. Also, a second modular spacer element 2916b can be integrated with the hinge assembly 2904.

As shown in the enlarged view, the modular spacer element 2916 is engaged with a first roller element 2914a and a second roller element 2914b of the hinge assembly 2904. Further, the protruding features of the modular spacer element 2916 are engaged with the first roller element 2914a and the second roller element 2914b within their respective cavities. Although not shown, the protruding features of the second modular spacer element 2916b are engaged with the first roller element 2914a and the second roller element 2914b within their respective cavities. As a result, the system 2900 is in the open position, and the first housing part 2902a will not rotate further away from the second housing part 2902b. However, when the modular spacer element 2916 and the second modular spacer element 2916b are removed from the hinge assembly 2904, the first housing part 2902a is now able to rotate further away from the second housing part 2902b. In some instances, the first housing part 2902a can be positioned co-planar with respect to the second housing part 2902b.

Figure 59:
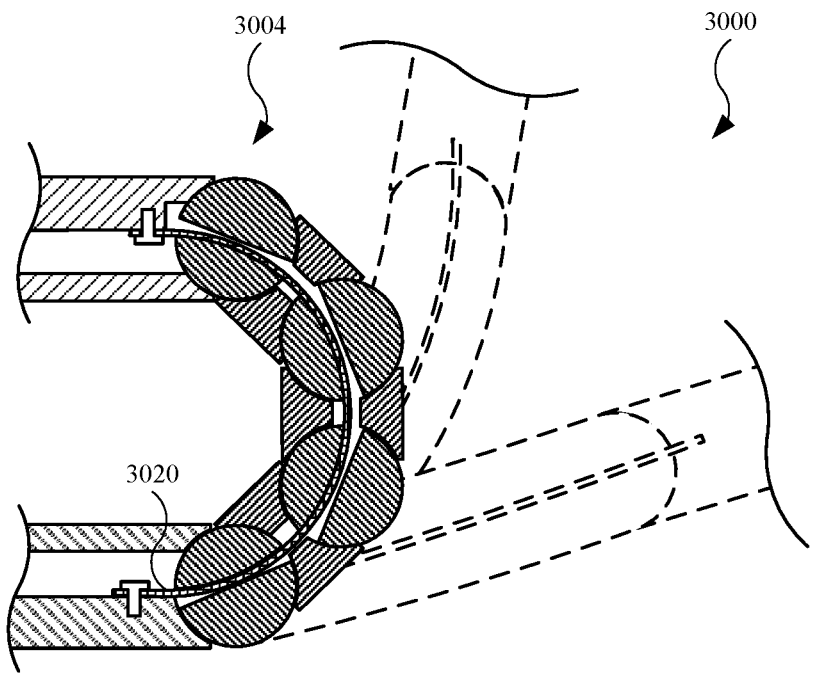
FIG. 59 illustrates a cross sectional view of an embodiment of a system that includes a hinge assembly and a strap, showing the system transition from an open position to an open position, in accordance with some described embodiments.

FIG. 59 illustrates a cross sectional view of an embodiment of a system 3000 that includes a hinge assembly 3004 and a strap 3020, showing the system 3000 transitioning from a closed position to an open position, in accordance with some described embodiments. As shown, the strap 3020 is centrally located in the hinge assembly 3004. In other words, the strap 3020 extends through a center of each of the components of the hinge assembly 3004. When the system 3000 transitions from one position to another position, the effective length of the strap 3020 changes as forces, such as shear stress, applied to the strap 3020 change. In some instances, the resultant effective length of the strap 3020 reduces when the system 3000 is in the open position due to a force that pulls the strap 3020 into the hinge assembly 3004. As a result, the strap 3020 is pulled in tension. Over time, the strap 3020 may break down due the pulling forces by transitioning between the open and closed positions.

Figure 60:
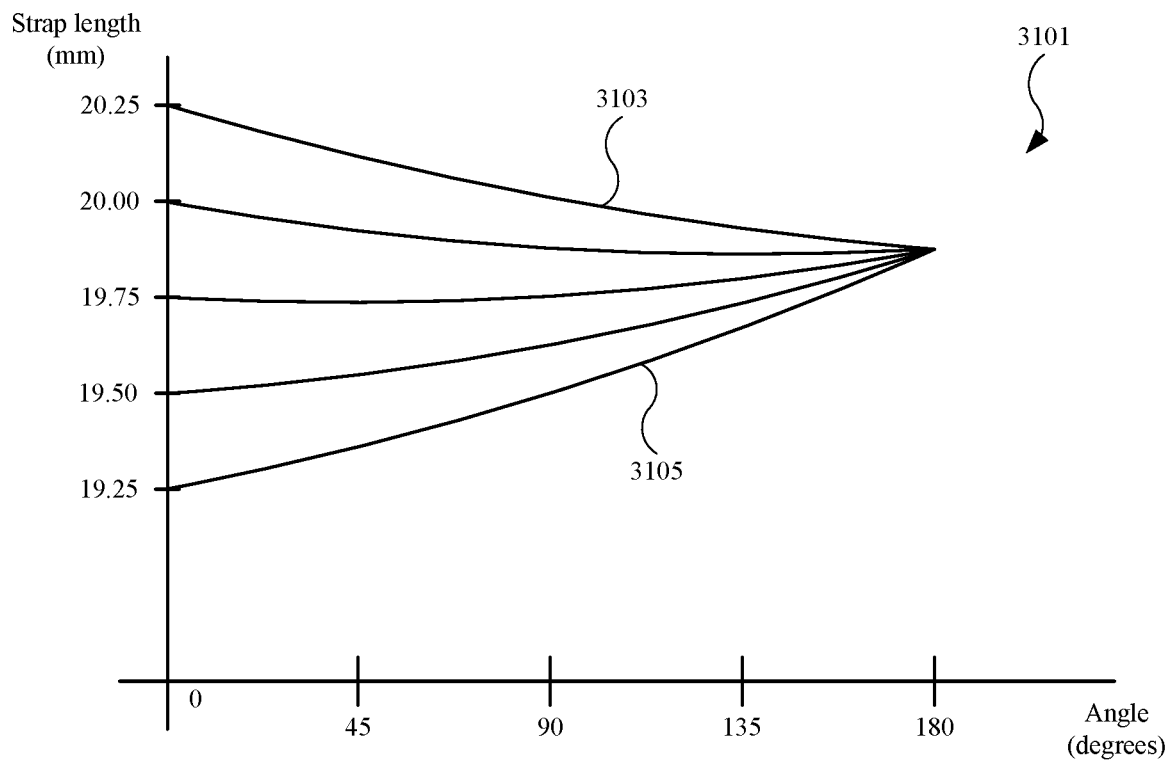
FIG. 60 illustrates a graph of effective length of a strap versus angle.

FIG. 60 illustrates a graph 3101 of effective length of a strap versus angle. The x-axis represents an angle between a first housing part and a second housing part of a system. For example, when the angle is 0 degrees, the system is in a closed position and the first housing part is positioned over the second housing part. When the angle is 180 degrees, the system is in an open position and both the first housing part and the second housing part lie flat in the same plane.

For each plot in the graph 3101, the strap may include the same length prior to any forces acting on the strap. A first plot 3103 represents a system with a strap that is centrally located in, or positioned in the middle of, a hinge assembly of the system. As shown, the effective length of the strap is 20.25 millimeters ("mm") in the closed position, while the effective length of the strap is approximately 19.8 mm in the open position. Accordingly, when the strap is centrally located in the hinge assembly, the first plot 3103 shows the effective length decreases when the system transitions from the closed position to the open position, and tension on the strap may pull the strap into the hinge assembly.

However, by re-positioning the strap in a different location in the hinge assembly, the effective length changes. For example, a second plot 3105 represents a system with a strap that is biased toward (or positioned along) an internal portion of a hinge assembly of the system. As shown, the effective length of the strap is 19.25 mm in the closed position, while the effective length of the strap is approximately 19.8 mm in the open position. Accordingly, when the strap is biased toward the internal portion of the hinge assembly, the second plot 3105 shows the effective length increases when the system transitions from the closed position to the open position, and tension on the strap may pull the strap out of the hinge assembly.

Figure 61:
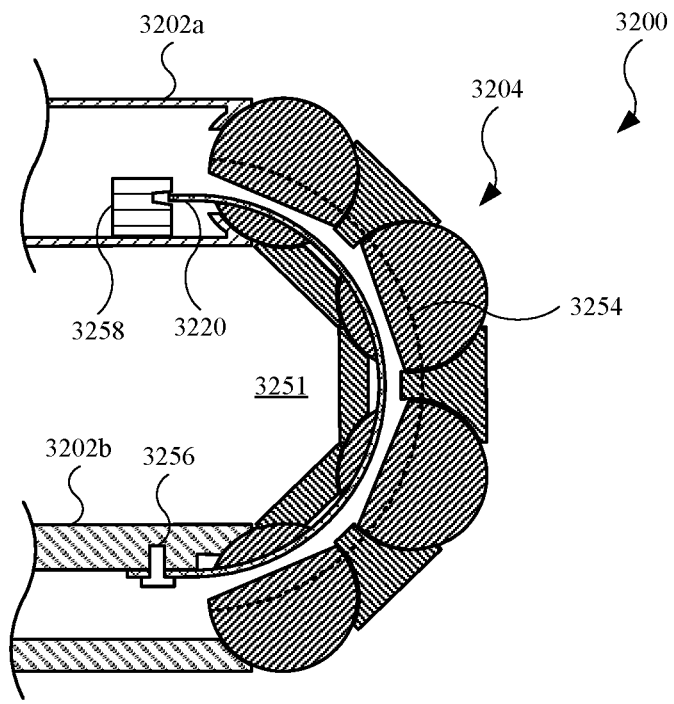
FIG. 61 illustrates a cross sectional view of an embodiment of a system in a closed position, showing the system with a strap that is offset from respective centers of rolling elements and spacer elements that form a hinge assembly, in accordance with some described embodiments.

FIG. 61 illustrates a cross sectional view of an embodiment of a system 3200 in a closed position, showing the system 3200 with a strap 3220 that is offset from respective centers of rolling elements and spacer elements that form a hinge assembly 3204, in accordance with some described embodiments. As shown, the strap 3220 is biased toward an internal portion 3251, or internal region, of the system 3200, with respect to a centerline 3254 (shown as a dotted line) extending through the center of the hinge assembly 3204.

The system 3200 includes a first housing part 3202a and a second housing part 3202b coupled to the hinge assembly 3204. As shown, the strap 3220 is secured to the second housing part 3202b by a pin 3256. However, the strap 3220 is not secured to the first housing part 3202a. Rather, the first housing part 3202a includes a stop mechanism 3258 designed to prevent or limit movement of the strap 3220 in some configurations. It should be noted that in some embodiments (not shown), the strap 3220 can be secured to the first housing part 3202a by the pin 3256 and the stop mechanism 3258 can be positioned in the second housing part 3202b.

Figure 62:
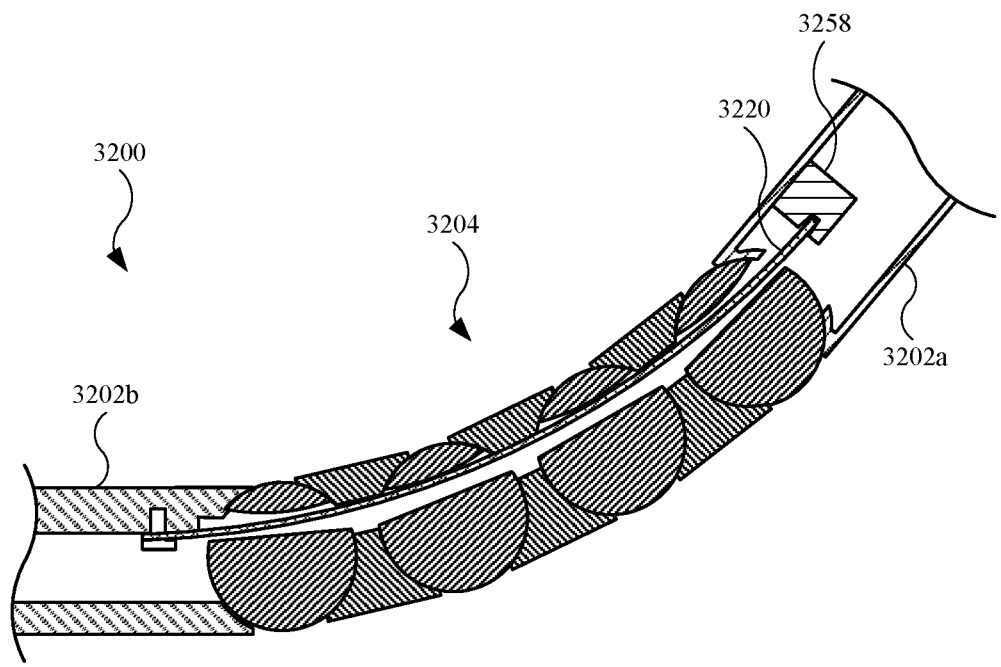
FIG. 62 illustrates a cross sectional view of the system shown in FIG. 61, showing the system in an open position and the strap engaging the stop mechanism.

FIG. 62 illustrates a cross sectional view of the system 3200 shown in FIG. 61, showing the system 3200 in an open position and the strap 3220 engaging the stop mechanism 3258. In the open position, the stop mechanism 3258 prevents further movement of the strap 3220 into the first housing part 3202a. The stop mechanism 3258 accommodates a change in the effective length of the strap 3220, while also limiting movement of the strap 3220 in a certain direction. Subsequent to an assembly operation of the hinge assembly 3204 with the first housing part 3202a and the second housing part 3202b, the stop mechanism 3258 can be adjusted or tuned to set the location at which the strap 3220 will engage the stop mechanism 3258 and be limited from further movement.

Figure 63:
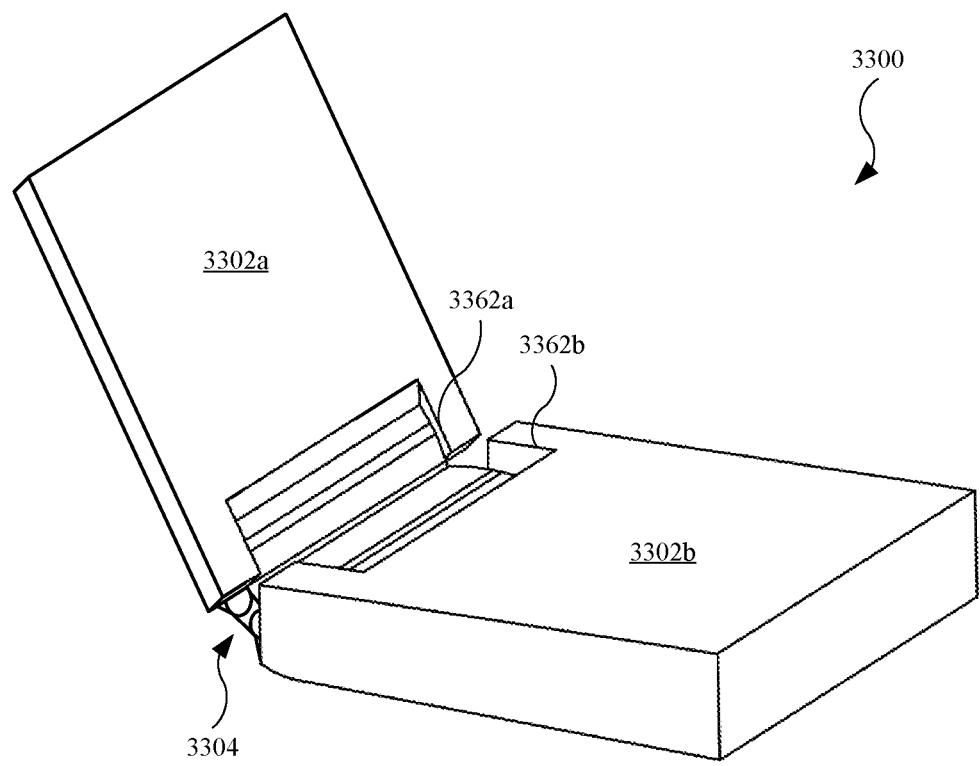
FIG. 63 illustrates an isometric view of an alternate embodiment of a system having recesses designed to accommodate a hinge assembly, in accordance with some described embodiments.

FIG. 63 illustrates an isometric view of an alternate embodiment of a system 3300 having recesses designed to accommodate a hinge assembly 3304, in accordance with some described embodiments. The system 3300 may include several features described herein for a system. As shown, the system 3300 includes a first housing part 3302a and a second housing part 3302b. The system 3300 may further include a hinge assembly 3304 coupled to the first housing part 3302a and the second housing part 3302b. Also, the first housing part 3302a may include a first recess 3362a and the second housing part 3302b may include a second recess 3362b. The recesses are designed to receive the hinge assembly 3304. This will be shown and described below.

Figure 64:
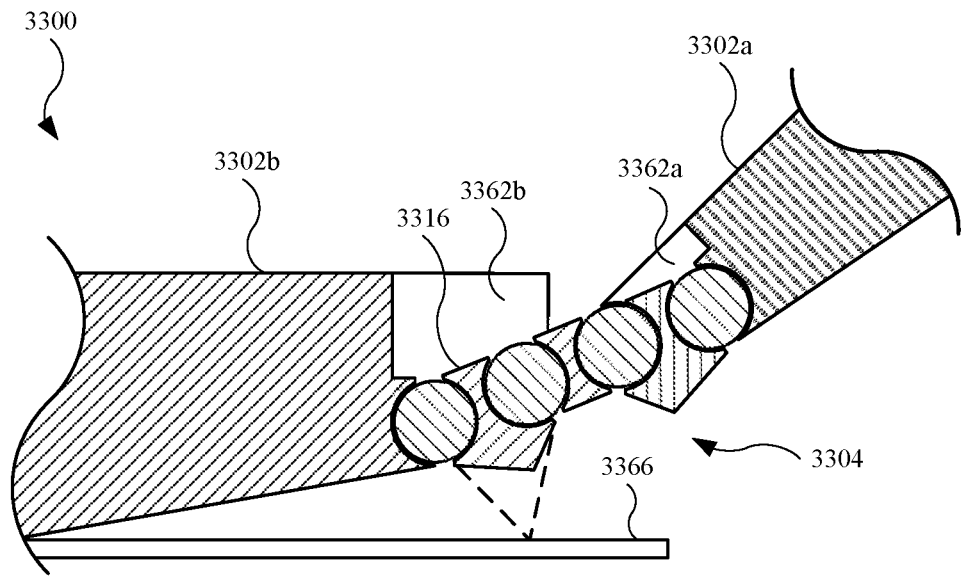
FIG. 64 illustrates a partial cross sectional view of the system shown in FIG. 63, showing the system in an open position.

FIG. 64 illustrates a partial cross sectional view of the system 3300 shown in FIG. 48, showing the system 3300 in an open position. As shown, the hinge assembly 3304 may be positioned, or at least partially positioned, in the first recess 3362a of the first housing part 3302a and in the second recess 3362b of the second housing part 3302b. Also, the hinge assembly 3304 includes several spacer elements and roller elements. For example, the hinge assembly 3304 includes a spacer element 3316. In some instances, the spacer element 3316 may extend (as shown in the dotted lines) from the hinge assembly 3304 and define a support for the system 3300. Further, when the spacer element 3316 engages a surface 3366 (which may include a table or desk, as non-limiting examples), the spacer element 3316 may elevate the system 3300 (and in particular, the second housing part 3302b) away from the surface 3366.

Figure 65:
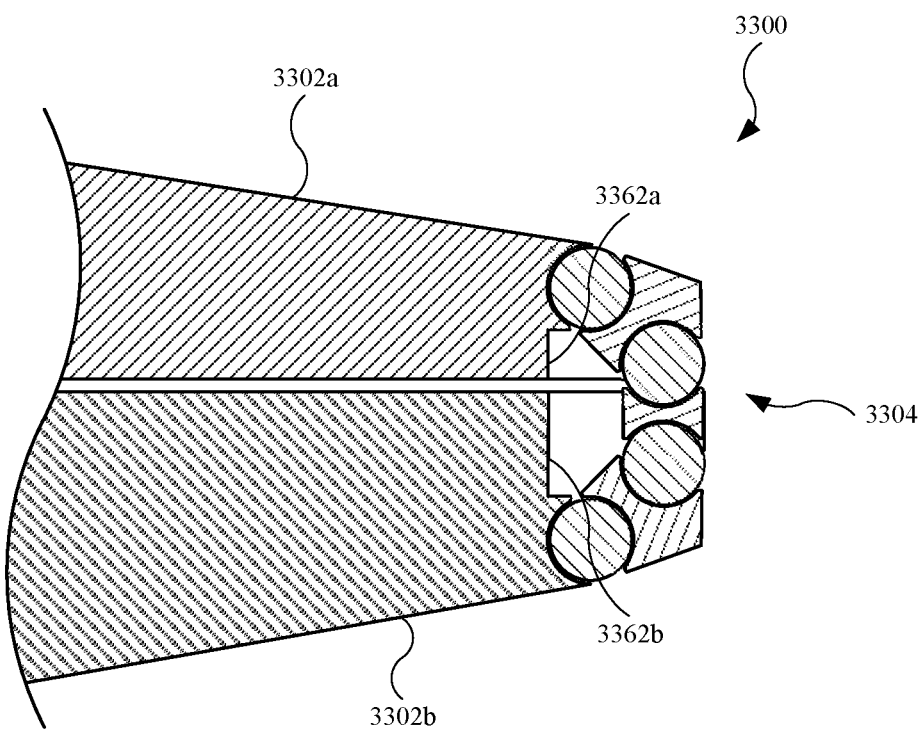
FIG. 65 illustrates a partial cross sectional view of the system shown in FIG. 63, showing the system in a closed position.

FIG. 65 illustrates a partial cross sectional view of the system 3300 shown in FIG. 48, showing the system 3300 in a closed position. As shown, the hinge assembly 3304 is positioned in the first recess 3362a such that the hinge assembly 3304 is flush, or co-planar, with respect to an outer perimeter of the first housing part 3302a. Also, the hinge assembly 3304 is positioned in the second recess 3362b such that the hinge assembly 3304 is flush, or co-planar, with respect to an outer perimeter of the second housing part 3302b. As a result, the system 3300 may include a compact design with a hinge assembly 3304 that is functional with several moving parts, while also providing an aesthetic design.

FIG. 66 illustrates a plan view of an alternate embodiment of a strap 3420 that includes several blocks, in accordance with some described embodiments. As shown, the strap 3420 includes several blocks, such as a first block 3466a and a second block 3466b. Several additional blocks (not labeled) are shown. The strap 3420 may include a through hole, or opening, for each block. For example, the strap 3420 includes a through hole 3468 through which a portion of the first block 3466a passes. The blocks may limit or prevent some movement of the strap 3420. In this regard, when the strap 3420 is integrated into a hinge assembly (not shown in FIG. 66), the blocks may limit or prevent some movement of the hinge assembly.

FIG. 67 illustrates a cross sectional view of the strap shown in FIG. 66, showing the strap 3420 in a bent configuration. When the strap 3420 is in the bent configuration, the strap 3420 may resemble a configuration of a system (not shown in FIG. 67) in a closed position. As shown, the blocks are separated from each other when the strap 3420 is in the bent configuration.

FIG. 68 illustrates a cross sectional view of the strap 3420 shown in FIG. 66, showing the strap 3420 in a flat configuration. When the strap 3420 is in the flat configuration, the strap 3420 may resemble a configuration of a system (not shown in FIG. 53) in an open position. As shown, the blocks are engaged each other when the strap 3420 is in the flat configuration to limit movement of the strap 3420. For example, the first block 3466a is engaged with the second block 3466b. Although not shown, the blocks may engage each to limit the movement of the strap 3420 to different angles. For example, the blocks may engage each to limit the movement of the strap 3420 to an angle approximately in the range of 90-135 degrees such that when integrated into a system, the housing parts (not shown in FIG. 68) are limited to an angular position with respect to each other approximately in the range of 90-135 degrees. The blocks may include different sizes and shapes in or achieve a desired angle.

FIGS. 69-82 show various embodiments of roller elements and spacer elements that may be integrated into a hinge assembly described herein. FIGS. 69-82 may also show and describe methods for forming a roller element or a spacer element. Although FIGS. 69-82 may show and describe either a roller element or a spacer element, the processes and configurations may be applied to a spacer element or a roller element, respectively.

Figure 69:
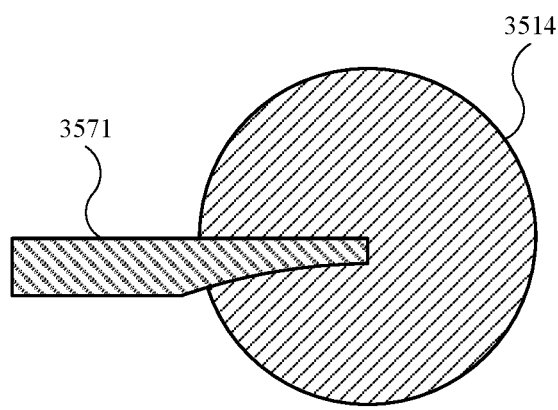
FIG. 69 illustrates a cross sectional view of an embodiment of a roller element, showing the roller undergoing a cutting operation by a tool, in accordance with some described embodiments.

FIG. 69 illustrates a cross sectional view of an embodiment of a roller element 3514, showing the roller undergoing a cutting operation by a tool 3571, in accordance with some described embodiments. The tool 3571 may include an electrical discharge machining ("EDM") tool. Alternatively, the tool 3571 may include an electrochemical machining ("ECM") tool. Also, in some embodiments, the tool 3571 includes a T-cutting tool. As shown, the tool 3571 may cut partially through the roller element 3514.

Figure 70:
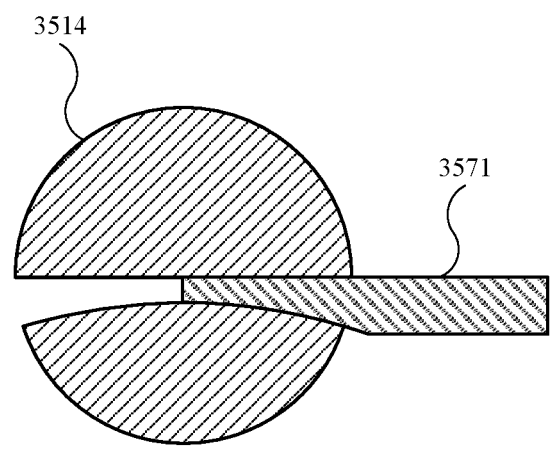
FIG. 70 illustrates a cross sectional view of the roller shown in FIG. 69, showing the roller element further undergoing the cutting operation.

FIG. 70 illustrates a cross sectional view of the roller shown in FIG. 69, showing the roller element 3514 further undergoing the cutting operation. The tool 3571 may again cut partially through the roller element 3514. Further, the partial cut through the roller element 3514 by the tool 3571 is aligned with the initial partial cut (shown in FIG. 69).

Figure 71:
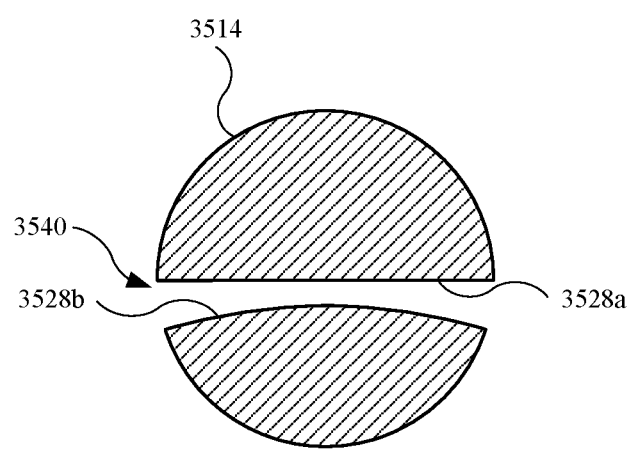
FIG. 71 illustrates a cross sectional view of the roller element shown in FIG. 70, showing the roller element subsequent to the cutting operation.

FIG. 71 illustrates a cross sectional view of the roller element 3514 shown in FIG. 70, showing the roller element 3514 subsequent to the cutting operation. As shown, the cutting operation through the roller element 3514 forms a through hole 3540 that defines an opening that passes through the roller element 3514. Further, the through hole 3540 may include surfaces of different geometries. For example, the through hole 3540 may include a first surface 3528a having a flat, or generally flat shape. The through hole 3540 may further include a second surface 3528b having a convex shape. The second surface 3528b may define a surface on which an aforementioned strap (not shown in FIG. 71) may lie in certain positions or configurations of a portable computing device (not shown in FIG. 71) that includes the roller element 3514.

Figure 72:
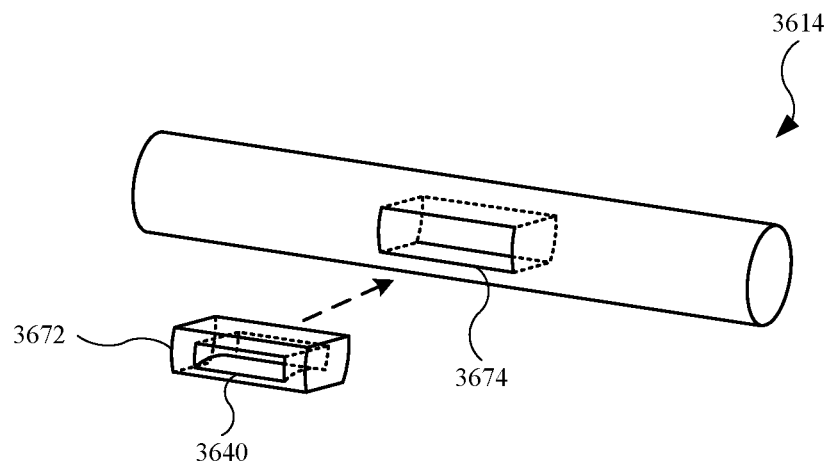
FIG. 72 illustrates an isometric view of an embodiment of a roller element, showing an insert designed for integration with the roller element, in accordance with some described embodiments.

FIG. 72 illustrates an isometric view of an embodiment of a roller element 3614, showing an insert 3672 designed for integration with the roller element 3614, in accordance with some described embodiments. As shown, the roller element 3614 includes a through hole 3674 having a size and shape in accordance with the insert 3672. The insert 3672 may include a pre-molded or pre-fabricated part. The insert 3672 may include a metal or a hardened plastic material, as non-limiting examples. Further, the insert 3672 includes a through hole 3640 designed to receive a strap (not shown in FIG. 72). The through hole 3640 may include a convex and a flat surface. This will be shown below. In this manner, the cutting operation used to form the through hole 3674 may be less complex, as compared to prior embodiments, as the through hole 3640 is formed to a specification prior to inserting the insert 3672 into the through hole 3674 of the roller element 3614.

Figure 73:
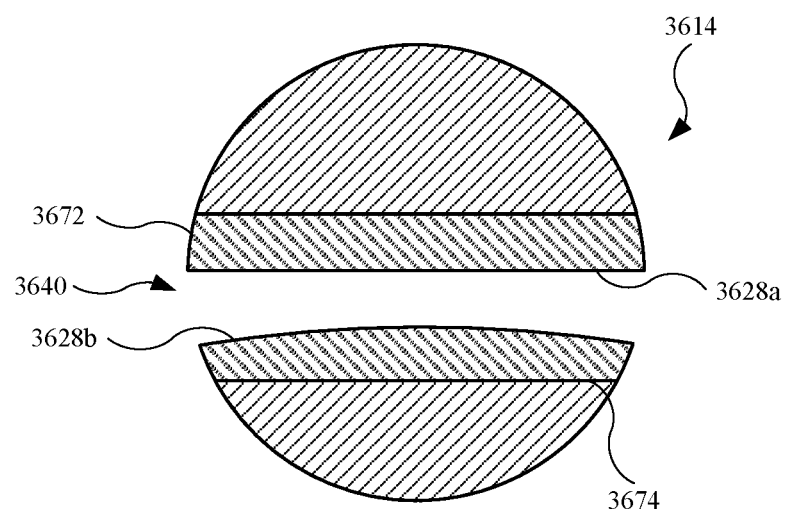
FIG. 73 illustrates a cross sectional view of the roller element shown in FIG. 72, showing the insert positioned in the roller element.

FIG. 73 illustrates a cross sectional view of the roller element 3614 shown in FIG. 72, showing the insert 3672 positioned in the roller element 3614. The insert 3672 may be adhesively secured, welded or molded to the roller element 3614 at the through hole 3674. The through hole 3640 of the insert 3672 may include a first surface 3628a having a flat shape, and a second surface 3628b having a convex shape. The second surface 3628b may define a surface on which strap (not shown in FIG. 73) may lie in certain positions or configurations of a portable computing device (not shown in FIG. 73) that includes the roller element 3614.

Figure 74:
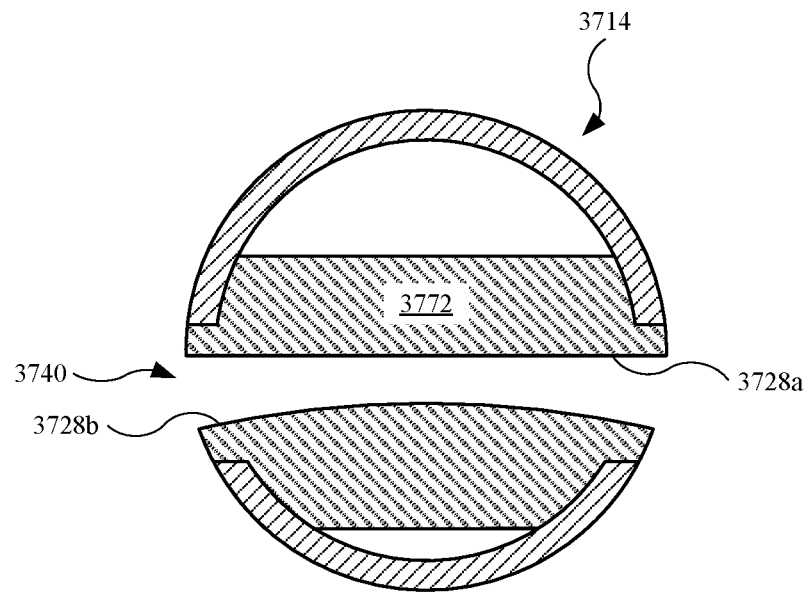
FIG. 74 illustrates a cross sectional view of an embodiment of a roller element, showing the roller element having an insert that defines an opening for a strap, in accordance with some described embodiments.

FIG. 74 illustrates a cross sectional view of an embodiment of a roller element 3714, showing the roller element 3714 having an insert 3772 that defines a through hole 3740, in accordance with some described embodiments. The insert 3772 may be formed through a molding operation to the roller element 3714. The molding operation may include an over molding or an injection molding operation, as non-limiting examples. Also, as shown in FIG. 74, the roller element 3714 is defined by a tube that is generally hollow, with the exception of the insert 3772. The hollow tube may reduce the material used to form the roller element 3714, which may reduce the costs and overall weight of a hinge assembly (not shown in FIG. 74) that includes the roller element 3714. The insert 3772 may include a through hole 3740 that provides a path through which a strap (not shown in FIG. 74) is positioned. As shown, the through hole 3740 may include a first surface 3728a that is generally flat or planar, as well as a second surface 3728b that includes a convex shape.

Figure 75:
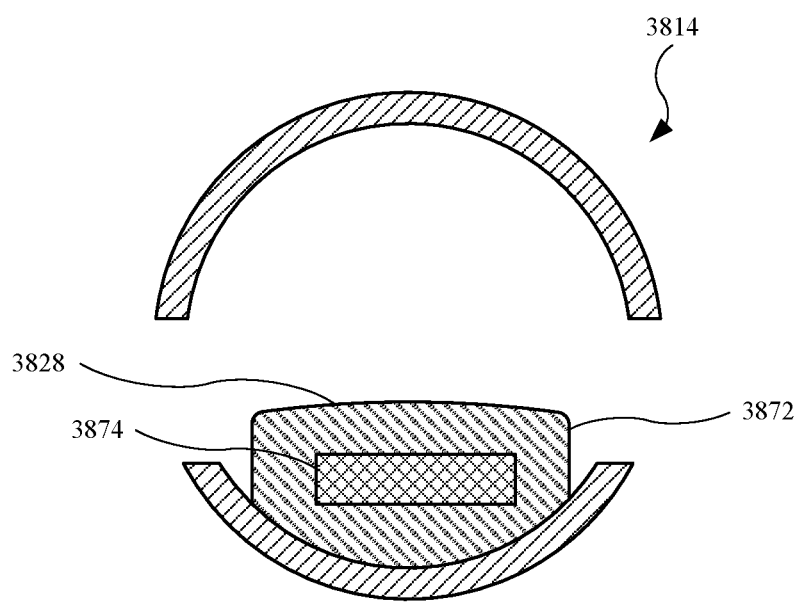
FIG. 75 illustrates a cross sectional view of an embodiment of a roller element, showing the roller element that includes a molded insert that defines a single surface for a strap, in accordance with some described embodiments.

FIG. 75 illustrates a cross sectional view of an embodiment of a roller element 3814, showing the roller element 3814 having an insert 3872 that defines a single surface for a strap, in accordance with some described embodiments. The insert 3872 can be formed through a molding operation to the roller element 3814. The molding operation may include an over molding or an injection molding operation, as non-limiting examples. As shown in FIG. 75, the roller element 3814 is defined by a tube that is generally hollow, with the exception of the insert 3872. In order to further reduce the weight of the roller element 3814, the insert 3872 can be molded in a manner that provides a single surface for a strap (not shown in FIG. 75). As shown, the insert 3872 may include surface 3828 that includes a convex shape. As a result, the insert 3872 provides a more simplified insert with less material (and less associated weight), as compared to the insert 3872, as compared to the insert 3772 shown in FIG. 74.

Also, when the insert 3872 (and in some instances, both the insert 3872 and the roller element 3814) is formed from a non-metal, a wireless component 3874 can be embedded in the insert 3872. The wireless component 3874 may include an antenna or some other wireless hardware. This may provide a portable electronic device (not shown in FIG. 75) that includes the roller element 3814 with wireless communication without occupying space in the portable electronic device, thereby providing additional space in the portable electronic device for other components.

Figure 76:
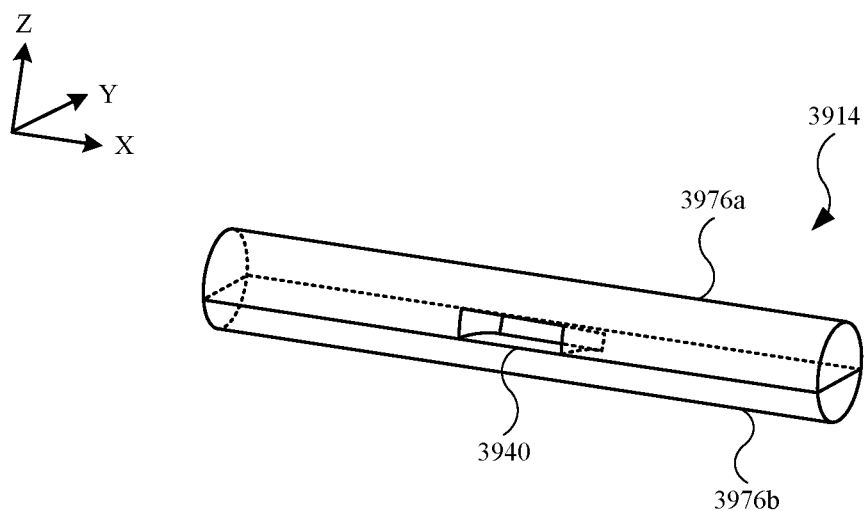
FIG. 76 illustrates an isometric view of an embodiment of a roller element, showing the roller element formed by coupling two structures together along their respective longitudinal axes, in accordance with some described embodiments.

FIG. 76 illustrates an isometric view of an embodiment of a roller element 3914, showing the roller element 3914 formed by coupling two structures together along their respective longitudinal axes, in accordance with some described embodiments. The longitudinal axis is defined along the x-axis in the Cartesian coordinate system. The roller element 3914 may include a first part 3976a coupled with a second part 3976b. As shown, the first part 3976a may include a recess 3940 such that when the first part 3976a is coupled with the second part 3976b, the recess 3940 forms a through hole that can accommodate a strap (not shown in FIG. 76). By forming a roller element 3914 using the first part 3976a and the second part 3976b, the roller element 3914 can be made by two different materials, such as a metal and a non-metal. Also, by forming the recess 3940 prior to assembling the first part 3976a with the second part 3976b, the recess 3940 can be made through different cutting means, which may simplify the cutting operation. Also, the second part 3976b may include a convex shape (similar to prior embodiments) at least in a location corresponding to the recess 3940, in order to provide a convex shape at the recess 3940.

Figure 77:
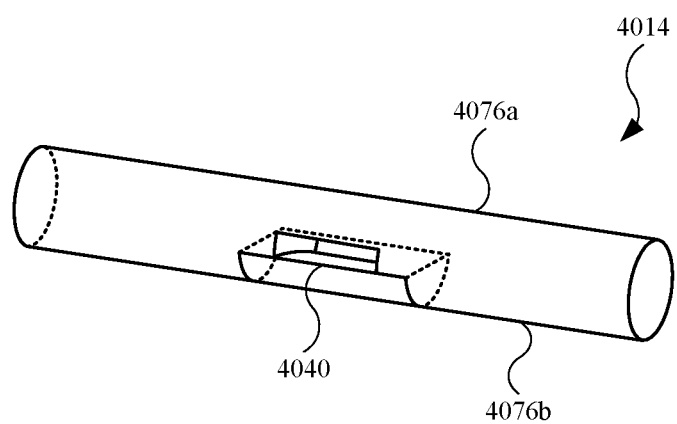
FIG. 77 illustrates an isometric view of an embodiment of a roller element, showing the roller element formed by coupling a structure into an opening of another structure, in accordance with some described embodiments.

FIG. 77 illustrates an isometric view of an embodiment of a roller element 4014, showing the roller element 4014 formed by coupling a structure into an opening of another structure, in accordance with some described embodiments. The roller element 4014 may include a first part 4076a that includes an opening (not labeled) to receive a second part 4076b. When the second part 4076b is positioned in the first part 4076a (as shown in FIG. 77), a recess 4040 results and defines a through hole that can accommodate a strap (not shown in FIG. 77). By forming a roller element 4014 using the first part 4076a and the second part 4076b, the use of materials can be disproportionate. For example, a greater amount of material used to form the first part 4076a is used as compared to the second part 4076b. By limiting the use of the material of the second part 4076b, the cost of materials can be reduced when the material(s) used to form the second part 4076b is relatively high. Also, the weight of materials can be reduced when the material(s) used to form the second part 4076b is relatively high.

Figure 78:
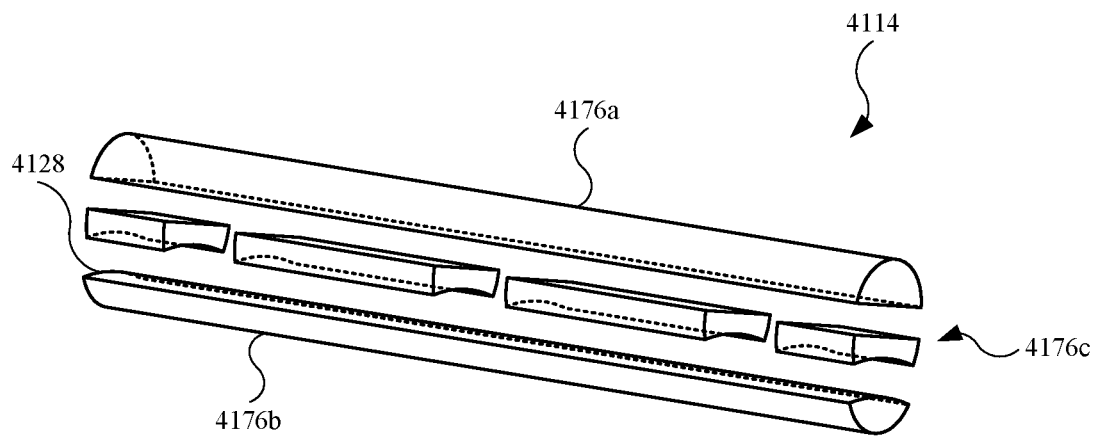
FIG. 78 illustrates an exploded view of an embodiment of a roller element, showing the roller element prior to an assembly operation, in accordance with some described embodiments.

FIG. 78 illustrates an exploded view of an embodiment of a roller element 4114, showing the roller element 4114 prior to an assembly operation, in accordance with some described embodiments. As shown, the roller element 4114 may include several parts that can be assembled together. For example, the roller element 4114 may include a first part 4176a and a second part 4176b. The roller element 4114 may further include multiple central parts 4176c. When assembled with the first part 4176a and the second part 4176b, the multiple central parts 4176c are spaced apart from each other to define several through holes, each of which is capable of receiving a strap (not shown in FIG. 78). Also, the second part 4176b may include a surface 4128 that defines a convex shape to accommodate the straps.

Figure 79:
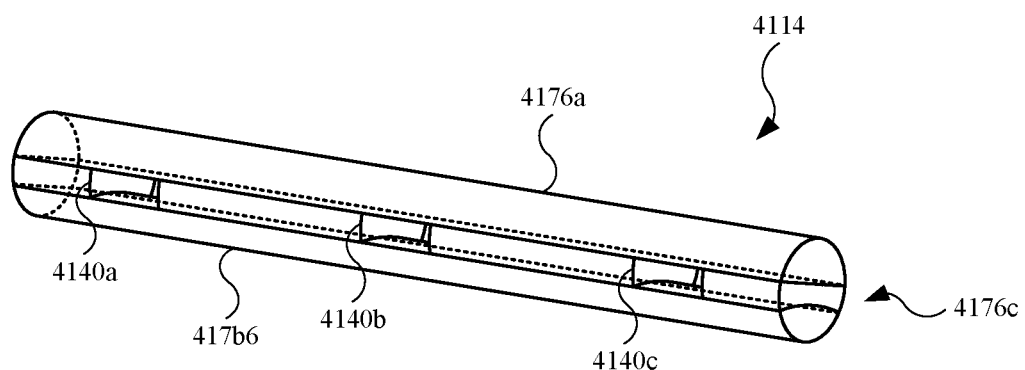
FIG. 79 illustrates an isometric view of the roller element shown in FIG. 78, showing the roller element subsequent to an assembly operation.

FIG. 79 illustrates an isometric view of the roller element 4114 shown in FIG. 78, showing the roller element 4114 subsequent to an assembly operation. As shown, the multiple central parts 4176c are assembled with the first part 4176a and the second part 4176b. The multiple central parts 4176c are spaced apart from each other such that the roller element 4114 includes a first through hole 4140a, a second through hole 4140b, and a third through hole 4140c. By using the multiple central parts 4176c, the first through hole 4140a, the second through hole 4140b, and the third through hole 4140c need not be cut out of the roller element 4114 by a cutting operation. Also, the use of several different parts can be exploited to reduce the cost and/or weight of the materials. Also, the surface 4128 (shown in FIG. 78) can be formed prior to the assembly operation to provide a consistent finish (in terms of shape).

Figure 80:
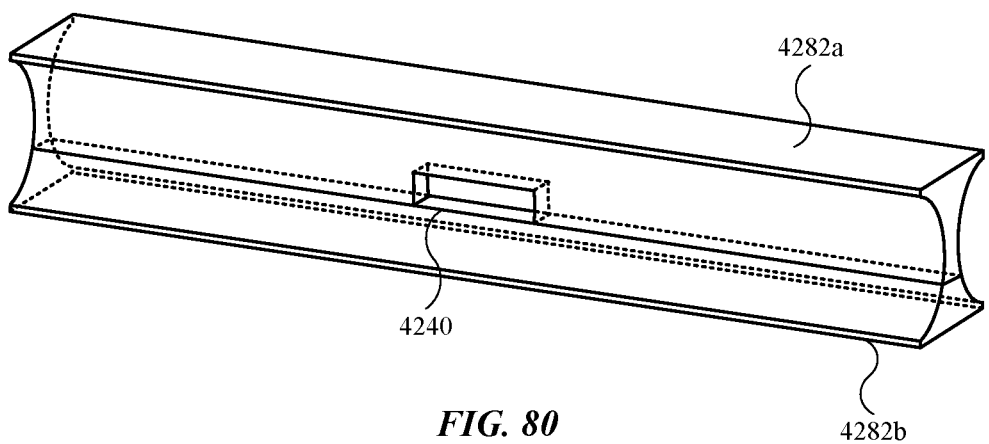
FIG. 80 illustrates an isometric view of an embodiment of a spacer element, showing the spacer element formed by coupling two structures together along their respective longitudinal axes, in accordance with some described embodiments.

FIG. 80 illustrates an isometric view of an embodiment of a spacer element 4216, showing the spacer element 4216 formed by coupling two structures together along their respective longitudinal axes, in accordance with some described embodiments. The longitudinal axis is defined along the x-axis in the Cartesian coordinate system. The spacer element 4216 may include a first part 4282a coupled with a second part 4282b. As shown, the first part 4282a may include a recess 4240 such that when the first part 4282a is coupled with the second part 4282b, the recess 4240 forms a through hole that can accommodate a strap (not shown in FIG. 80). By forming a spacer element 4216 using the first part 4282a and the second part 4282b, the spacer element 4216 can be made by two different materials, such as a metal and a non-metal. Also, by forming the recess 4240 prior to assembling the first part 4282a with the second part 4282b, the recess 4240 can be made through different cutting means.

Figure 81:
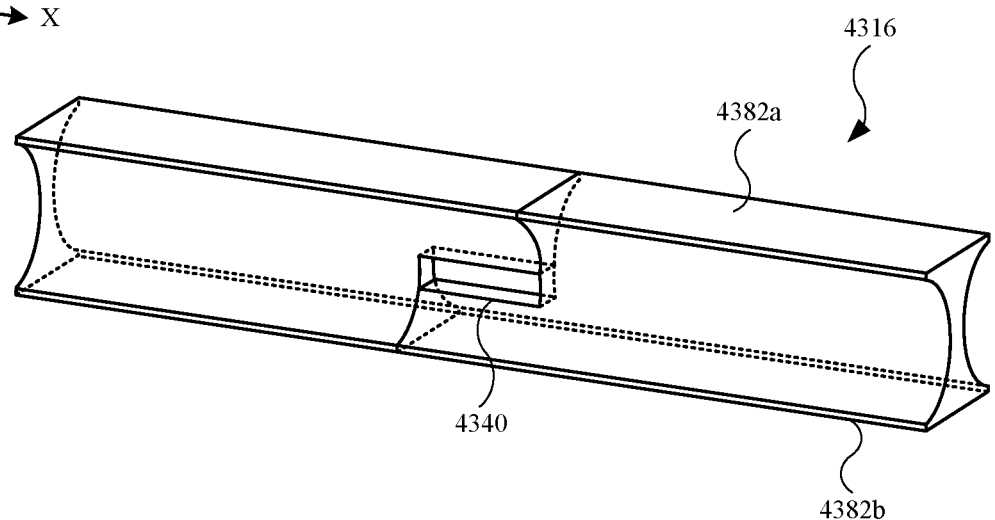
FIG. 81 illustrates an isometric view of an embodiment of a spacer element, showing the spacer element formed by coupling two structures together along different axes, in accordance with some described embodiments.

FIG. 81 illustrates an isometric view of an embodiment of a spacer element 4316, showing the spacer element 4316 formed by coupling two structures together along different axes, in accordance with some described embodiments. The longitudinal axis is defined along multiple z-axes in the Cartesian coordinate system. The spacer element 4316 may include a first part 4382a coupled with a second part 4382b. As shown, the first part 4382a and the second part 4382b may each be pre-fabricated such that when the first part 4382a is assembled with the second part 4382b, a recess 4340 forms. The recess 4340 may define a through hole that can accommodate a strap (not shown in FIG. 81). By forming a spacer element 4316 using the first part 4382a and the second part 4382b, the spacer element 4316 can be made by two different materials, such as a metal and a non-metal. Also, by forming the recess 4340 prior to assembling the first part 4382a with the second part 4382b, the recess 4340 can be made through different cutting means.

Figure 82:
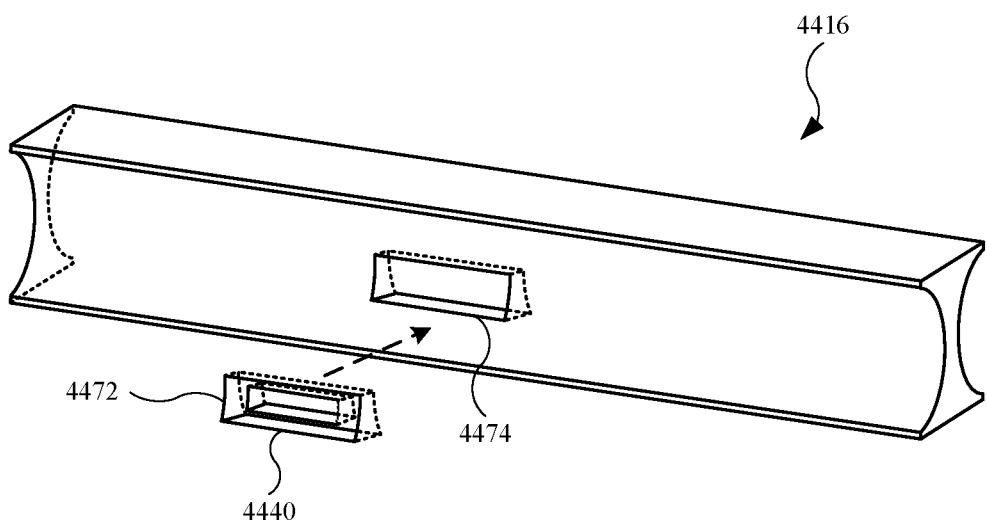
FIG. 82 illustrates an isometric view of an embodiment of a spacer element, showing an insert designed for integration with the spacer element, in accordance with some described embodiments.

FIG. 82 illustrates an isometric view of an embodiment of a spacer element 4416, showing an insert 4472 designed for integration with the spacer element 4416, in accordance with some described embodiments. As shown, the spacer element 4416 includes a through hole 4474 having a size and shape in accordance with the insert 4472. The insert 4472 may include a pre-molded or pre-fabricated part. The insert 4472 may include a metal or a hardened plastic material, as non-limiting examples. Further, the insert 4472 includes a through hole 4440 designed to receive a strap (not shown in FIG. 82). The through hole 4440 may include a convex and a flat surface, similar to prior embodiments (of a roller element or a spacer element). In this manner, the cutting operation used to form the through hole 4474 may be less complex, as compared to prior embodiments, as the through hole 4440 is formed to a specification prior to inserting the insert 4472 into the through hole 4474 of the spacer element 4416.

In some instances, it may be advantageous to provide a lubricating material (such as oil or grease, as non-limiting examples) to a hinge assembly. The lubricating material may provide a more consistent coefficient of friction between parts (such as roller elements and spacer elements), thereby providing more reliable and predictable use of the hinge assembly. Also, the lubricating material may reduce wear on the parts of the hinge assembly. However, when the lubricating material is applied, some consideration should be given to ensure that the lubricating material does not leave the hinge assembly and contact a user of a system that incorporates the hinge assembly. FIGS. 83-88 show and described various methods to integrate a feature into a hinge assembly to limit or prevent user exposure to a lubricating material. FIGS. 83-88 show several roller elements and spacer elements of a hinge assembly. The roller elements and/or the spacer elements may include a lubricant-doped material (such as Teflon, carbon fiber, or graphite, physical vapor deposition coating, diamond like carbon coating, or the like). Also, the roller elements and spacer elements shown in FIGS. 83-88 may include materials such as plastic, metal, or a combination thereof.

Figure 83:
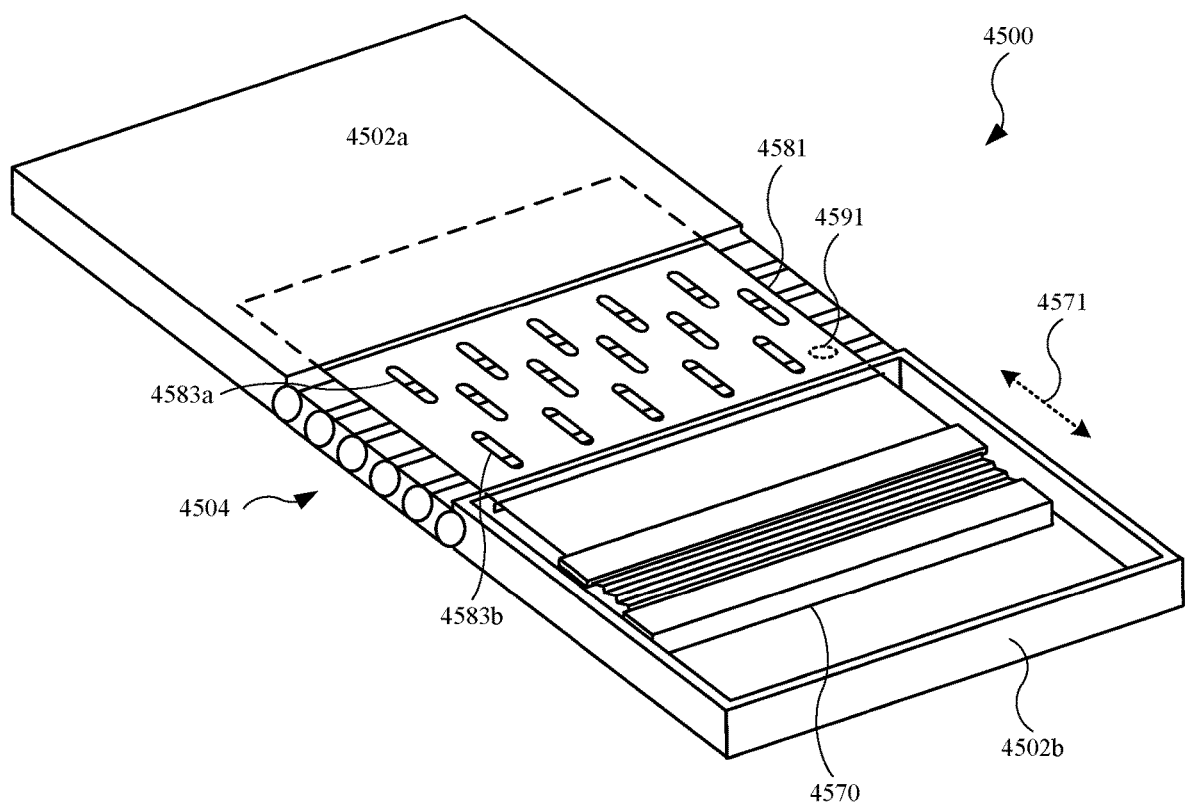
FIG. 83 illustrates an isometric view of an alternate embodiment of a system, showing a cover that extends over a hinge assembly, in accordance with some described embodiments.

FIG. 83 illustrates an isometric view of an embodiment of a system 4500, showing a cover 4581 that extends over a hinge assembly 4504, in accordance with some described embodiments. As shown, the system 4500 includes a first housing part 4502a and a second housing part 4502b connected with the first housing part 4502a by the hinge assembly 4504. The system 4500 further includes a cover 4581 that extends over the hinge assembly 4504 to maintain a lubricating material 4591 (shown as a dotted line) between the cover 4581 and the hinge assembly 4504. The lubricating material 4591 may be dispersed throughout various locations in the hinge assembly 4504.

As shown, the system 4500 is in an open position. However, the system 4500 may transition from the open position to a closed position, which may cause movement of not only the hinge assembly 4504 but also the cover 4581. In this regard, the system 4500 may include a tensioning system 4570 coupled to an end of the cover 4581. For purposes of illustrations, some parts of the second housing part 4502b are removed. When then system 4500 transitions from the open position to the closed position, or vice versa, the tensioning system 4570 provides a pulling force (that may include a constant pulling force) in the directions indicated by the arrow 4571. While applying a pulling force, the tensioning system 4570 allows part of the cover 4581 to move into the second housing part 4502b (when transitioning to the closed position), but stills allows part of the cover 4581 to move out of the second housing part 4502b (when transitioning to the open position). As a result, the cover 4581 is less susceptible to wrinkling and/or becoming pinched between spacer and roller elements (not labeled) of the hinge assembly 304. Further, the cover 4581 may include openings, or slots, that further prevent unwanted wrinkling in the closed position. For example, the cover 4581 may include a first opening 4583a and a second opening 4583b, representative of several additional openings of the cover 4581.

Although not shown, the system 4500 may include a second tensioning system in the first housing part 4502a to provide an additional pulling force to the cover 4581. Further, the system 4500 may include fasteners (including screws, adhesives, and/or rivets as non-limiting examples) designed to fasten one or both ends of the cover 4581 to the housing parts. When both ends of the cover 4581 are fastened, the tensioning system 4570 may be removed.

Figure 84:
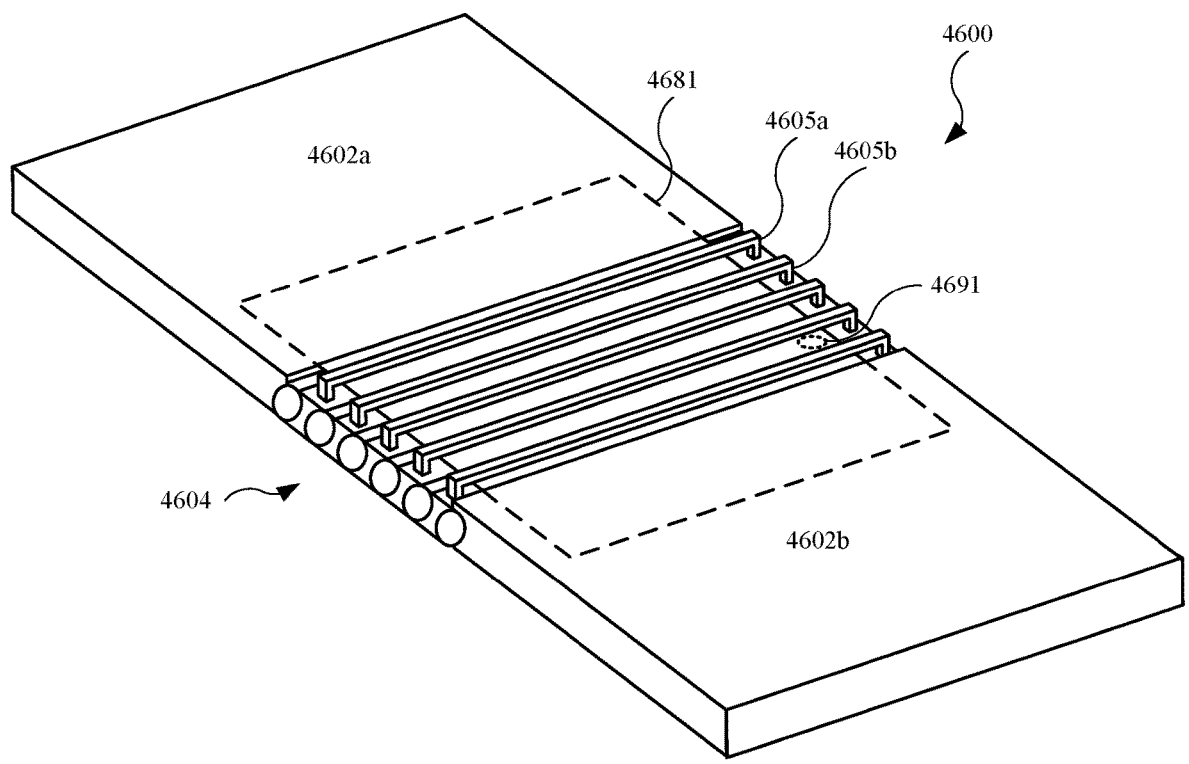
FIG. 84 illustrates an isometric view of an alternate embodiment of a system, showing a cover and several rails of a hinge assembly designed to maintain the cover, in accordance with some described embodiments.

FIG. 84 illustrates an isometric view of an embodiment of a system 4600, showing a cover 4681 and several rails of a hinge assembly 4604 designed to maintain the cover 4681, in accordance with some described embodiments. As shown, the system 4600 includes a first housing part 4602a and a second housing part 4602b connected with the first housing part 4602a by the hinge assembly 4604. The system 4600 further includes a cover 4681 that extends over the hinge assembly 4604 to maintain a lubricating material 4691 (shown as a dotted line) between the cover 4681 and the hinge assembly 4604. The lubricating material 4691 may be dispersed throughout various locations in the hinge assembly 4604.

As shown, the system 4600 is in an open position. However, the system 4600 may transition from the open position to a closed position, which may cause movement of not only the hinge assembly 4604 but also the cover 4681. In this regard, the hinge assembly 4604 may include rails, including a first rail 4605a and a second rail 4605b (both representative of additional rails) that define an underpass through which the cover 4681 extends. As a result, when the system 4600 undergoes a transition to the closed position, the rails may engage the cover 4681 to limit or prevent further movement of the cover 4681.

Figure 85:
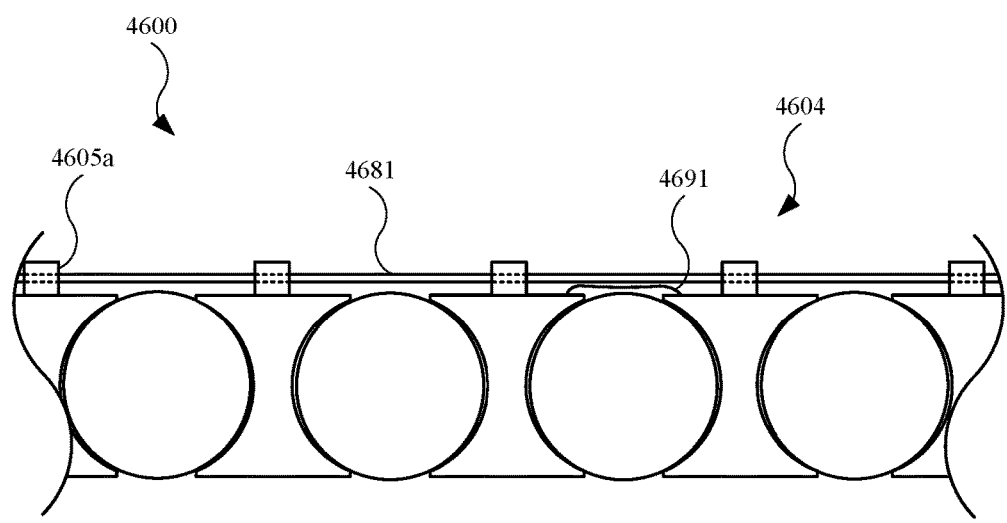
FIG. 85 illustrates a side view of the system shown in FIG. 84, showing the cover 3781 passing through the rails.

FIG. 85 illustrates a side view of the system 4600 shown in FIG. 84, showing the cover 4681 passing through the rails. As shown, the first rail 4605a (representative of the remaining rails) provides an underpass for the cover 4681. As a result, the cover 4681 is maintained between the rails and the hinge assembly 4604. Also, when the cover 4681 remains over the hinge assembly 4604, the lubricating material 4691 remains in or on the hinge assembly 4604 to promote a consistent coefficient of friction as well as reduced wear.

Figure 86:
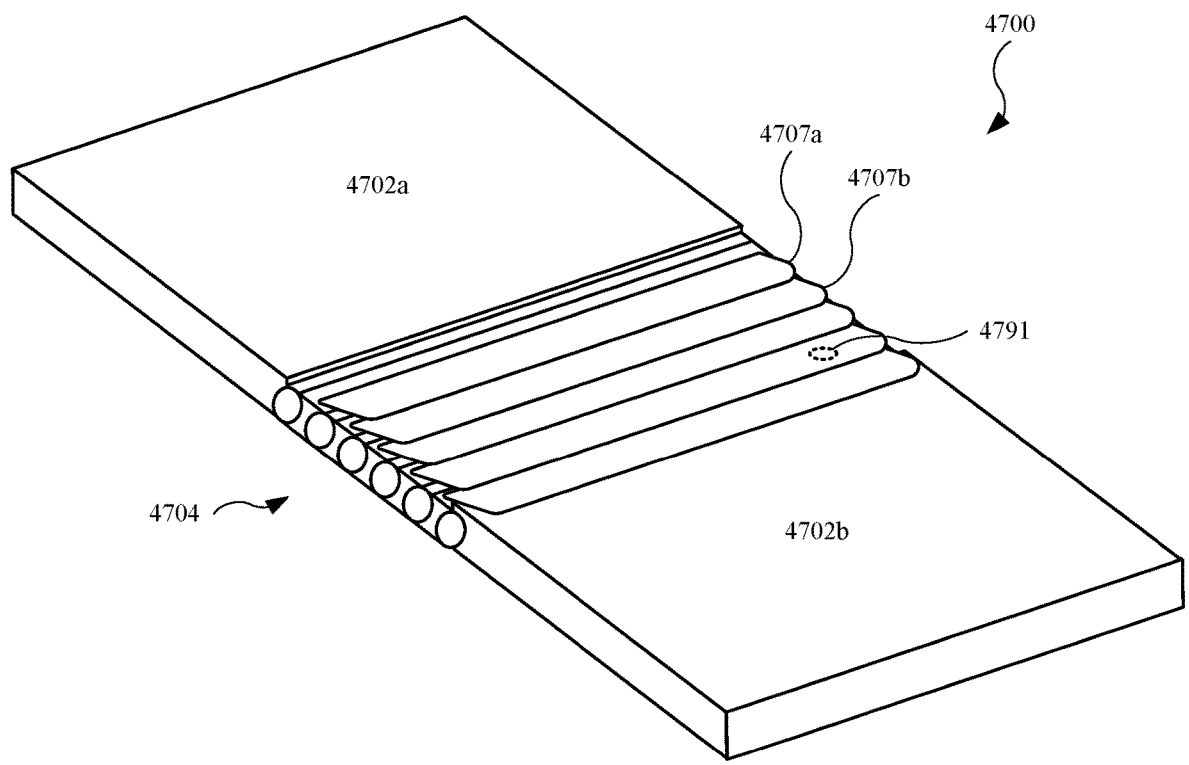
FIG. 86 illustrates an isometric view of an alternate embodiment of a system of a system, showing several plates that cover the hinge assembly, in accordance with some described embodiments.

FIG. 86 illustrates an isometric view of an alternate embodiment of a system 4700, showing several plates that cover the hinge assembly 4704, in accordance with some described embodiments. As shown, the system 4700 includes a first housing part 4702a and a second housing part 4702b connected with the first housing part 4702a by the hinge assembly 4704. The hinge assembly 4704 may include several plates, including a first plate 4707a and a second plate 4707b (both representative of additional plates) that define cover to limit or prevent a lubricating material 4791 from exiting the hinge assembly 4704. The lubricating material 4791 may be dispersed throughout various locations in the hinge assembly 4704. As shown, the plates are modular. In other words, the plates are disconnected from each other.

Figure 87:
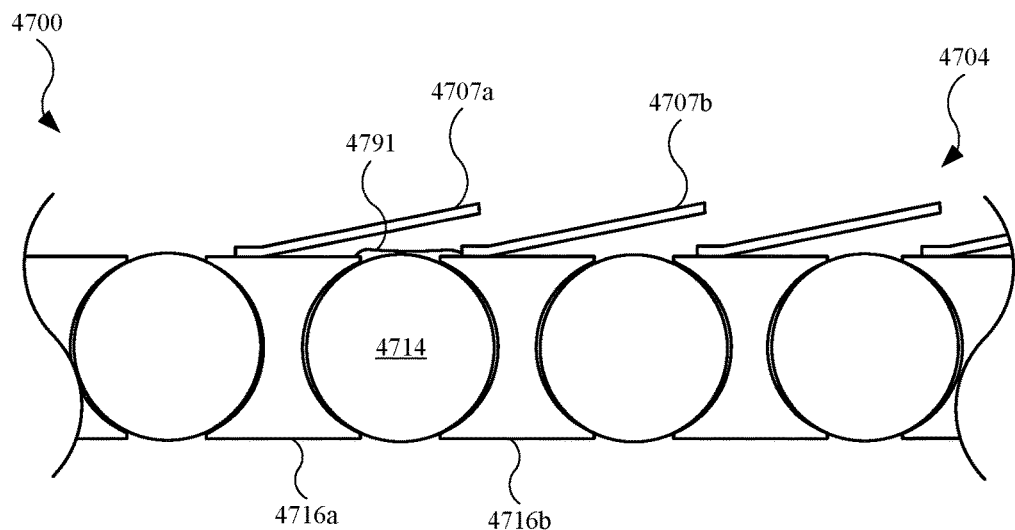
FIG. 87 illustrates a side view of the system shown in FIG. 86, showing the plates covering the hinge assembly.

FIG. 87 illustrates a side view of the system 4700 shown in FIG. 86, showing the plates covering the hinge assembly. As shown, the first plate 4707a and the second plate 4707b (both representative of the remaining rails) are coupled to a first spacer element 4716a and a second spacer element 4716b, respectively, of the hinge assembly 4704. Also, the first plate 4707a may pass over a roller element 4714 of the hinge assembly 4704, and may also at least partially pass over the second spacer element 4716b. The remaining plates may include a similar configuration. In this manner, the plates can collectively act as a cover for the lubricating material 4791, while modular design provides flexibility for the hinge assembly 4704.

Figure 88:
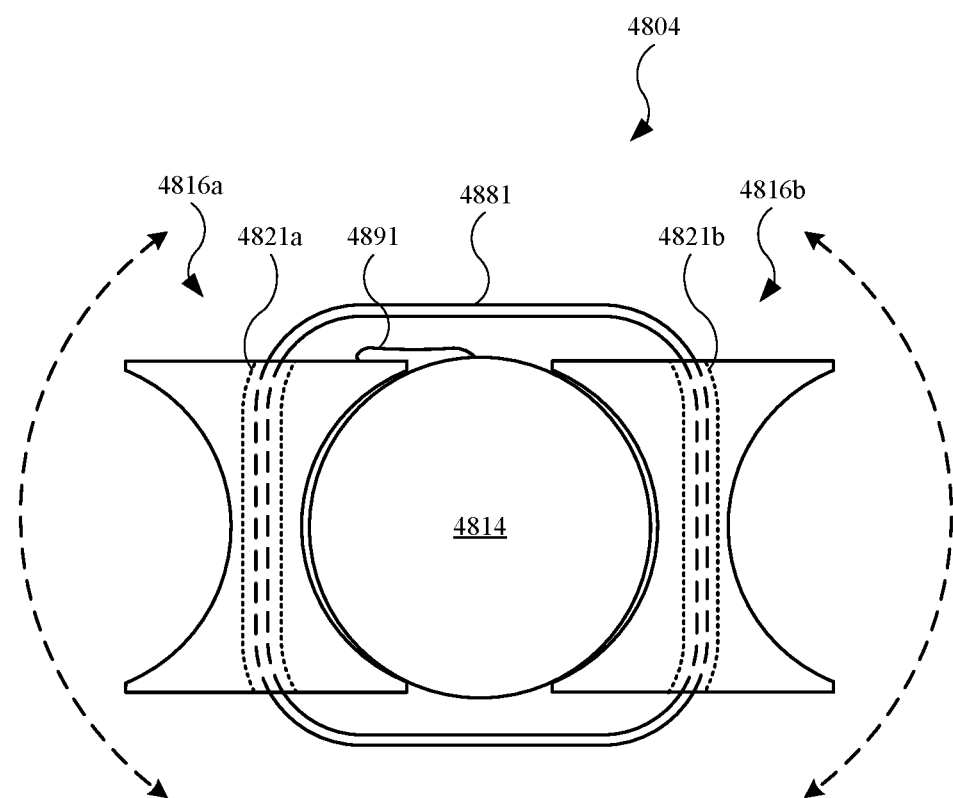
FIG. 88 illustrates a side view of a hinge assembly, showing a cover that wraps around a roller element and passes through consecutive spacer elements, in accordance with some described embodiments.

FIG. 88 illustrates a side view of a hinge assembly 4804, showing a cover 4881 that wraps around a roller element 4814 and passes through consecutive spacer elements, in accordance with some described embodiments. As shown, the hinge assembly 4804 may include a first spacer element 4816a and a second spacer element 4816b. The first spacer element 4816a and the second spacer element 4816b include a first opening 4821a and a second opening 4821b, respectively. The cover 4881 may pass through the first opening 4821a and the second opening 4821b and form a closed loop around the roller element 4814. In this manner, the cover 4881 can confine a lubricating material 4891 within the cover 4881. Also, as the first spacer element 4816a and the second spacer element 4816b rotate clockwise and counterclockwise (as indicated by the arrows with dotted lines) relative to the roller element 4814, the cover 4881 is free to pass through the first opening 4821a and/or the second opening 4821b. These paths (through the spacer elements) may prevent bunching, wrinkling, and/or stretching of the cover 4881, thereby allowing the hinge assembly 4804 to operate in a desired manner.

FIG. 89-101 show and described various systems and electronic devices. The systems and electronic devices shown in FIG. 89-101 may include several features previously described for a system.

Figure 89:
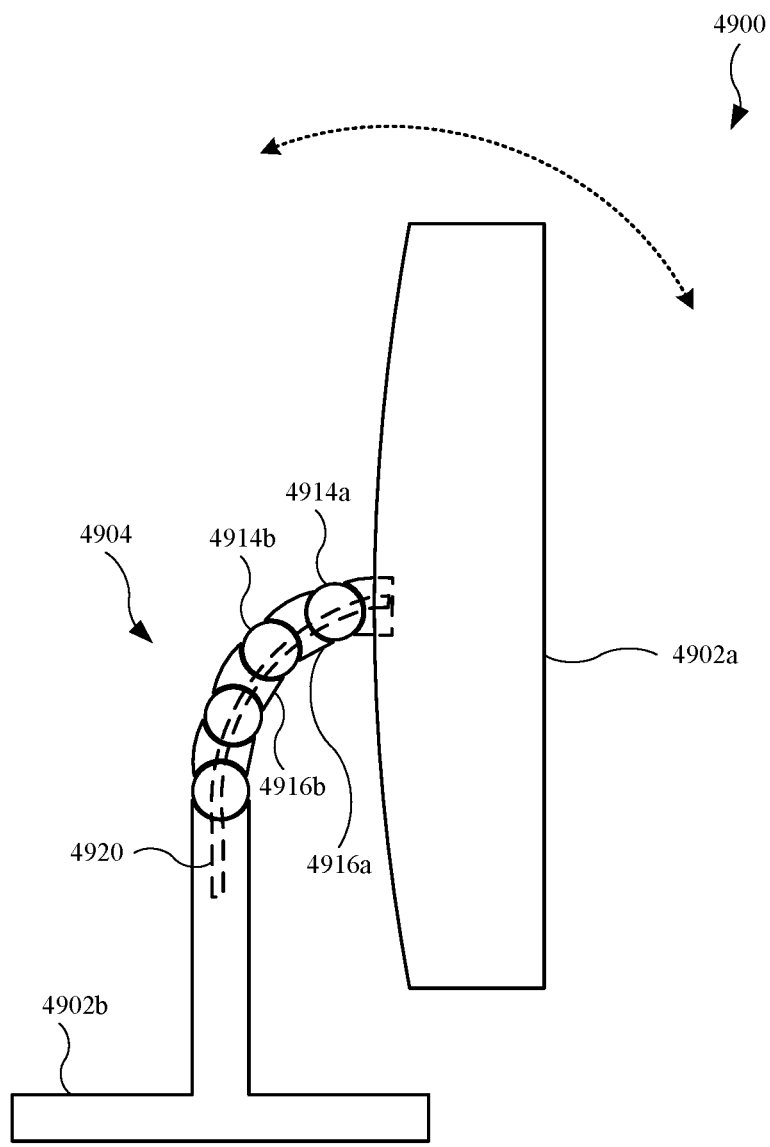
FIG. 89 illustrates an alternate embodiment of a having a hinge assembly coupled to a housing part and a stand, in accordance with some described embodiments.

FIG. 89 illustrates an alternate embodiment of a system 4900 having a hinge assembly 4904 coupled to a housing part 4902a and a stand 4902b, in accordance with some described embodiments. The system 4900 may include a desktop computing device. The hinge assembly 4904 is designed to allow the housing part 4902a to rotate or pivot relative to the stand 4902b. The housing part 4902a may include a display (not shown in FIG. 89), including a display with a touch input layer designed to receive a command via a touch input. The hinge assembly 4904 may include any features and/or materials previously described for a hinge assembly. Accordingly, the hinge assembly 4904 may include roller elements (such as a first roller element 4914a and a second roller element 4914b), spacer elements (such as a first spacer element 4916a and a second spacer element 4916b), and a strap 4920 extending through the hinge assembly 4904 and pulled in tension via a tensioning element (not shown in FIG. 89). The strap 4920 may also include ends positioned in the housing part 4902a and the stand 4902b.

Figure 90:
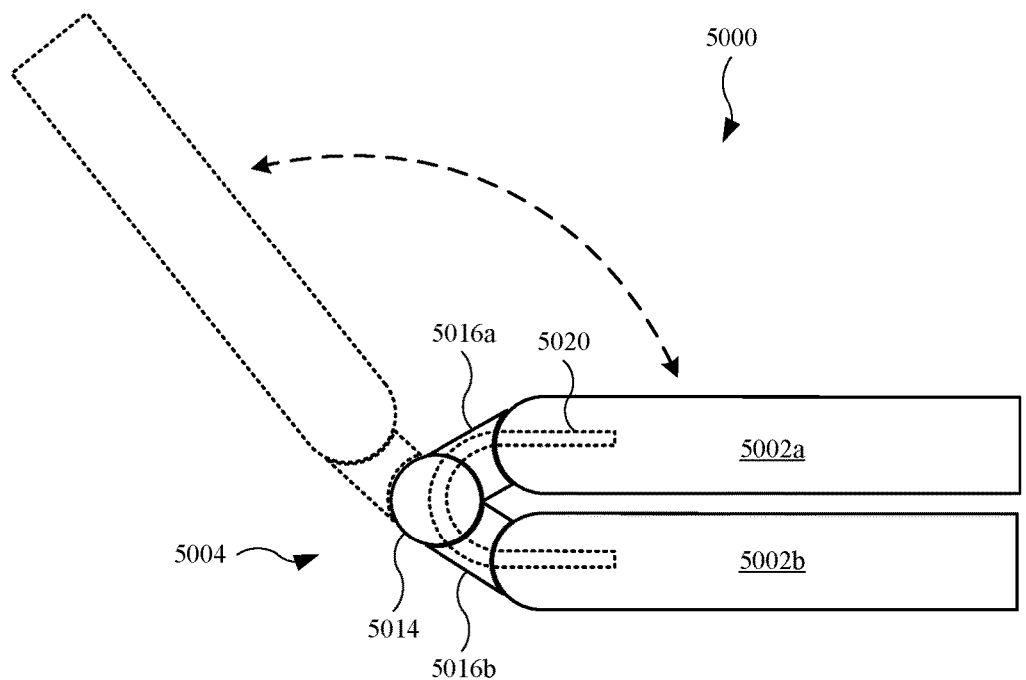
FIG. 90 illustrates an alternate embodiment of a system having a hinge assembly coupled to a first housing part and a second housing part, with the hinge assembly having a single roller element, in accordance with some described embodiments.

While the prior embodiments include a hinge assembly that includes multiple roller elements, some embodiments of a hinge assembly include a single roller element. For example, FIG. 90 illustrates an alternate embodiment of a system 5000 having a hinge assembly 5004 coupled to a first housing part 5002a and a second housing part 5002b, with the hinge assembly 5004 having a roller element 5014, in accordance with some described embodiments. The hinge assembly 5004 is designed to allow the first housing part 5002*a* to rotate or pivot relative to the second housing part 5002*b*, or vice versa. The first housing part 5002*a* and the second housing part 5002*b* may include any designs or features previously described for a first housing part and a second housing part, respectively. As shown, the hinge assembly 5004 may include a roller element 5014 that defines a single roller element for the hinge assembly 5004. Also, the hinge assembly 5004 may further include a first spacer element 5016*a* and a second spacer element 5016*b*. As shown, the first spacer element 5016*a* and the second spacer element 5016*b* include a concave surface to receive the roller element 5014 and to pair with the first housing part 5002*a* and the second housing part 5002*b*, respectively. As a result, the roller element 5014 may rotate and slide along the first spacer element 5016*a* and/or the second spacer element 5016*b*. Alternatively, the first spacer element 5016*a* may slide along the roller element 5014. The hinge assembly 5004 may further include a strap 5020 extending through the hinge assembly 5004 and pulled in tension via a tensioning element (not shown in FIG. 90), thereby providing frictional forces between the roller element 5014 and the aforementioned spacer elements. The strap 5020 may also include an end positioned in the first housing part 5002*a* and an opposing end position in the second housing part 5002*b*. With the hinge assembly 5004 reducing the number of roller elements and spacer elements, the system 5000 can include a reduced bend radius, as compared to some prior embodiments. In this regard, the system 5000, in the closed position, can place the first housing part 5002*a* closer to the second housing part 5002*b*, thereby providing a more compact system. Further, the strap 5020 may include non-stretchable material(s) that allow for the improved (reduced) bend radius, as the stiff materials for prior straps is not needed due in part to the need for synchronous motion of elements being removed for the system 5000.

Figure 91:
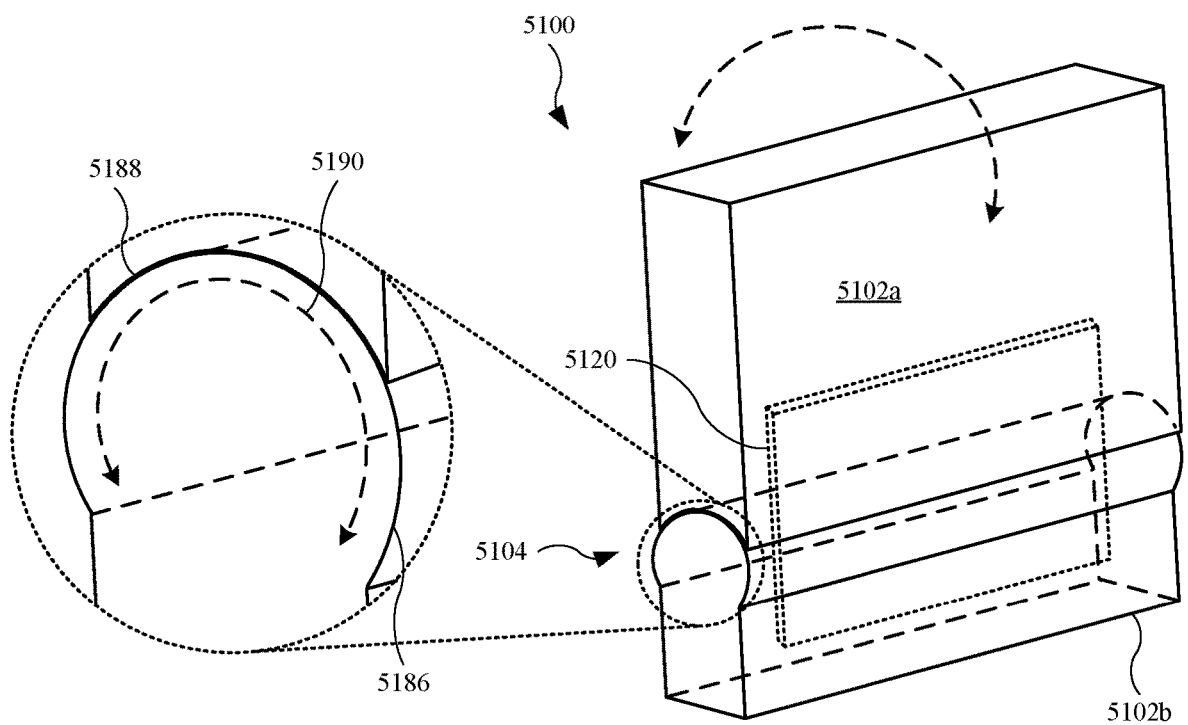
FIG. 91 illustrates an alternate embodiment of a system having a hinge assembly coupled to a housing part and a stand, in accordance with some described embodiments.

FIG. 91 illustrates an alternate embodiment of a system 5100 having a hinge assembly 5104 coupled to a housing part 5102*a* and a stand 5102*b*, in accordance with some described embodiments. The housing part 5102*a* may include a display (not shown in FIG. 70), including a display with a touch input layer designed to receive a command via a touch input. Rather than having multiple, separable parts for a hinge assembly, the hinge assembly 5104 may be integrally formed with the housing part 5102*a* and the stand 5102*b*. As shown in the enlarged view, the hinge assembly 5104 may be defined by a rounded portion 5186 of the stand 5102*b* as well as a concave portion 5188 of the housing part 5102*a* that receives the rounded portion 5186. The hinge assembly 5104 may further include a strap 5120 extending through the hinge assembly 5104 and pulled in tension via a tensioning element (not shown in FIG. 70), thereby providing frictional forces between the housing part 5102*a* and the stand 5102*b*. The strap 5120 may also include ends positioned in the housing part 5102*a* and the stand 5102*b*. The strap 5120 may also counterbalance a force provided by the weight of the housing part 5102*a*. As shown in the enlarged view, the rounded portion 5186 provides a sliding path (denoted by the two-sided arrow 5190) that provides a relatively large rotational path for the housing part 5102*a* to move about the stand 5102*b*. As a result, the system 5100 may require less tension, which may include lower cost materials for the strap 5120.

Figure 92:
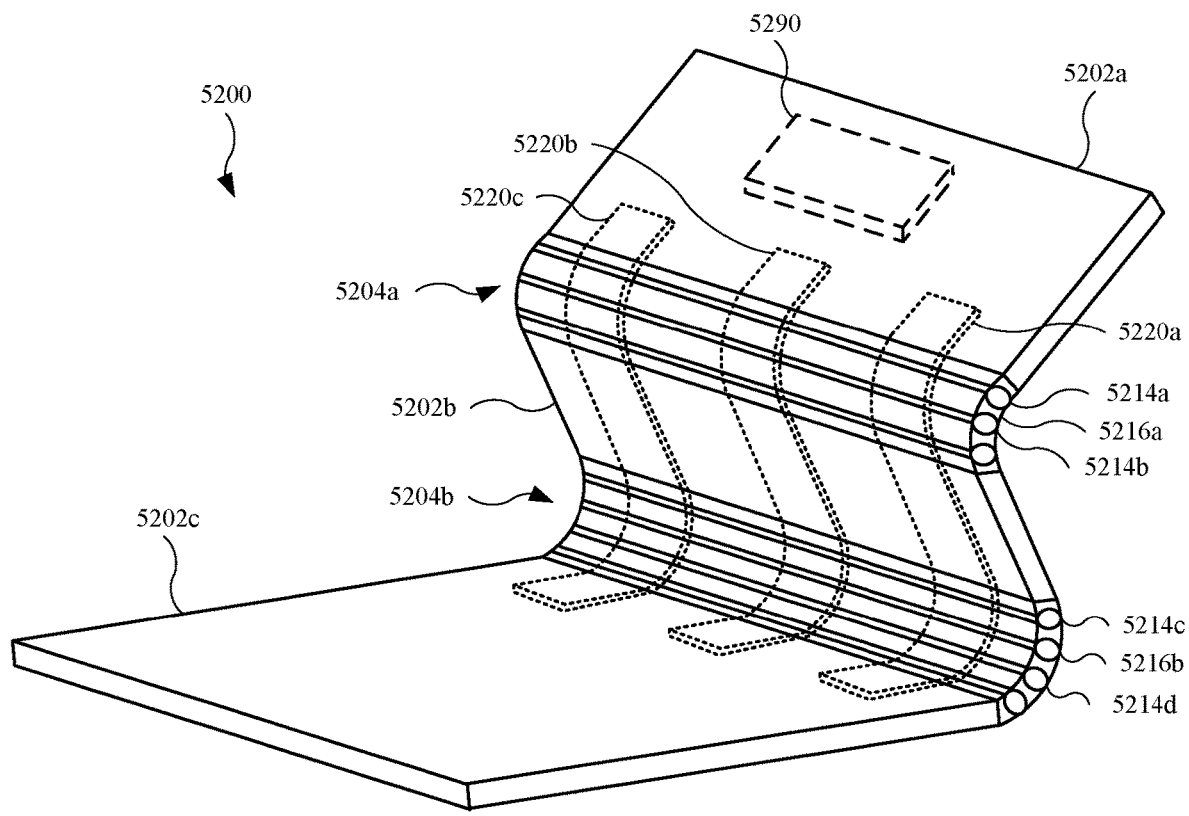
FIG. 92 illustrates an isometric view of an embodiment of a system having multiple hinge assemblies, in accordance with some described embodiments.

FIG. 92 illustrates an isometric view of an embodiment of a system 5200 having multiple hinge assemblies, in accordance with some described embodiments. The system 5200 may include an accessory device, such as a cover or folio, suitable for use with an electronic device, such as a mobile communication device, a laptop computing device, or a tablet computing device. As shown, the system 5200 may include a first housing part 5202*a*, a second housing part 5202*b*, and a third housing part 5202*c*. The system 5200 may further include a first hinge assembly 5204*a* that couples together the first housing part 5202*a* and the second housing part 5202*b*, allowing the first housing part 5202*a* to rotate or pivot with respect to the second housing part 5202*b*, or vice versa. The system 5200 may further include a second hinge assembly 5204*b* that couples together the second housing part 5202*b* and the third housing part 5202*c*, allowing the second housing part 5202*b* to rotate or pivot with respect to the third housing part 5202*c*, or vice versa.

The first hinge assembly 5204*a* may include multiple roller elements (including a first roller element 5214*a* and a second roller element 5214*b*) and multiple spacer elements (including a spacer element 5216*a*). The first hinge assembly 5204*a* may include additional roller elements and spacer elements. The second hinge assembly 5204*b* may include multiple roller elements (including a first roller element 5214*c* and a second roller element 5214*d*) and multiple spacer elements (including a spacer element 5216*b*). The second hinge assembly 5204*b* may include additional roller elements and spacer elements.

The system 5200 may include multiple straps, such as a first strap 5220*a*, a second strap 5220*b*, and a third strap 5220*c*. The first strap 5220*a*, the second strap 5220*b*, and the third strap 5220*c* may include any material(s) and/or provide any feature(s) previously described for a strap. Also, while a discrete number of straps are shown, the number of straps may vary. In some embodiments (not shown), the system 5200 includes a first set of one or more straps that extends through the first hinge assembly 5204*a* but does not extend through the second hinge assembly 5204*b*, and may further include a second set of one or more straps that extends through the second hinge assembly 5204*b* but does not extend through the first hinge assembly 5204*a*. In the embodiment shown in FIG. 92, the first strap 5220*a*, the second strap 5220*b*, and the third strap 5220*c* extend through both the first hinge assembly 5204*a* and the second hinge assembly 5204*b*. Also, although not shown, each of the first strap 5220*a*, the second strap 5220*b*, and the third strap 5220*c* may include a tensioning element, including an adjustable tensioning element, designed to provide an adjustable pulling force to their respective strap. Accordingly, the frictional forces between roller elements and spacer elements of the first hinge assembly 5204*a* and the second hinge assembly 5204*b* can be adjusted. Due to the aforementioned straps extending through the first hinge assembly 5204*a* and second hinge assembly 5204*b*, the first hinge assembly 5204*a* and second hinge assembly 5204*b* may "communicate" and work in conjunction with each other. This will be shown and discussed below. Also, in order to couple the system 5200 to a device (not shown in FIG. 92), the system 5200 may include a magnetic element 5290 that magnetically couples to, and retains, the device with the system 5200. Alternatively, or in conjunction, the magnetic element 5290 can include mechanical features (extensions and/or recesses) designed to hold and carry the device.

Figure 93:
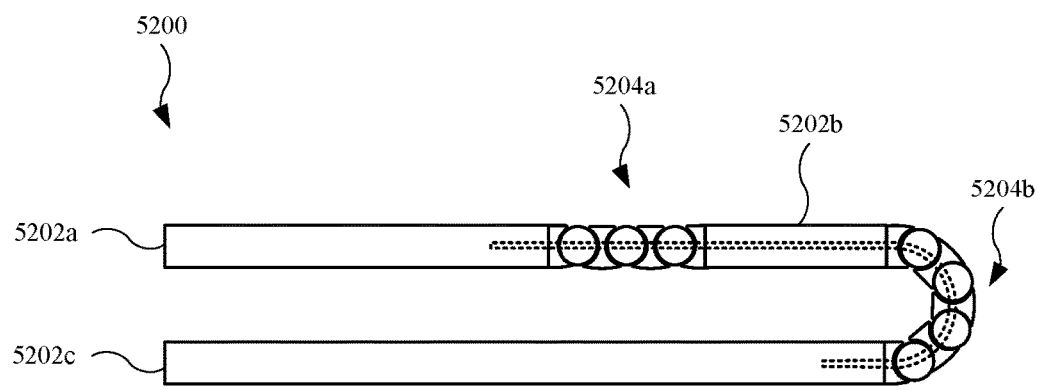
FIG. 93 illustrates a side view of the system shown in FIG. 92, showing the system in a closed position.

FIG. 93 illustrates a side view of the system 5200 shown in FIG. 92, showing the system 5200 in a closed position. As shown, the first housing part 5202*a* and the second housing part 5202*b* may cover, or at least substantially cover, the third housing part 5202*c* in the closed position. Also, the first hinge assembly 5204*a* allows the first housing part 5202*a* to extend flat, or 180 degrees, with respect to the second housing part 5202*b*, while the second hinge assembly 5204*b* allows the second housing part 5202b to rotate or pivot with respect to the third housing part 5202c.

Figure 94:
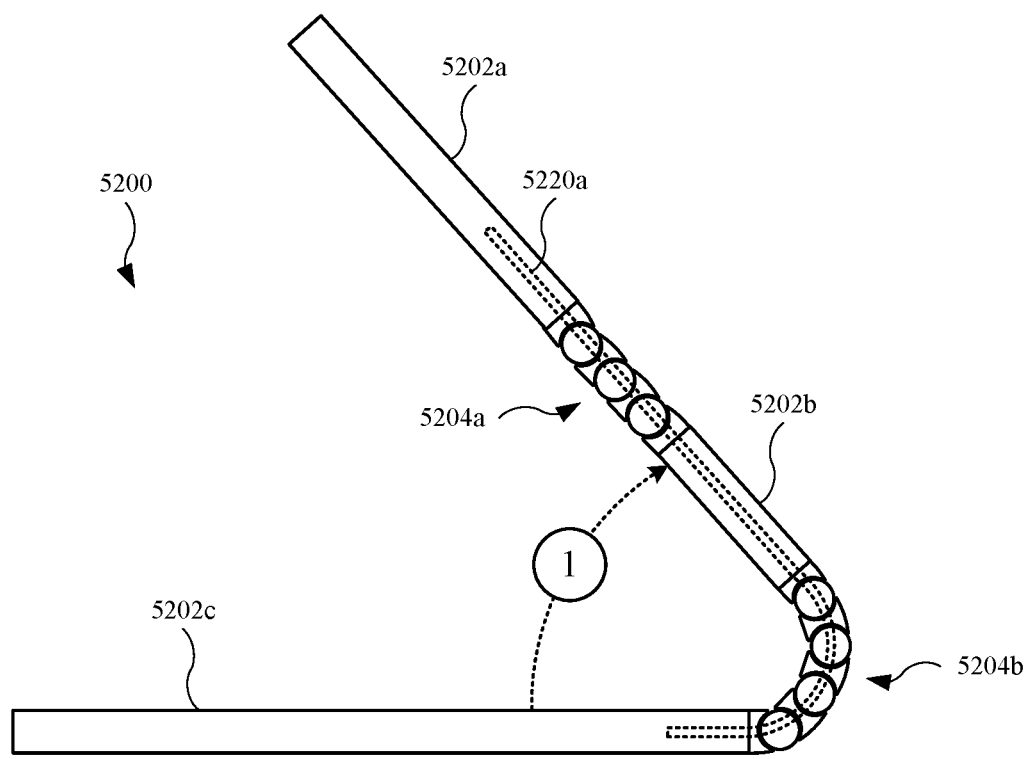
FIG. 94 illustrates a side view of the system shown in FIGS. 92 and 93, showing the system in an open position.

FIG. 94 illustrates a side view of the system 5200 shown in FIGS. 92 and 93, showing the system 5200 in an open position. In some instances, the system 5200 is designed to function in accordance with a two-step process. For example, in Step 1, the second hinge assembly 5204b allows the first housing part 5202a and the second housing part 5202b to rotate or pivot away from the third housing part 5202c. Moreover, the first hinge assembly 5204a may be "locked" or prevented from allowing relative movement between the first housing part 5202a and the second housing part 5202b. The first hinge assembly 5204a may remain locked when the second housing part 5202b is less than a particular angle with respect to the third housing part 5202c, which may include a predetermined angle set by the manufacturer of the system 5200. This will be further discussed below. In some instances, the first strap 5220a, or a combination of the first strap 5220a, the second strap 5220b, and the third strap 5220c (the latter straps shown in FIG. 92), along with a tensioning element(s) (not shown in FIG. 94), may provide sufficient frictional forces between the roller elements and the spacer elements to lock the first hinge assembly 5204a. Alternatively, the system 5200 may include an accelerometer or a gyroscopic sensor (not shown in FIG. 94) that determines a relative position/angle of the second housing part 5202b with respect to the third housing part 5202c so that a processor circuit (not shown in FIG. 94) of the system 5200 can monitor and assist in maintaining the first hinge assembly 5204a in a locked position.

Figure 95:
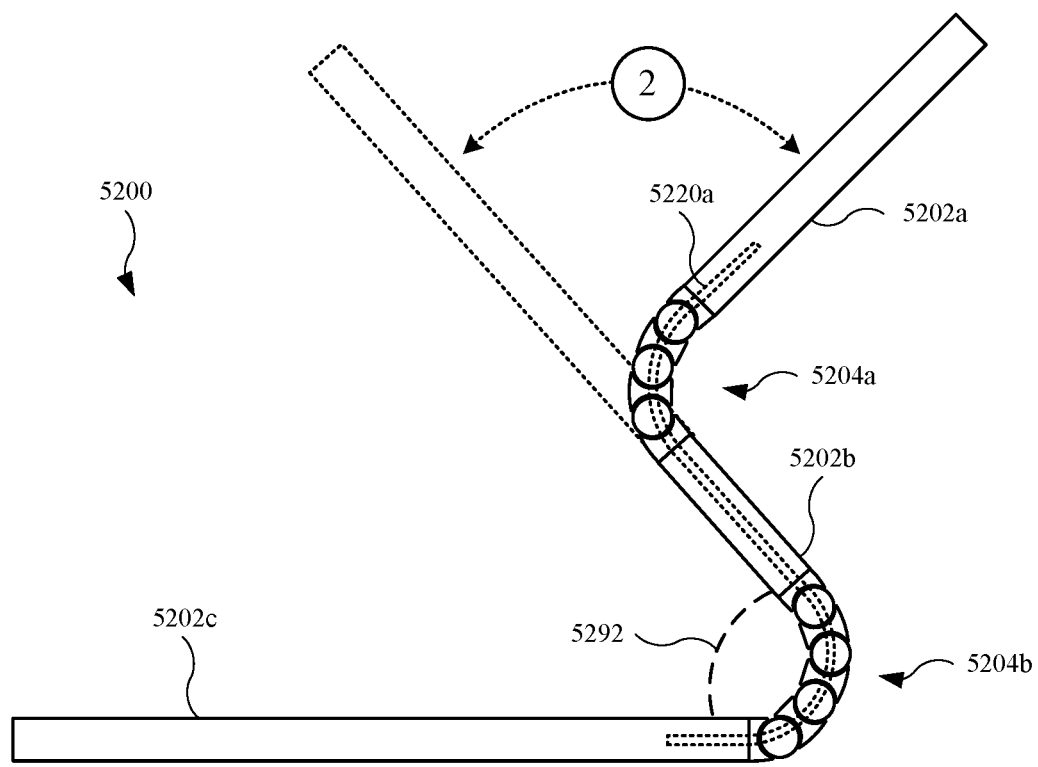
FIG. 95 illustrates a side view of the system shown in FIG. 94, further showing the second housing part positioned at a predetermined angle with respect to the third housing part.

However, when the second housing part 5202b (or the combination of the first housing part 5202a and the second housing part 5202b) is positioned away from the third housing part 5202c at a particular angle, the hinge assemblies may change their locking/unlocking configurations. For example, FIG. 95 illustrates a side view of the system 5200 shown in FIG. 94, further showing the second housing part 5202b positioned at a predetermined angle 5292 with respect to the third housing part 5202c. The predetermined angle 5292 in FIG. 95 is approximately 45 degrees. However, the predetermined angle 5292 may be approximately in the range of 30 to 80 degrees. As shown in Step 2, when the second housing part 5202b is positioned at the predetermined angle 5292 with respect to the third housing part 5202c, the first hinge assembly 5204a may "unlock" and allow relative movement of the first housing part 5202a with respect to the second housing part 5202b. The system 5200 may determine when the second housing part 5202b reaches the predetermined angle 5292. For example, when the first strap 5220a (or a combination of the first strap 5220a, the second strap 5220b, and the third strap 5220c) provides a predetermined tension, the first hinge assembly 5204a may transition from the locked to the unlocked position. Alternatively, the accelerometer or gyroscopic sensor (described above) may determine when the second housing part 5202b is at the predetermined angle 5292.

Furthermore, when the second housing part 5202b is at the predetermined angle 5292 and the first hinge assembly 5204a allows the first housing part 5202a to rotate or pivot, the second hinge assembly 5204b may transition from an unlocked position to a locked position, thereby preventing the second housing part 5202b from movement relative to the third housing part 5202c. Accordingly, the system 5200 may provide a dual hinge assembly with mutually exclusive movement in that in one configuration the first hinge assembly 5204a is unlocked the second hinge assembly 5204b is locked, and in another configuration the first hinge assembly 5204a is locked the second hinge assembly 5204b is unlocked. This allows a user to position the system 5200 in a functional and a useful manner, particularly when the system 5200 carries an electronic device (not shown in FIG. 95).

Figure 96:
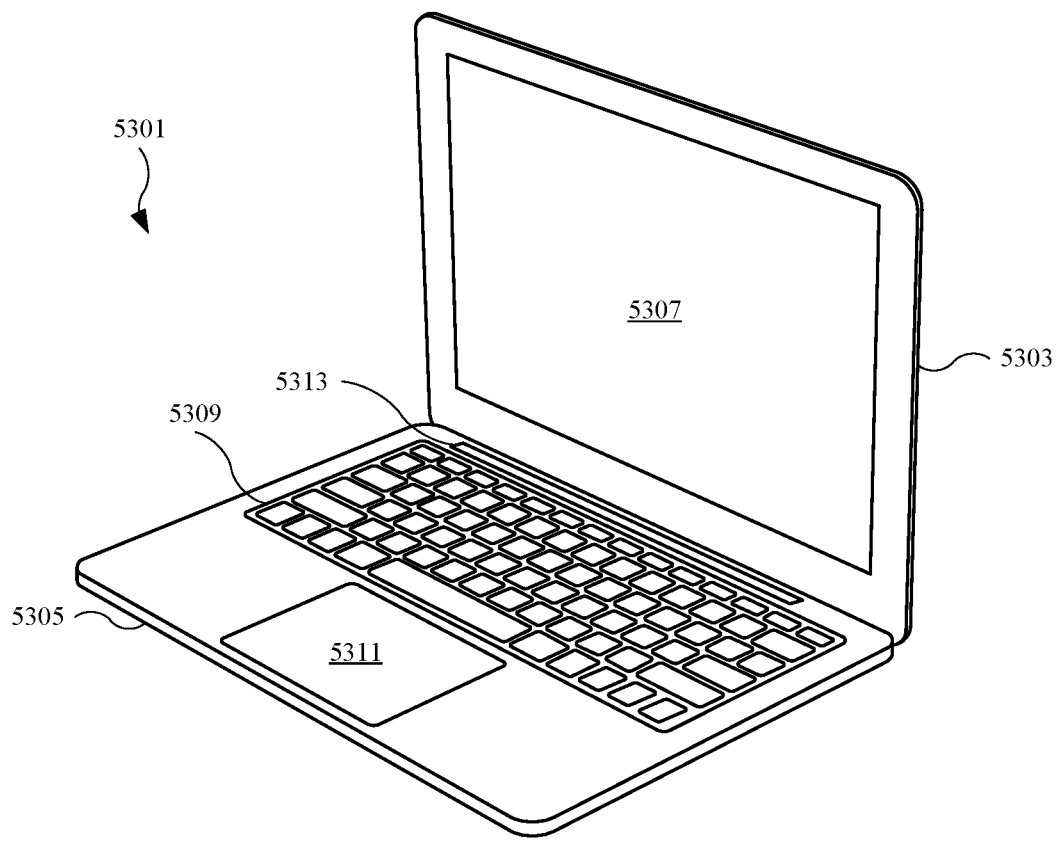
FIG. 96 illustrates an isometric view of an embodiment of an electronic device, in accordance with some described embodiments.

FIG. 96 illustrates an isometric view of an embodiment of an electronic device 5301, in accordance with some described embodiments. In some embodiments, the electronic device 5301 includes a laptop computing device. The various embodiments of system described herein may include several features described for the electronic device 5301. As shown, the electronic device 5301 may include a display housing 5303 and a base portion 5305 hingedly coupled to the display housing 5303. In this regard, the display housing 5303 can rotate with respect to the base portion 5305, and vice versa. The display housing 5303 may be coupled to the base portion 5305 by at least one of the hinge assemblies described herein.

The display housing 5303 may include a display 5307 designed to present visual information to a user, in the form of textual information, still images, and/or video. In order to control the display 5307, the base portion 5305 may include several control features, such as a keyboard assembly 5309, a touch pad 5311, and/or a display function bar 5313, with the latter providing a dynamic set of touch inputs that changes in accordance what is presented on the display 5307. The features described herein for the display housing 5303 and base portion 5305 may be present on a first housing part and a second housing, respectively, described herein.

Figure 97:
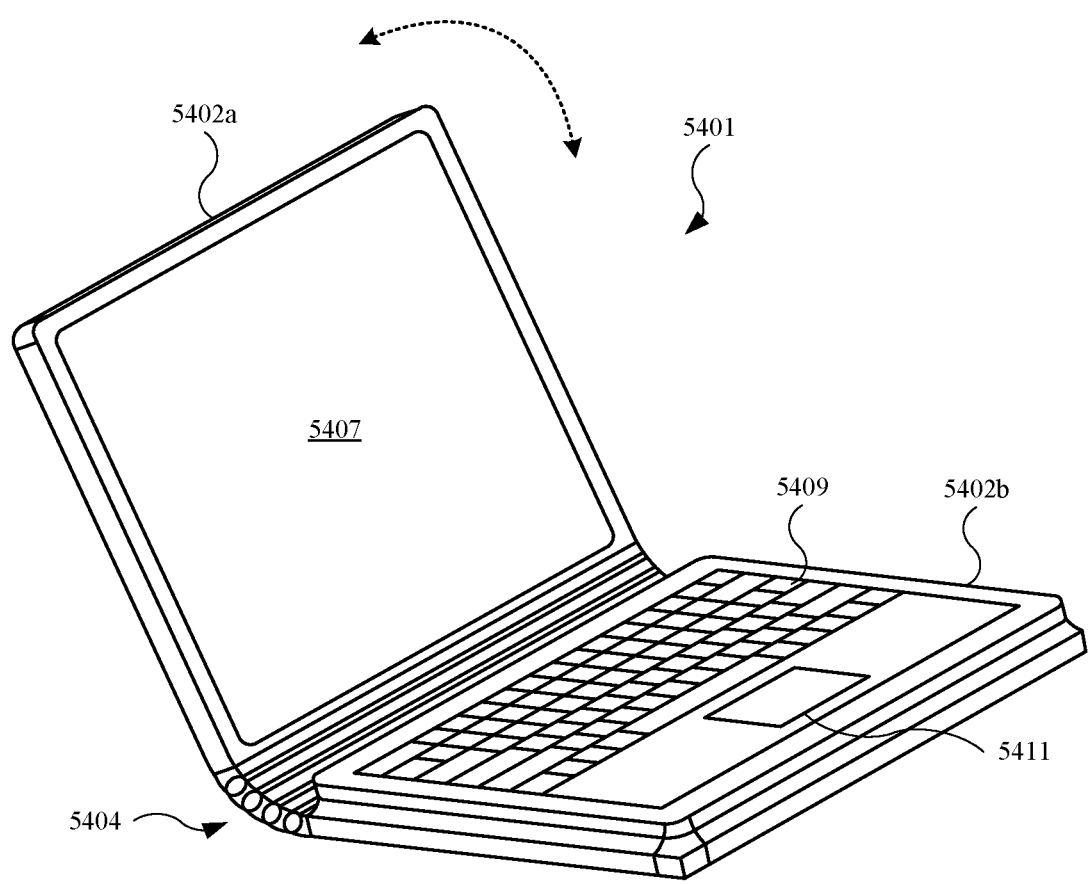
FIG. 97 illustrates an isometric view of an embodiment of an electronic device, in accordance with some described embodiments.

FIG. 97 illustrates an isometric view of an embodiment of an electronic device 5401, in accordance with some described embodiments. The electronic device 5401 may include a laptop computing device. As shown, the electronic device 5401 may include a first housing 5402a, or display housing, that carries a display 5407 of the electronic device 5401. The electronic device 5401 may further include a second housing 5402b, or base portion, that includes a keyboard assembly 5409 and a touch pad 5411, both of which are designed to generate an input or command to a processing system (not shown in FIG. 98) of the electronic device 5401. The electronic device 5401 may further include a hinge assembly 5404 coupled to the first housing 5402a and the second housing 5402b. The hinge assembly 5404 allows for rotational movement of the first housing 5402a with respect to the second housing 5402b, and vice versa. The electronic device 5401 is shown in an open position. However, the hinge assembly 5404 allows the first housing 5402a to rotate over the second housing 5402b such that the display 5407 is positioned over the keyboard assembly 5409 and the touch pad 5411, thereby defining a closed positioned. The hinge assembly 5404 may include one or more features described herein for hinge assemblies, spacer elements, roller elements, and/or straps, as non-limiting examples. Also, the aforementioned systems described in this detailed description may include any feature or features described herein for the electronic device 5401.

Figure 98:
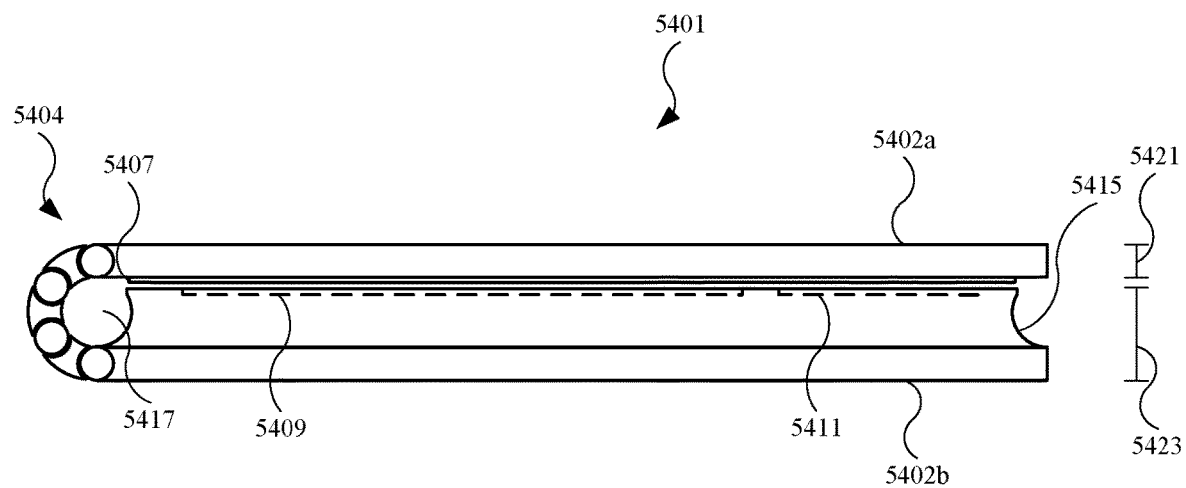
FIG. 98 illustrates a side view of the electronic device shown in FIG. 97, showing the electronic device in a closed position.

FIG. 98 illustrates a side view of the electronic device 5401 shown in FIG. 97, showing the electronic device in a closed position. As shown, the first housing 5402a includes a thickness 5421 and the second housing 5402b includes a thickness 5423 that is greater than the thickness 5421 of the first housing 5402a. Also, the thickness 5421 of the first housing 5402a is the same, or at least approximately the same, thickness of the hinge assembly 5404. Also, the second housing 5402b may include a notch 5415, or curved portion, that allows a user to position a digit (such as a finger) under the first housing 5402a and pull the first housing 5402a away from the second housing 5402b, and transition the electronic device 5401 from the closed position to the open position (as shown in FIG. 98).

The second housing 5402b may include a recess. As shown in FIG. 98, the recess may position the keyboard assembly 5409 and the touch pad 5411 sub-flush, or below, an uppermost surface of the second housing 5402b. In this manner, in the closed positioned, the display 5407 may not contact the keyboard assembly 5409 or the touch pad 5411. Also, in the closed position, the electronic device 5401 defines an opening 5417 capable of carrying an object (not shown in FIG. 99) such as a stylus or other interactive tool designed to interact with the display 5407. In this manner, when the display 5407 includes touch input capabilities, the electronic device 5401 can carry the object and the object can be removed from the opening 5417 and the user can interact with the display with the object. As shown, the hinge assembly 5404 and the second housing 5402b are shaped such that the opening 5417 includes a circular opening. However, other shapes are possible.

Figure 99:
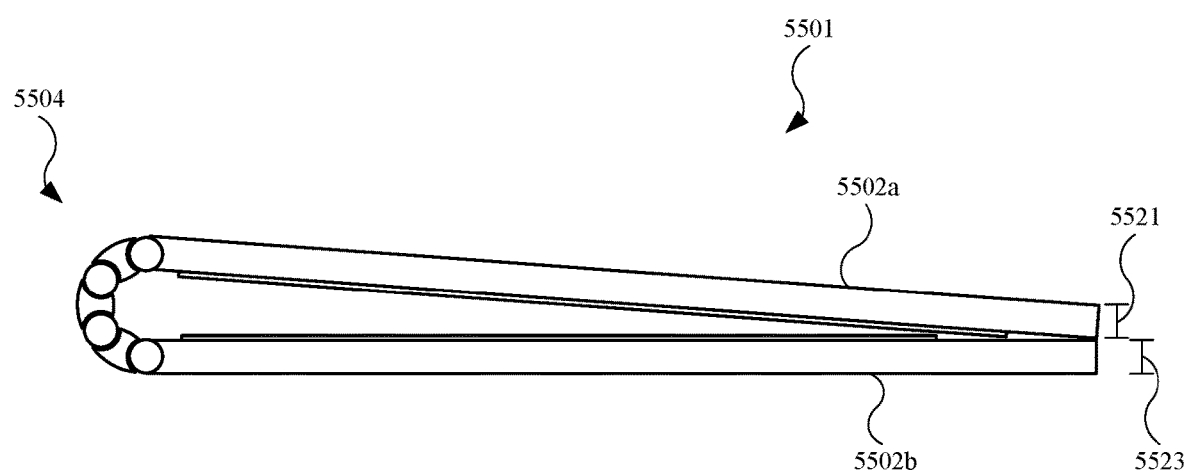
FIG. 99 illustrates a side view of an alternative embodiment of an electronic device, showing the electronic device in a closed position.
Figure 100:
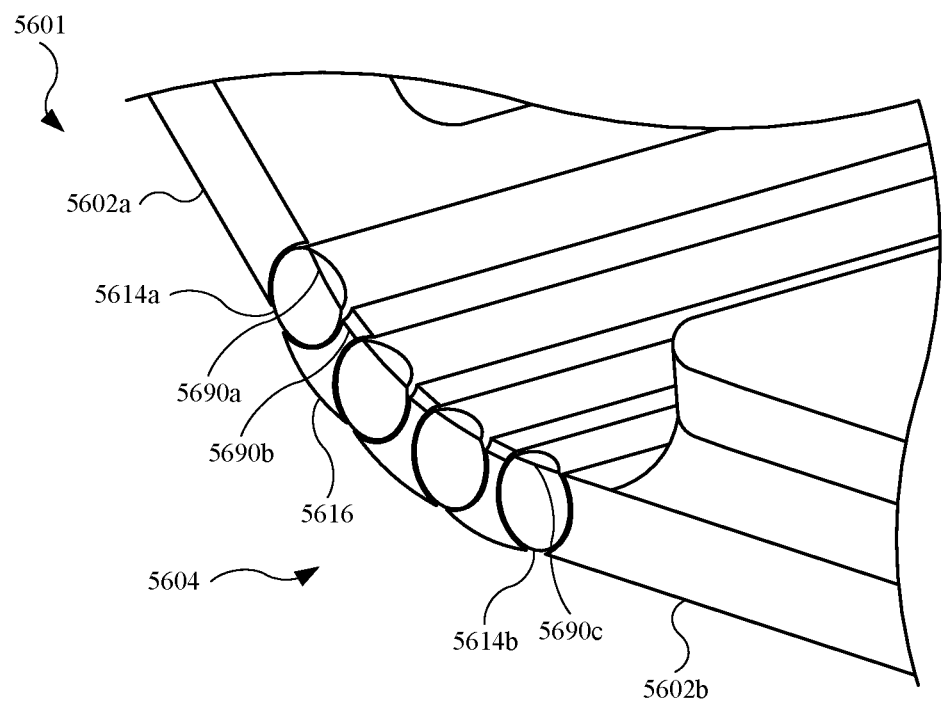
FIG. 100 illustrates an isometric view of an alternate embodiment of an electronic device, showing components of the hinge assembly having chamfered regions, in accordance with some described embodiments.
Figure 101:
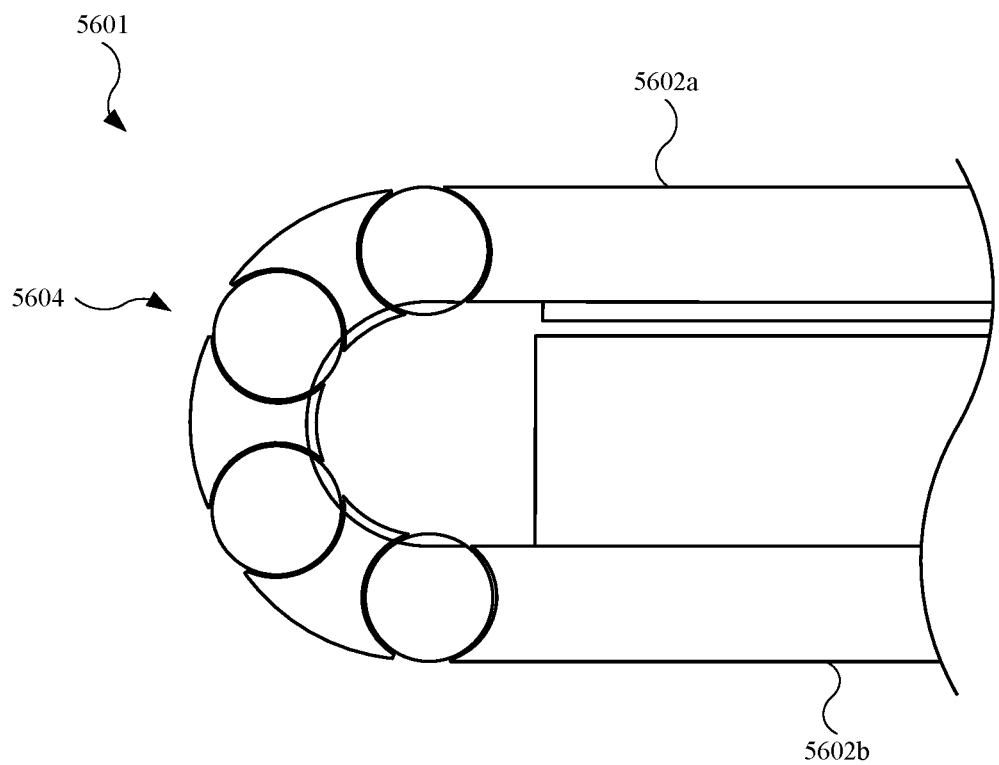
FIG. 101 illustrates a side view of the electronic device shown in FIG. 100, showing the electronic device in a closed position.

FIGS. 99-101 illustrate additional embodiments of electronic devices. The hinge assemblies shown in FIGS. 99-101 may include any feature described herein for hinge assemblies, spacer elements, roller elements, and/or straps, as non-limiting examples.

FIG. 99 illustrates a side view of an alternative embodiment of an electronic device 5501, showing the electronic device 5501 in a closed position. As shown, the electronic device 5501 may include a first housing 5502a, a second housing 5502b, and a hinge assembly 5504 coupled with the first housing 5502a and the second housing 5502b. The first housing 5502a includes a thickness 5521 and the second housing 5502b includes a thickness 5523 that is the same, or at least approximately the same, as the thickness 5521 of the first housing 5502a. Also, the thickness 5521 of the first housing 5502a is the same, or at least approximately the same, thickness of the hinge assembly 5504. In this manner, the electronic device 5501 may form a "wedge" shape in the closed position, as shown in FIG. 99.

FIG. 100 illustrates an isometric view of an alternative embodiment of an electronic device 5601, showing components of the hinge assembly 5604 having chamfered regions, in accordance with some described embodiments. The electronic device 5601 may include any features described herein for an electronic device. As shown, the electronic device 5601 may include a first housing 5602a, a second housing 5602b, and a hinge assembly 5604 coupled with the first housing 5602a and the second housing 5602b.

The hinge assembly 5604 can be modified such that the appearance of the hinge assembly 5604 matches that of the first housing 5602a and the second housing 5602b. For example, the hinge assembly 5604 may include a first roller element 5614a and a spacer element 5616 having a chamfered region 5690a and a chamfered region 5690b, respectively. The chamfered region 5690a of the first roller element 5614a and the chamfered region 5690b of the spacer element 5616 provide a reduced thickness at an outer perimeter of the hinge assembly 5604 such that the thickness of the hinge assembly 5604 includes a thickness, or at least an approximate thickness, as that of the first housing 5602a at the outer perimeter. Further, the hinge assembly 5604 may include a second roller element 5614b that includes a chamfered region 5690c that provides a reduced thickness at an outer perimeter of the hinge assembly 5604 such that the thickness of the hinge assembly 5604 includes a thickness, or at least an approximate thickness, as that of the second housing 5602b at the outer perimeter. Although not labeled, the remaining roller elements and spacer elements may include chamfered regions similar to those described for FIG. 101. Due in part to each roller element and each spacer element having a chamfered region, the hinge assembly 5604 includes a consistent appearance of a reduced thickness and provides an edge aligned with the first housing 5602a and the second housing 5602b.

FIG. 101 illustrates a side view of the electronic device shown in FIG. 100, showing the electronic device 5601 in a closed position. Due in part to the chamfered regions of the roller elements and the spacer elements of the hinge assembly 5604, the hinge assembly 5604 may include an appearance of the same or similar thickness as that of the first housing 5602a and the second housing 5602b. This may enhance the overall aesthetic appearance of the electronic device 5601, as the chamfered regions follow the curvature of the hinge assembly 5604 and provide an edge aligned with the first housing 5602a and the second housing 5602b to provide a consistent finish.

Figure 102:
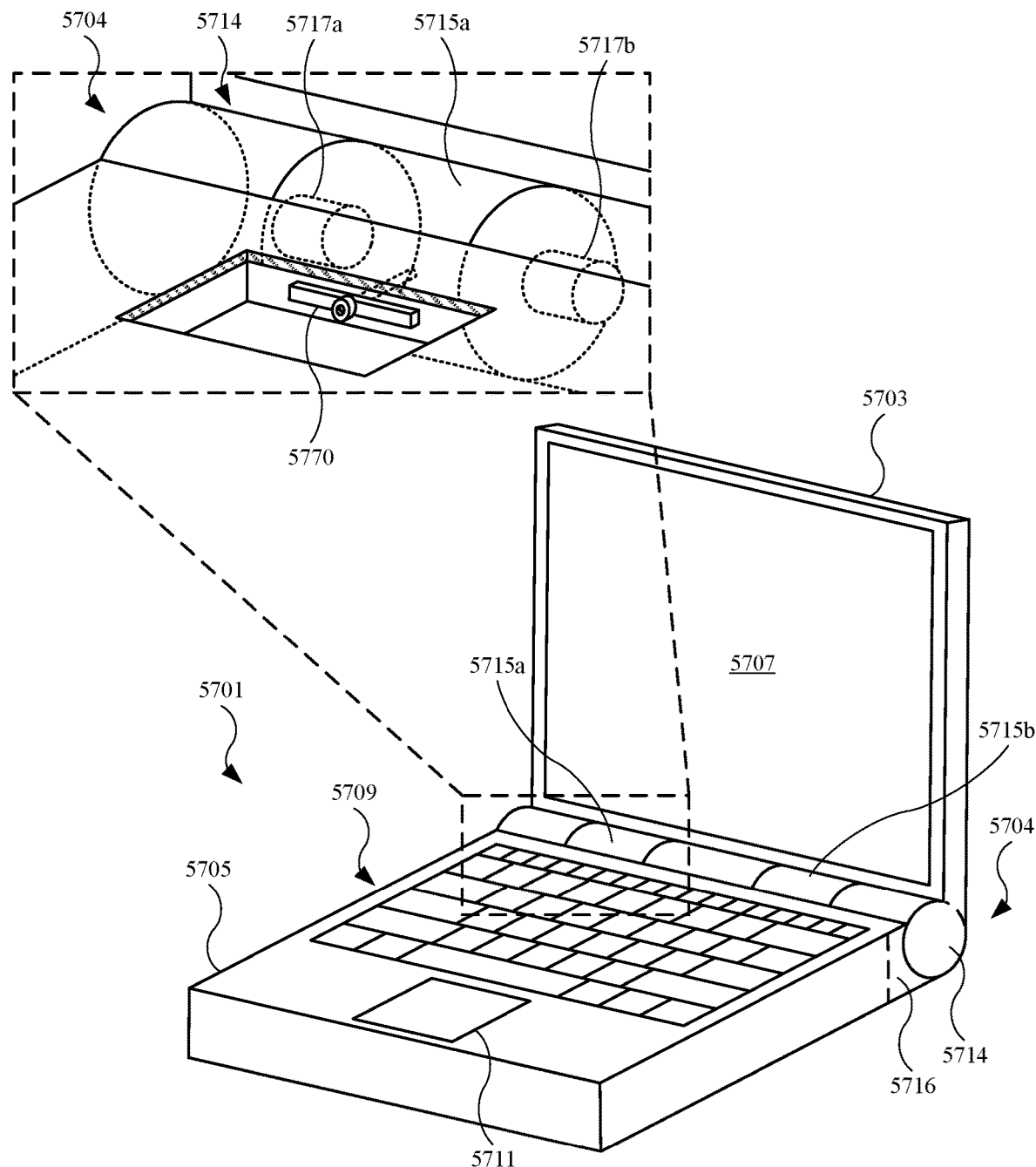
FIG. 102 illustrates an isometric view of an alternate embodiment of an electronic device, showing a hinge assembly that includes a roller element integrated with a display housing and a spacer element integrated with a base portion, in accordance with some described embodiments.

FIG. 102 illustrates an isometric view of an alternate embodiment of an electronic device 5701, showing a hinge assembly 5704 that includes a roller element 5714 integrated with a display housing 5703 and a spacer element 5716 integrated with a base portion 5705, in accordance with some described embodiments. As shown, the display housing 5703 is coupled to the base portion 5705 by the hinge assembly 5704. Similar to prior embodiments, the display housing 5703 includes a display 5707, and the base portion 5705 includes a keyboard assembly 5709 and a touch pad 5711.

The roller element 5714 and the display housing 5703 may be formed during an assembly operation such that the roller element 5714 and the display housing 5703 are formed from a single, continuous block of material (or materials). Similarly, the spacer element 5716 and the base portion 5705 may be formed during an assembly operation such that the spacer element 5716 and the base portion 5705 are formed from a single, continuous block of material (or materials). The assembly operation may include machining, cutting, or molding, as non-limiting examples. Also, as shown in FIG. 102, the electronic device 5701 is in the open position. However, the electronic device 5701 can transition from the open position to the closed position when the roller element 5714 rotates along the spacer element 5716. In some embodiment (not shown in FIG. 102), the Also, the roller element 5714 is integrated with the base portion 5705 and the spacer element 5716 is integrated with the display housing 5703. Also, although not shown, the hinge assembly 5704 may include one or more straps, each of which may be coupled to a tensioning element.

The hinge assembly 5704 may include one or more cylindrical parts positioned into openings of the roller element 5714. These cylindrical parts may aligned with the roller element 5714, and may be fixed in place subsequent to alignment. For example, the hinge assembly 5704 includes a first cylindrical part 5715a and a second cylindrical part 5715b that are positioned in openings of the roller element 5714. During rotation of the display housing 5703 relative to the base portion 5705 (or vice versa), the roller element 5714 rotates along the spacer element 5716, while the first cylindrical part 5715a and the second cylindrical part 5715b remain fixed.

The first cylindrical part 5715a and the second cylindrical part 5715b can be designed to retain the display housing 5703. For example, as shown in the enlarged view, the first cylindrical part 5715a may include a first protruding feature 5717a and a second protruding feature 5717b. For purposes of simplicity and illustration, the keys of the keyboard assembly 5709 are removed in the enlarged view. The first protruding feature 5717a and the second protruding feature 5717b may fit into a first recess and a second recess (not labeled), respectively, of the roller element 5714. This will be further described below. Also, the hinge assembly 5704 may include tensioning elements coupled to the aforementioned cylindrical parts. For example, the hinge assembly 5704 includes a tensioning element 5770 coupled to the first cylindrical part 5715a. The tensioning element 5770 may include an adjustable tensioning element. It should be noted that the second cylindrical part 5715b may include any features, including a tensioning element, shown and described for the first cylindrical part 5715a. Also, while a first cylindrical part 5715a and a second cylindrical part 5715b are shown, a different number of cylindrical parts may be used, such as a single, centrally located cylindrical part, or three or more cylindrical parts (as non-limiting examples).

Figure 103:
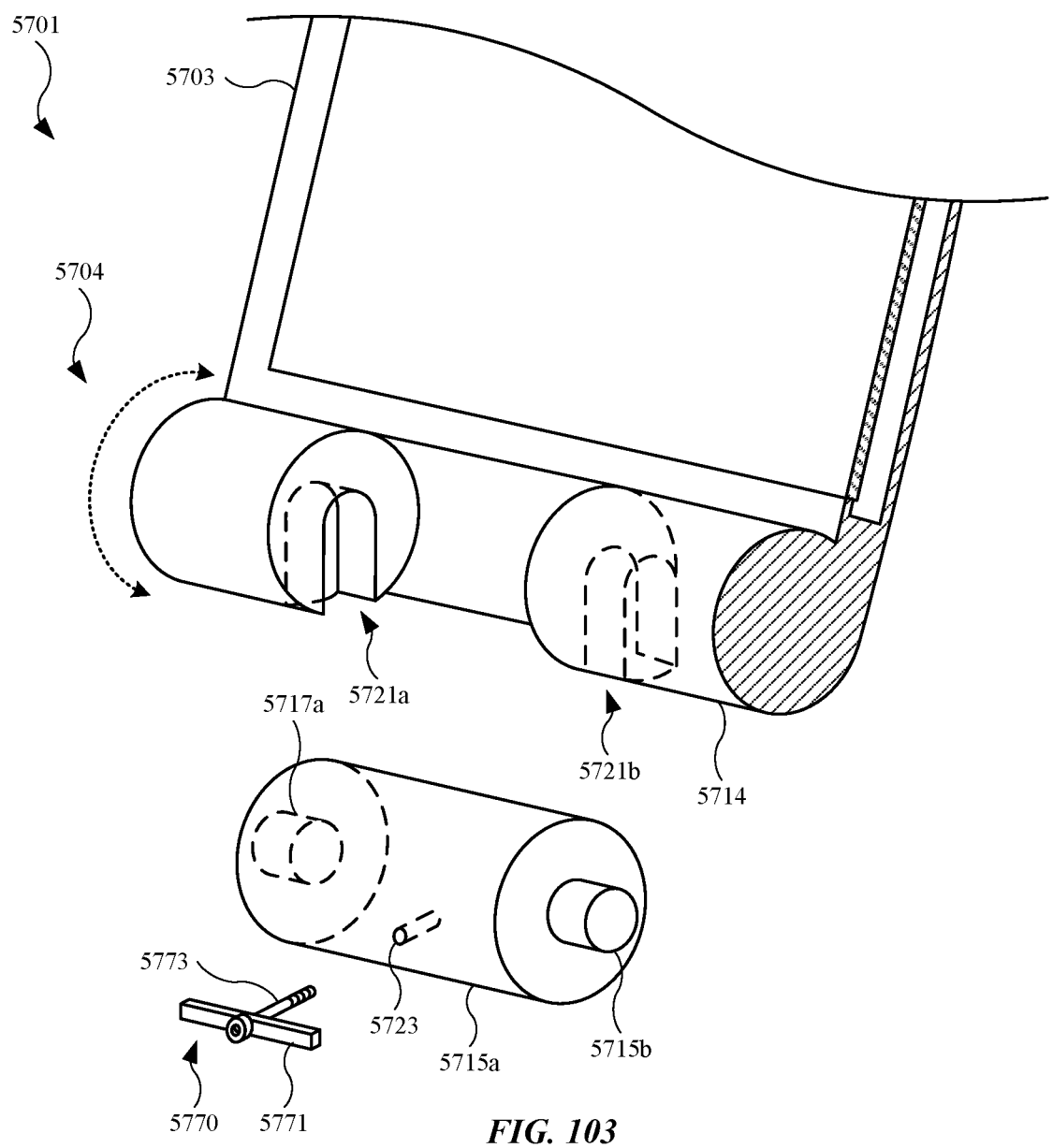
FIG. 103 illustrates an exploded view of the hinge assembly of the electronic device shown in FIG. 102.

FIG. 103 illustrates an exploded view of the hinge assembly 5704 of the electronic device 5701 shown in FIG. 102. As shown, the roller element 5714 may include a first recess 5721a and a second recess 5721b designed to receive the first protruding feature 5717a and the second protruding feature 5717b, respectively, of the first cylindrical part 5715a. The first recess 5721a and the second recess 5721b extend to the outer perimeter of the roller element 5714. Subsequent to positioning the protruding features into the recesses, the recesses can be filled with a filler material (not shown in FIG. 103) in order to retain the protruding features, and accordingly, the first cylindrical part 5715a, in alignment with the roller element 5714. The filler material may include a material similar to the material that forms the display housing 5703 and the roller element 5714. However, subsequent to applying the filler material, the roller element 5714 is still capable of rotational movement relative to the first cylindrical part 5715a. Alternatively, the first protruding feature 5717a and the second protruding feature 5717b may include spring-loaded protruding features designed to retract into the body of the first cylindrical part 5715a during installation into the roller element 5714, and subsequently extend into the recesses of the roller element 5714. In this manner, the first recess 5721a and the second recess 5721b may be include a size and shape (such as a cylindrical recess) corresponding to the first protruding feature 5717a and the second protruding feature 5717b, and a filler material may not be required.

The tensioning element 5770 may include a spring 5771 designed to bend or flex, and provide a pulling force, or tension, to the first cylindrical part 5715a. The tensioning element 5770 may further include a fastener 5773 designed to enter an opening 5723 of the first cylindrical part 5715a. The engagement between the fastener 5773 and the opening 5723 may include a threaded engagement. The fastener 5773 can be adjusted (e.g., rotationally driven) to adjust the flexing of the spring 5771, thereby adjusting the tension provided by the tensioning element 5770. Again, it should be noted that the second cylindrical part 5715b (shown in FIG. 102) may include any features, including a tensioning element, shown and described for the first cylindrical part 5715a.

Figure 104:
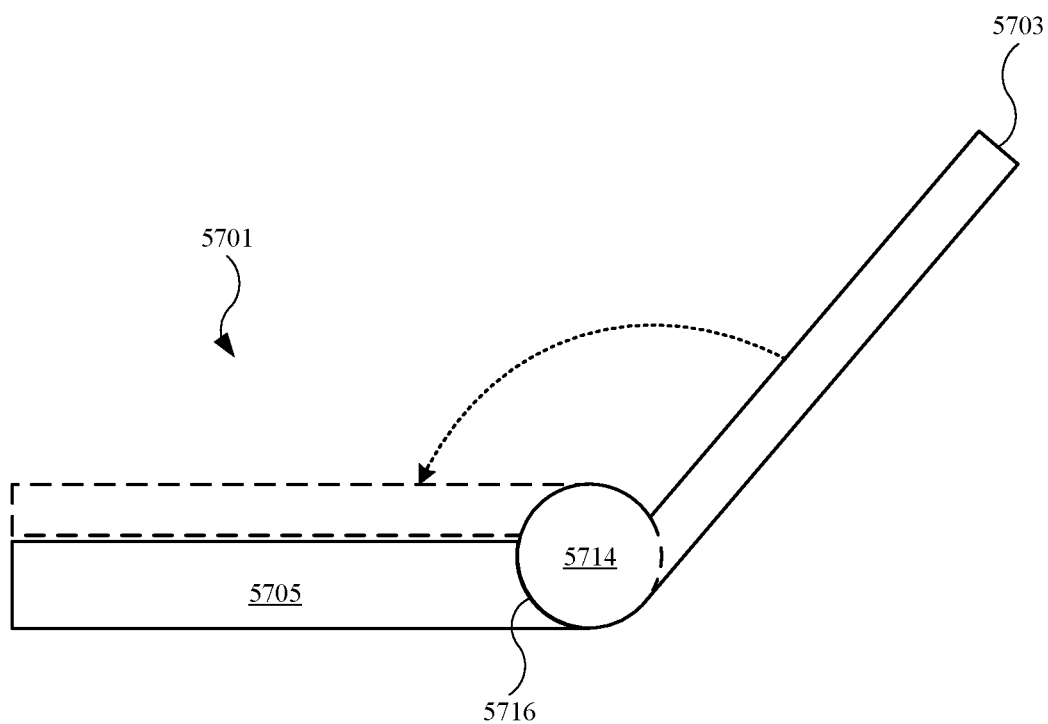
FIG. 104 illustrates a side view of the electronic device shown in FIG. 102.

FIG. 104 illustrates a side view of the electronic device 5701 shown in FIG. 102. As shown, the electronic device 5701 is in the open position and the display housing 5703 is rotated away from the base portion 5705. However, the roller element 5714 can rotate along the spacer element 5716, causing the display housing 5703 to rotate toward the base portion 5705 and transition to the closed position, as indicated by the dotted lines.

Figure 105:
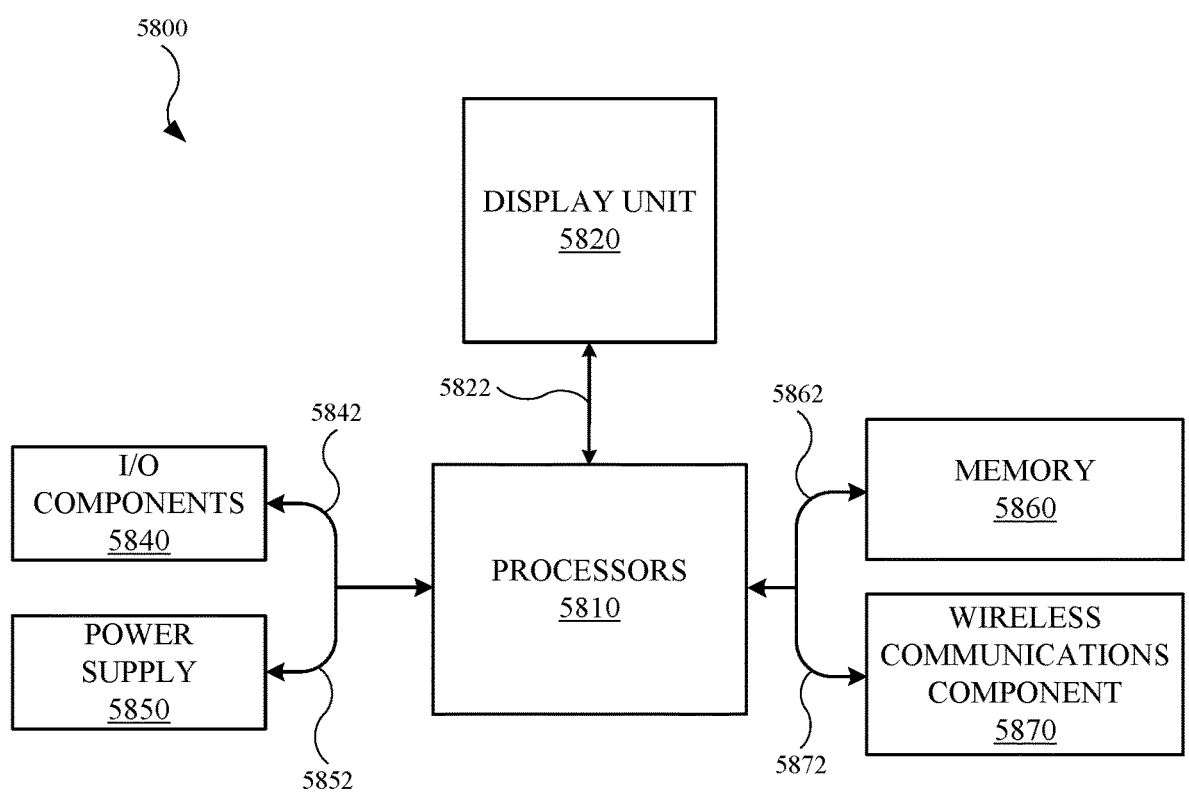
FIG. 105 illustrates a block diagram of an electronic device, in accordance with some described embodiments.

FIG. 105 illustrates a block diagram of a portable electronic device 5800, in accordance with some embodiments. The portable electronic device 5800 is capable of implementing the various techniques described herein. The portable electronic device 5800 may include any features described herein for an electronic device. Also, electronic devices described herein may include any feature or features described for the portable electronic device 5800. In some embodiments, the portable electronic device 5800 takes the form of the system 100 (shown in FIG. 1). The portable electronic device 5800 can include one or more processors 5810 for executing functions of the portable electronic device 5800. The one or more processors 5810 can refer to at least one of a central processing unit (CPU) and at least one microcontroller for performing dedicated functions.

According to some embodiments, the portable electronic device 5800 can include a display unit 5820. The display unit 5820 is capable of presenting a user interface that includes icons (representing software applications), textual images, and/or motion images. In some examples, each icon can be associated with a respective function (such as a software application) that can be executed by the one or more processors 5810. In some cases, the display unit 5820 includes a display layer (not illustrated), which can include a liquid-crystal display (LCD), light-emitting diode display (LED), organic light-emitting diode display (OLED), or the like. According to some embodiments, the display unit 5820 includes a touch input detection component and/or a force detection assembly that can be configured to detect changes in an electrical parameter (e.g., electrical capacitance value) when the user's appendage (acting as a capacitor) comes into proximity with the display unit 5820 (or in contact with a transparent layer that covers the display unit 5820). The display unit 5820 is connected to the one or more processors 5810 via one or more connection cables 5822.

According to some embodiments, the portable electronic device 5800 can include one or more input/output components 5840 (also referred to as "I/O components") that enable communication between a user and the portable electronic device 5800. In some cases, the one or more input/output components 5840 can refer to a button or a switch that is capable of actuation by the user. In some cases, the one or more input/output components 5840 can refer to a soft key that is flexibly programmable to invoke any number of functions. In some examples, the one or more input/output components 5840 can refer to a switch having a mechanical actuator (e.g., spring-based switch, slide-switch, rocker switch, rotating dial, etc.) or other moving parts that enable the switch to be actuated by the user. In some examples, the one or more input/output components 5840 can include a capacitive switch that is integrated with the display unit 5820. Also, the one or more input/output components 5840 can include a force detect assembly that includes several force detection units, each of which is designed to detection an amount of applied force (by, for example, a touch input) to the display unit 5820. The one or more input/output components 5840 can include accelerometer that determine whether the portable electronic device 5800, and to what extent, is accelerating or decelerating. When the one or more input/output components 5840 are used, the input/output components 5840 can generate an electrical signal that is provided to the one or more processors 5810 via one or more connection cables 5842.

According to some embodiments, the portable electronic device 5800 can include a power supply 5850 that is capable of providing energy to the operational components of the portable electronic device 5800. In some examples, the power supply 5850 can refer to a rechargeable battery. The power supply 5850 can be connected to the one or more processors 5810 via one or more connection cables 5852. The power supply 5850 can be directly connected to other devices of the portable electronic device 5800, such as the one or more input/output components 5840. In some examples, the portable electronic device 5800 can receive power from another power sources (e.g., an external charging device).

According to some embodiments, the portable electronic device 5800 can include memory 5860, which can include a single disk or multiple disks (e.g., hard drives), and includes a storage management module that manages one or more partitions within the memory 5860. In some cases, the memory 5860 can include flash memory, semiconductor (solid state) memory or the like. The memory 5860 can also include a Random Access Memory (RAM) and a Read-Only Memory (ROM). The ROM can store programs, utilities or processes to be executed in a non-volatile manner. The RAM can provide volatile data storage, and stores instructions related to the operation of the portable electronic device 5800. In some embodiments, the memory 5860 refers to a non-transitory computer readable medium, where an operating system (OS) is established at the memory 5860 that can be configured to execute software applications, confidence interval algorithms, and/or machine learning algorithms that are stored at the memory 5860. The one or more processors 5810 can also be used to execute software applications, confidence interval algorithms, and/or machine learning algorithms that are stored at the memory 5860. In some embodiments, a data bus 5862 can facilitate data transfer between the memory 5860 and the one or more processors 5810.

According to some embodiments, the portable electronic device 5800 can include a wireless communications component 5870. A network/bus interface 5872 can couple the wireless communications component 5870 to the one or more processors 5810. The wireless communications component 5870 can communicate with other electronic devices via any number of wireless communication protocols, including at least one of a global network (e.g., the Internet), a wide area network, a local area network, a wireless personal area network (WPAN), or the like. In some examples, the wireless communications component 5870 can transmit data to the other electronic devices over IEEE 802.11 (e.g., a Wi-Fi® networking system), Bluetooth (IEEE 802.15.1), ZigBee, Wireless USB, Near-Field Communication (NFC), a cellular network system (e.g., a 3G/4G/5G network such as UMTS, LTE, etc.), or the like.

Figure 106:
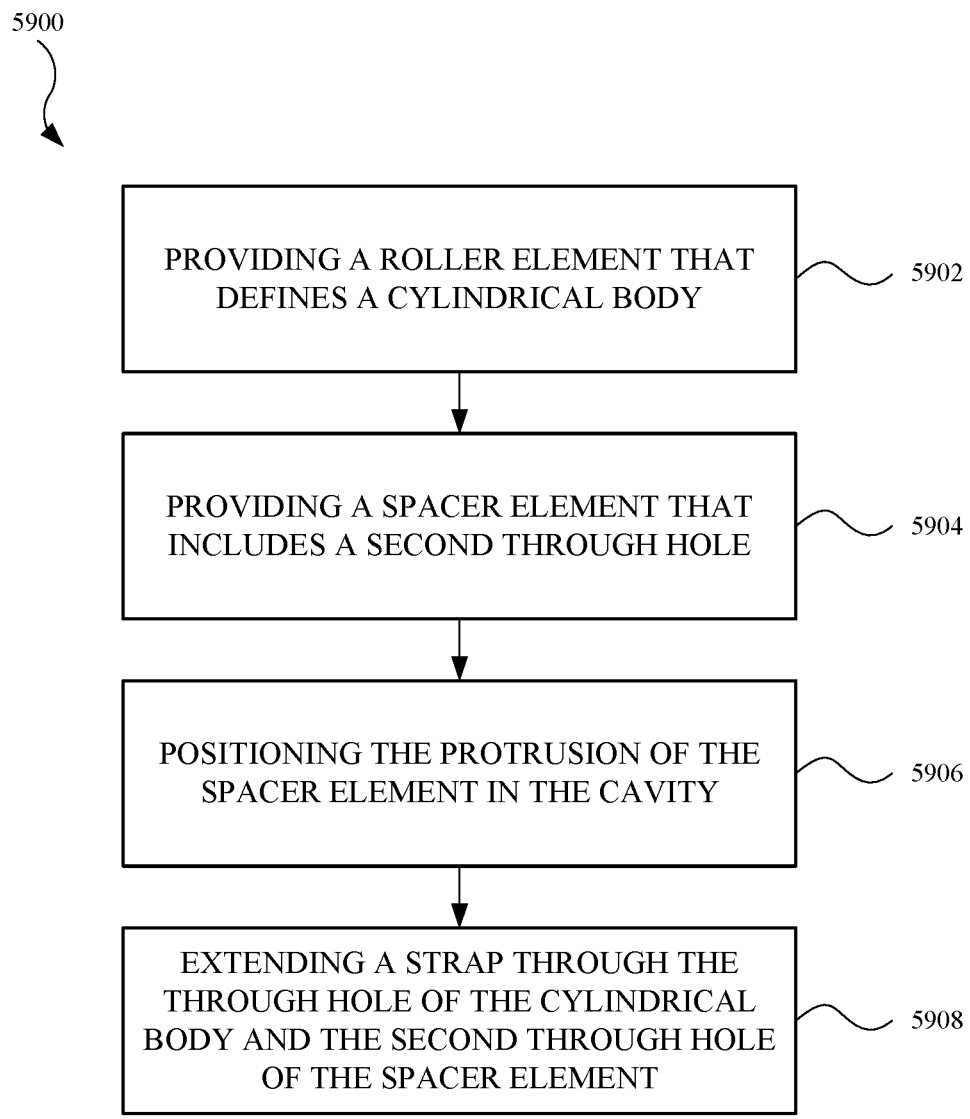
FIG. 106 illustrates a flowchart showing a method for assembling a hinge assembly of a portable computing device, in accordance with some described embodiments.

FIG. 106 illustrates a flowchart 5900 showing a method for assembling a hinge assembly of a portable computing device, in accordance with some described embodiments. The portable computing device may include a base portion and a display housing. The base portion may carry a keyboard, a touch pad, a processor circuit, a memory circuit, a battery, and flexible circuit that connect these components.

In step 5902, a roller element that defines a cylindrical body is provided. The roller element may a through hole having a convex surface. Also, in addition to the through hole, the roller element may further include a cavity. The cavity may define a recess that extends partially into the roller element.

In step 5904, a spacer element that includes a second through hole is provided. The spacer element may include a protrusion. In some instances, the roller element includes an additional cavity, and the cylindrical body includes an additional protrusion.

In step 5906, the protrusion is positioned in the cavity. The protrusion may include a dovetail configuration that defines one or more tapered regions. Also, the cavity may also be tapered.

In step 5908, a strap is extended through the through hole and the second through hole. The strap is designed to maintain contact between the roller element and the spacer elements. Also, an engagement of protrusion and the roller element within the cavity limits rotational movement of the display housing with respect to the base portion. Further, the strap may engage the convex surface when the display housing is positioned over the base portion The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A laptop computing device, comprising:
  a base portion that carries an input mechanism;
  a display housing that carries a display that is controlled by the input mechanism, wherein the display housing is rotatable from an open position to a closed position with respect to the base portion;
  a hinge assembly coupled to the display housing and the base portion, the hinge assembly comprising:
    a first cylindrical roller element comprising a first opening,
    a second cylindrical roller element comprising a second opening, and
    a spacer element comprising:
      a first concave surface engaged with the first roller cylindrical element,
      a second concave surface engaged with the second cylindrical roller element,
      a first protrusion extending from the first concave surface and located in the first opening, and a second protrusion extending from the second concave surface and located in the second opening; and a strap coupled to the display housing and the base portion and extending through the first roller element, the second roller element, and the spacer element, the strap providing a stiffness such that a transition from the open position to the closed position causes synchronous motion of the first roller element, the second roller element, and the spacer element.

2. The laptop computing device of claim 1, wherein the hinge assembly provides a mechanical stop defined by the strap being pinched between i) the first cylindrical roller element and the spacer element, and ii) the second cylindrical roller element and the spacer element.

3. The laptop computing device of claim 2, further comprising:
a third cylindrical roller element; and
a second spacer element between the second cylindrical roller element and the third cylindrical roller element, wherein the mechanical stop includes the spacer element in contact with the second spacer element.

4. The laptop computing device of claim 1, wherein:
the first opening defines a first internal surface,
the second opening defines a second internal surface, and
the hinge assembly provides a mechanical stop defined by the first protrusion being engaged with the first internal surface and the second protrusion being engaged with the second internal surface.

5. The laptop computing device of claim 1, wherein in the closed position, the display housing and the base portion combine to define a circular opening.

6. The laptop computing device of claim 1, wherein:
the input mechanism comprises a keyboard, and
the display housing is rotatable from an open position defined by the keyboard uncovered by the display housing to the closed position defined by the input mechanism covered by the display housing.

7. The laptop computing device of claim 1, further comprising an end piece positioned in the base portion and coupled the strap, wherein the strap includes fibers aligned in a first direction and wherein the end piece includes fibers aligned in a second direction perpendicular to the first direction.

8. The laptop computing device of claim 6, further comprising a second strap and a third strap, the second strap and the third strap extending through the first roller element, the second roller element, and the spacer element, wherein:
the strap defines a first strap,
the second strap counterbalances the display housing, and
the third strap comprises a flexible circuit that electrically couples the display with a processor carried by the base portion.

9. A system, comprising:
a first housing part;
a second housing part that defines an internal volume;
a hinge assembly that rotatably couples the first housing part with the second housing part, the hinge assembly comprising:
a first cylindrical roller element,
a second cylindrical roller element, and
a spacer element positioned between, and providing a frictional engagement with, the first cylindrical roller element and the second cylindrical roller element, wherein movement of the first housing part with respect to the second housing part causes a synchronous movement of the first cylindrical roller element, the second cylindrical roller element, and the spacer element; and
a strap extending through the first roller element, spacer element, and the second roller element; and
an adjustable tension system coupled to the strap and fully enclosed within the internal volume, the adjustable tension system comprising:
a strap retention element coupled, and providing a force to, the strap, the force causing the synchronous movement; and
a fastener coupled with strap retention element and configured to adjust the force.

10. The system of claim 9, wherein the strap maintains the frictional engagement between the spacer element and the first cylindrical roller element and the second roller cylindrical element during the rotational movement.

11. The system of claim 9, wherein the strap comprises:
a glass fiber; and
a flexible material coupled with the glass fiber, wherein when a pulling force is applied to the flexible material, the flexible material stretches and elongates.

12. The system of claim 9, wherein the first roller cylindrical element comprises an opening through which the strap passes, the opening defined by a flat surface and a curved surface.

13. The system of claim 9, wherein the strap allows the hinge assembly to bend in a first direction but limits the hinge assembly to a predetermined angle in a second direction opposite the first direction.

14. A system comprising:
a first housing part defined by first dimension extending from a first end and a second end opposite the first end;
a second housing part rotatably coupled to the first housing part by a first hinge assembly, the first hinge assembly comprising:
a first cylindrical roller element comprising a first opening,
a second cylindrical roller element comprising a first opening,
a spacer element comprising:
a first concave surface frictionally engaged with the first roller cylindrical element,
a second concave surface frictionally engaged with the second cylindrical roller element, wherein each of the first cylindrical roller element, the second cylindrical roller element, and the spacer element are defined by a second dimension that extends from the first end to the second end;
a first protrusion extending from the first concave surface and positioned in the first opening, and
a second protrusion extending from the second concave surface and positioned in the second opening;
a third housing part; and
a second hinge assembly coupled to the second housing part and the third housing part, the second hinge assembly allowing rotational movement between the second housing part and the third housing part.

15. The system of claim 14, wherein the first cylindrical roller element and the second cylindrical roller element provide a synchronous rotational movement from a closed position defined by the first housing part being positioned over the second housing part to an open position defined by the first housing part being rotated away from the second housing part.

16. The system of claim 14, wherein the first housing part includes a concave portion that receives the first cylindrical roller element.

17. The system of claim 14, wherein the first hinge assembly allows for rotation of the first housing part relative to the second housing part subsequent to the second hinge assembly allowing the second housing part to separate from the third housing part by a predetermined angle, and wherein the first hinge assembly prevents the rotation of the first housing part relative to the second housing part prior to the second housing part separating from the third housing part by the predetermined angle.

18. The system of claim 14, wherein the first dimension equals the second dimension.

19. The system of claim 14, wherein the first cylindrical roller element comprises at least one convex surface and at least one flat surface.

20. The system of claim 14, further comprising:
a display carried by the first housing part; and
a keyboard carried by the second housing part.

21. The system of claim 1, wherein:
the first housing part defines a first rectangular housing part,
the second housing part defines a second rectangular housing part, and
in the closed position the first rectangular housing part is parallel with respect to the second rectangular housing part.

\* \* \* \* \*